United States Patent
Rieber et al.

(10) Patent No.: US 11,135,525 B2
(45) Date of Patent: Oct. 5, 2021

(54) ACCORDION FOLD PLAY STRUCTURE WITH EASY-UP ASSEMBLY DEVICE

(71) Applicant: KidKraft, Inc., Dallas, TX (US)

(72) Inventors: Frederick Rieber, Hamburg, NY (US); David Barr, Dallas, TX (US)

(73) Assignee: KidKraft, Inc., Dallas, TX (US)

( * ) Notice: Subject to any disclaimer, the term of this patent is extended or adjusted under 35 U.S.C. 154(b) by 0 days.

(21) Appl. No.: 16/631,368

(22) PCT Filed: Jul. 20, 2018

(86) PCT No.: PCT/US2018/043124
§ 371 (c)(1),
(2) Date: Jan. 15, 2020

(87) PCT Pub. No.: WO2019/018789
PCT Pub. Date: Jan. 24, 2019

(65) Prior Publication Data
US 2020/0215449 A1    Jul. 9, 2020

Related U.S. Application Data

(60) Provisional application No. 62/535,096, filed on Jul. 20, 2017, provisional application No. 62/688,517, filed on Jun. 22, 2018.

(51) Int. Cl.
*A63H 33/30* (2006.01)
*A63H 3/52* (2006.01)
(Continued)

(52) U.S. Cl.
CPC ............ *A63H 33/008* (2013.01); *F16C 11/04* (2013.01); *A63B 2208/12* (2013.01);
(Continued)

(58) Field of Classification Search
CPC ....... E05D 7/0009; E05D 3/02; E05D 5/0223; E05D 5/023; E05D 5/0238; E05D 11/10;
(Continued)

(56) References Cited

U.S. PATENT DOCUMENTS 294,600 A * 3/1884 Evesson .................. E04B 2/827
52/64
305,260 A * 9/1884 Wolf .................... E05D 11/1014
16/332
(Continued)

FOREIGN PATENT DOCUMENTS

CA    2174150    10/1997
DE    19918248   10/2000
(Continued)

OTHER PUBLICATIONS

Foreign communication from a related counterpart application—International Preliminary Report on Patentability, PCT/US2018/043124 dated Jan. 30, 2020, 14 pages.
Foreign communication from a related counterpart application—International Search Report and Written Opinion, PCT/US2018/043124 dated Oct. 29, 2018, 15 pages.
(Continued)

*Primary Examiner* — Eugene L Kim
*Assistant Examiner* — Matthew B Stanczak
(74) *Attorney, Agent, or Firm* — Jackson Walker LLP

(57) ABSTRACT

Embodiments may relate to a foldable play structure which may be easily assembled and which may be form of four or more panels each connected to another to provide an accordion fold structure; corner hinges comprising a first hinge portion attached to one panel of the at least four panels; a second hinge portion attached to another panel of the at least four panels; and a fastener configured to be retained within either the first portion or the second portion; and mid-wall hinge(s) attached to two of the panels and located between the corner hinges. Typically, in a first configuration, the panels of the accordion fold structure are folded to be (Continued)

US 11,135,525 B2

Page 2 stacked in substantially parallel planes, and in a second configuration, the panels are unfolded forming a play structure. The retained fastener may be used to secure the corner panels together.

18 Claims, 31 Drawing Sheets

(51) Int. Cl.
  *A63H 33/00* (2006.01)
  *F16C 11/04* (2006.01)
  *A63H 33/04* (2006.01)
  *E04B 1/343* (2006.01)
  *E04B 1/344* (2006.01)

(52) U.S. Cl.
  CPC .......... *A63H 33/044* (2013.01); *E04B 1/3445* (2013.01); *E04B 1/34321* (2013.01)

(58) Field of Classification Search
  CPC ............... E05D 11/105; E05D 11/1007; E05D 11/1014; E05D 11/1028; Y10T 292/1099; Y10T 292/17; Y10T 16/5406; Y10T 16/5402; Y10T 16/5407; Y10T 16/54024; Y10T 16/540247; Y10T 16/54; Y10T 16/559
  USPC ........... 119/499; 16/254–264, 349, 388, 137, 16/141, 332; 52/79.5, 79.1; 411/107; 292/300
  See application file for complete search history.

(56) References Cited

U.S. PATENT DOCUMENTS

| | | | | |
|---|---|---|---|---|
| 307,593 A * | 11/1884 | Robinson | E05D 11/1007 | 16/326 |
| 324,444 A * | 8/1885 | Wolf | F25D 23/028 | 16/322 |
| 889,834 A * | 6/1908 | Waters | E05D 11/1007 | 16/344 |
| 980,686 A * | 1/1911 | Shine | E05D 11/1014 | 16/332 |
| 1,248,854 A * | 12/1917 | Henderson | E05D 11/1007 | 16/347 |
| 1,282,685 A * | 10/1918 | Goldhahn | E06B 3/485 | 160/229.1 |
| 1,603,409 A * | 10/1926 | Rickenbacher | E05C 17/38 | 16/332 |
| 1,758,309 A * | 5/1930 | Block | E05D 11/1007 | 16/332 |
| 1,950,742 A * | 3/1934 | Olivier | B60J 7/00 | 296/150 |
| 2,215,606 A * | 9/1940 | Dunn | E05D 3/16 | 180/69.21 |
| 2,594,533 A * | 4/1952 | Baker | E05D 11/1064 | 16/326 |
| 2,620,509 A * | 12/1952 | Keating | E05D 3/022 | 16/292 |
| 2,797,432 A * | 7/1957 | Gakle | E05D 11/0027 | 16/388 |
| 2,831,520 A * | 4/1958 | Clarke | F16B 41/002 | 411/349 |
| 3,018,127 A * | 1/1962 | Dobrosielski | F16J 13/18 | 292/251 |
| 3,231,942 A | 2/1966 | O'Brien | | |
| 3,448,486 A * | 6/1969 | Wright | E05D 11/00 | 16/324 |
| 3,608,221 A * | 9/1971 | Harris | G09F 1/12 | 40/605 |
| 3,628,217 A * | 12/1971 | Schaber | E05F 3/20 | 16/292 |
| 3,653,702 A * | 4/1972 | Frimberger | H01H 9/226 | 292/251 |
| 3,709,237 A * | 1/1973 | Smith | E04H 1/1244 | 135/87 |
| 3,969,788 A * | 7/1976 | McCullough | E05D 11/1007 | 16/326 |
| 4,210,979 A * | 7/1980 | Boyd | E05D 11/1014 | 16/327 |
| RE30,777 E * | 10/1981 | Ytter | A47G 5/00 | 160/135 |
| 4,436,135 A * | 3/1984 | Ytter | G09F 15/0068 | 160/135 |
| 4,474,264 A * | 10/1984 | Krause | E06C 1/32 | 182/163 |
| 4,602,889 A * | 7/1986 | Mu-Shan | E06C 1/32 | 16/326 |
| 4,640,052 A * | 2/1987 | Zebedee | E05D 11/0018 | 49/383 |
| 4,780,929 A * | 11/1988 | Burns | A63C 5/02 | 16/343 |
| 4,823,510 A * | 4/1989 | Amos | E05D 11/0027 | 292/DIG. 17 |
| 4,840,288 A * | 6/1989 | Lunderman | A45C 11/24 | 206/235 |
| 4,877,364 A * | 10/1989 | Sorrentino | F16B 5/0275 | 411/337 |
| 4,964,249 A | 10/1990 | Payne | | |
| 5,044,044 A * | 9/1991 | Young | A63C 5/02 | 16/323 |
| 5,059,075 A * | 10/1991 | Kelly | F16B 41/002 | 411/107 |
| 5,251,359 A * | 10/1993 | Finkl | E05D 11/06 | 16/348 |
| 5,265,922 A * | 11/1993 | Falcone | E05C 17/025 | 16/375 |
| 5,530,993 A * | 7/1996 | Hayakawa | E05D 11/1014 | 16/332 |
| 5,630,302 A * | 5/1997 | Rosenband | E04H 1/1266 | 52/204.1 |
| 5,711,053 A * | 1/1998 | Hafner | E05D 5/128 | 16/380 |
| 5,727,502 A * | 3/1998 | Askins | A01K 1/033 | 119/499 |
| 5,887,316 A * | 3/1999 | Ferrari | E05D 7/0423 | 16/238 |
| 5,950,568 A | 9/1999 | Axelrod et al. | | |
| 6,074,146 A * | 6/2000 | Soemer | F16B 5/0208 | 411/107 |
| 6,151,852 A * | 11/2000 | Linn | E04H 17/163 | 256/24 |
| 6,299,011 B1 * | 10/2001 | Rosenfeldt | B65D 9/38 | 16/388 |
| 6,428,061 B1 * | 8/2002 | Daoud | E05C 5/04 | 292/251 |
| 6,574,836 B1 * | 6/2003 | Steeber | E05C 17/045 | 16/337 |
| 6,829,808 B2 * | 12/2004 | Neukotter | E05D 3/186 | 16/366 |
| 8,235,008 B2 * | 8/2012 | Axelrod | A01K 1/033 | 119/499 |
| 8,407,946 B1 | 4/2013 | Aaron | | |
| 8,695,284 B2 * | 4/2014 | Ho | E04H 1/125 | 52/64 |
| 8,955,194 B2 * | 2/2015 | Teta | E05F 1/1207 | 16/48.5 |
| 9,316,017 B1 * | 4/2016 | Slaughter | E04H 15/001 | |
| 9,920,558 B1 * | 3/2018 | Chou | E05D 3/06 | |
| 10,065,763 B2 * | 9/2018 | Wilcox | B65D 21/0201 | |
| 10,357,016 B1 * | 7/2019 | Dietz | A01K 1/0017 | |
| 10,687,510 B2 * | 6/2020 | Lu | A01K 1/034 | |
| 2003/0140573 A1 * | 7/2003 | Marcinkowski | E04B 1/34321 | 52/79.5 |
| 2005/0108955 A1 * | 5/2005 | Howe | E04H 1/1205 | 52/79.5 |
| 2005/0145192 A1 * | 7/2005 | Axelrod | A01K 1/033 | 119/499 |

(56) References Cited

U.S. PATENT DOCUMENTS

| | | | |
|---|---|---|---|
| 2005/0229866 A1* | 10/2005 | Simpson | A01K 1/0254 |
| | | | 119/499 |
| 2005/0279034 A1* | 12/2005 | Tsang | E04B 1/343 |
| | | | 52/79.1 |
| 2006/0107903 A1* | 5/2006 | Jin | A01K 1/033 |
| | | | 119/499 |
| 2007/0224912 A1 | 9/2007 | Hughes | |
| 2010/0213317 A1* | 8/2010 | Wagner | E05D 3/12 |
| | | | 244/129.5 |
| 2012/0186166 A1* | 7/2012 | Casto | E04B 1/3445 |
| | | | 52/79.5 |
| 2014/0315651 A1 | 10/2014 | Meister et al. | |
| 2016/0272364 A1* | 9/2016 | Jian | B65D 21/086 |
| 2016/0273251 A1* | 9/2016 | Malott | E05D 5/04 |
| 2019/0169904 A1* | 6/2019 | Hu | E05F 3/20 |

FOREIGN PATENT DOCUMENTS

| | | |
|---|---|---|
| KR | 200439092 Y1 | 3/2009 |
| WO | 2016174556 A1 | 11/2016 |
| WO | 2019018789 A1 | 1/2019 |

OTHER PUBLICATIONS

Filing Receipt and Specification for patent application entitled "Super fold playhouse," by Frederick Rieber, filed Jul. 20, 2017 as U.S. Appl. No. 62/535,096.

Filing Receipt and Specification for patent application entitled "Easy Up Assembly Device," by Frederick M. Rieber, filed Jun. 22, 2018 as U.S. Appl. No. 62/688,517.

Extended European Search Report dated Mar. 18, 2021 from the European Patent Office for co-pending EP 18836212.3, 8 pages.

* cited by examiner

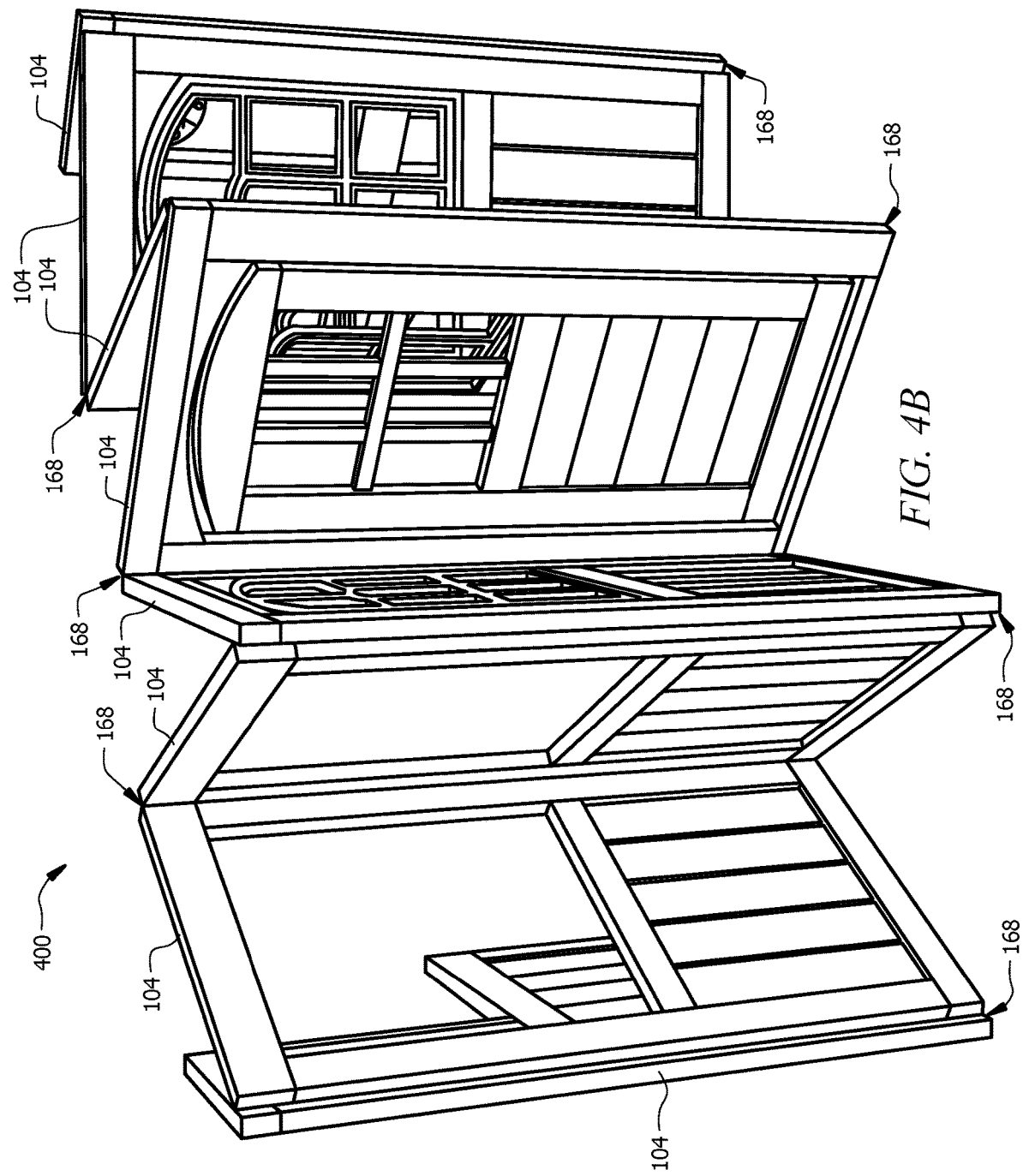

ACCORDION FOLD PLAY STRUCTURE WITH EASY-UP ASSEMBLY DEVICE

CROSS-REFERENCE TO RELATED APPLICATIONS

This application is a filing under 35 U.S.C. 371 of International Application No. PCT/US2018/043124 filed Jul. 20, 2018, entitled "Accordion Fold Play Structure with Easy-Up Assembly Device," claiming priority of U.S. Provisional Patent Application Ser. Nos. 62/535,096 filed Jul. 20, 2017, entitled "Super Fold Playhouse," and 62/688,517 filed Jun. 22, 2018, entitled "Easy Up Assembly Device," which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Typical children's play structures (including play houses, play tables, and/or play stations) may be sold to consumers at least partially disassembled and contained within a box or packaging. The play structures may then be assembled by the user, using the parts and instructions associated with the play structure.

SUMMARY

In an embodiment, a foldable play structure may comprise at least four panels each connected to another to provide an accordion fold structure; at least two corner hinges comprising a first hinge portion attached to one panel of the at least four panels, wherein the first hinge portion comprises a first through-hole; a second hinge portion attached to another panel of the at least four panels, wherein the second hinge portion comprises a second through-hole; and a fastener configured to be retained within either the first portion or the second portion, wherein the first and second through-holes are sized for interaction with the fastener; and at least one mid-wall hinge attached to two of the at least four panels and located between the at least two corner hinges; wherein the accordion fold play structure comprises two configurations, wherein in a first configuration, the at least four panels of the accordion fold structure are folded to be stacked in substantially parallel planes, and for each corner hinge the first hinge portion is perpendicular to the second hinge portion, and wherein in a second configuration, the at least four panels are unfolded forming a play structure, the panels attached to each corner hinge are perpendicular to each other, for each corner hinge the first hinge portion is parallel to the second hinge portion, and the first through-hole aligns with the second through-hole.

In an embodiment, a corner hinge for use in an accordion fold structure may comprise a first hinge portion configured to attach to a first panel of the accordion fold structure; a second hinge portion configured to attach to a second panel of the accordion fold structure; a pivot portion attaching the first hinge portion to the second hinge portion, wherein the first hinge portion and the second hinge portion are configured to rotate with respect to each other about the pivot portion; a fastener configured to be retained within the corner hinge, in a first configuration, and configured to attach the first panel to the second panel, in a second configuration; and a retaining feature configured to retain the fastener within the corner hinge while in the first configuration, without interfering with the ability of the fastener to pass through both hinge portions in the second configuration, wherein in the first configuration of the hinge, the first panel is parallel to the second panel, and the first hinge portion is perpendicular to the second hinge portion, wherein in the second configuration of the corner hinge, the first panel is perpendicular to the second panel, and the first hinge portion is parallel to the second hinge portion, and wherein in a third configuration, the fastener attaches the first and second panels by passing through a receiving hole in the second panel, two through-holes in the first and second hinge portions and into the first and second panels, rigidly locking the panels into the second configuration.

In an embodiment, a method of assembling a play structure may comprise providing a play structure with an accordion fold structure comprising a plurality of panels each connected to another, and at least two corner hinges each attached to two panels of the accordion fold structure, and a fastener configured to be retained within the corner hinge; orienting the playhouse so that a bottom edge of each panel is located on the ground in a first configuration of the accordion fold structure, wherein in the first configuration, the plurality of panels are folded to be stacked in substantially parallel planes; unfolding the playhouse from the first configuration to a second configuration of the accordion fold structure, wherein in the second configuration, the plurality of panels are unfolded forming a playhouse; and attaching the two panels joined by each corner hinge to each other with the fastener.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 4B illustrates a foldable playhouse about 60% folded, according to an embodiment of the disclosure.

DETAILED DESCRIPTION

Figure 1:
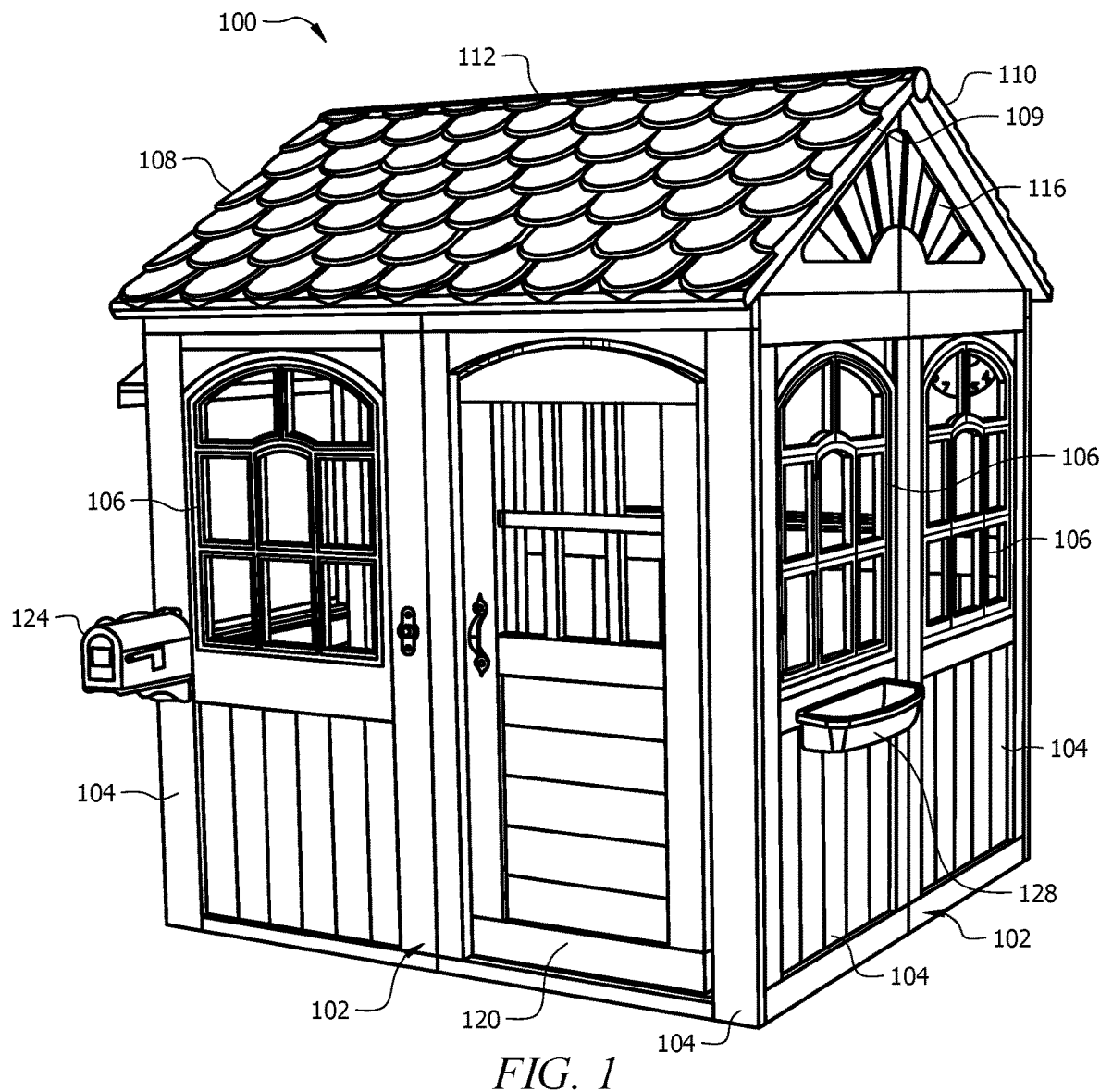
FIG. 1 illustrates a front view of a foldable playhouse, according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field (for example, ±10%); and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the present disclosure relate to structures which may be used as playhouses, play stations, and/or play tables that are designed to be foldable, and therefore may be easily and compactly packaged and stored, and/or easily set up by an end user and fully assembly with relative speed and ease.

The present disclosure relates to foldable buildings, structures, play stations and/or play table, which, when fully folded, occupy less space as it may be needed for storage and/or shipping and handling. Traditionally, many of the structures which provide a "playhouse" or other play structure environment for children are bulky with respect to the space needed for storage and/or shipping and handling, and/or the structures can comprise many small pieces which require substantial time to assemble. Where a structure may require less space or fewer pieces to assemble, the result is often a sacrifice of the decorative touches that both functionally and aesthetically enhance the playtime experience. The disclosed structure embodiments have an accordion fold feature to the walls, which decreases the space needed during storage, shipping, and stocking at retail stores. Additionally, embodiments may comprises a foldable, expandable top surface or structure (e.g., a self-expanding gable roof, a foldable or split top play surface, etc.) which provides both functional and aesthetic value to the structure without adding assembly time.

Disclosed are descriptions of exemplary foldable structure embodiments which may be used as playhouses, play stations, and/or play tables. The described structures are foldable and may therefore be compactly packaged and easily assembled, as illustrated in the disclosed embodiments. The described structures provide for both walls that are foldable onto themselves and collectively together, and self-expanding top surface(s) (e.g. gables for the roof structure, and/or a top play surface), which additionally aid in easy assembly. The described systems provide for compactly packaged structures, which are optimized for shipping and handling.

Provided in the present disclosure are interconnected wall panels that are foldable. All (or at least some) of the wall panels of the structure are connected to each other through hinges (e.g., with each wall panel attached to at least one other wall panel via one or more hinges). Typically, each wall would comprise two or more panels, although in some embodiments, one or more wall might be a single unified panel, while at least one wall (and typically at least two walls) would be formed of multiple panels.

In one embodiment, at least one (and up to three) of the disclosed walls have hinges at their centers (e.g., each formed of two panels), with a fourth wall being split in two with its two pieces/panels being at either end of a super folded stack (e.g., the fourth wall configured to be formed of two end panels oriented end-to-end to jointly form the fourth wall). The walls may fold down into a compact package that is optimized for storage and for shipping and handling. Additionally, provided in the present disclosure is an expandable roof with self-expanding gables, coupled in such a way that the roof and the gables will expand together (e.g., without the need for tools and/or additional elements to be attached) and the now-expanded assembly fits on top of the now-unfolded foldable structure.

In another embodiment, two (opposing) walls may have hinges at their centers (e.g., each formed of two panels), while the other two (opposing) walls may comprise a single panel, wherein the hinged walls may fold to allow the other two walls to fold/collapse toward one another (e.g., in a substantially flat folded configuration). The walls may fold down into a compact package that is optimized for storage and for shipping and handling. Additionally, the structure may comprise a foldable, expandable top play surface, configured to unfold and fit on top of the now-unfolded play structure.

In some embodiments, the hinges or joints used to attach the panels of the play structure may comprise systems, apparatuses, and methods relating to transit/transportation and/or assembly methods that are easy and quick, provide storage and identification of necessary hardware, eliminate the need for a helper or "extra set of hands", and/or provide an attachment method that is structurally reliable for the application.

Typically, wall panels and methods of attaching wall panels to one another used within the consumer playset industry are fundamental in their application in that they are attached to each other using conventional wood screws, lags, or bolt and threaded hardware such as a hex nut, barrel nut, or T-nut. These conventional building or assembly methods have limitations relative to consumer ease and speed of assembly, especially for home do-it yourself applications (in which inexperienced customers perform assembly themselves). Consumers typically struggle in identifying the correct hardware per assembly activity (e.g., matching the right bolt with the right hole and the right nut). Once the correct hardware is identified, consumers often struggle with the physical task of assembly, often times needing a second person (or "extra set of hands") to perform the task (for example, with one person holding the panels in place while the second person makes the connection). Lastly, conventional storage of hardware (such as marked polybags) makes identification of individual hardware difficult and can lead to lost pieces during product assembly (for example, as loose pieces are spread out during assembly.

Disclosed embodiments may address one or more of these issues in a way that can improve and/or simplify the assembly process. Embodiments of the disclosure comprise an assembly device and/or structures including such an assembly device configured to simplify the assembly method for the consumer, along with methods of making and using the same. An assembly device may comprise one or more hinge component (or other pivotal attachment element), and at least one fastener (or attachment) element held within the hinge component (e.g. in its initial state, before being used to fasten any panels or other planar support elements, for example during storage and/or transport). The fastener may comprise a securing element, a screw, a bolt, a bar, a rod, a pin, or another similar fastening element. The fastener may be held in place within the hinge by a retaining element/ feature, which may be a separate element in some embodiments or may be a feature of the hinge and/or the fastener in other embodiments. And in some embodiments may further comprise a nut and/or predrilled pilot hole (which may be located within the hinge before use) for rigid and secure attachment of two planar support elements by the fastener.

The assembly device (e.g., comprising a pivotal attachment element and a fastener) may be attached to two planar support elements, which may be pivotally attached to one another via the assembly device, and may pivot between a first position (or configuration) and a second position (or configuration). The pivotal attachment element (e.g., hinge) comprises a pivot section, a first hinge portion and a second hinge portion on either side of the pivot section and configured to pivot with respect to one another about the pivot section, with the first portion attached to (an edge of) the first planar support element (e.g., a first panel), the second portion attached to (an inner surface of) the second planar support element (e.g., a second panel) (e.g., in proximity to an edge of the second planar support element). Typically, the first hinge portion and the second hinge portion may comprise through-holes that align with one another when the first hinge portion (facially) contacts the second hinge portion (and both through-holes are typically configured to allow the fastener to pass through when securely attaching the two panels together).

In some embodiments, the structure may be placed in a plurality of positions or configurations. In a first position/ configuration of the structure (which might be when panels are folded into stacked substantially parallel planes), the first planar support element may be parallel to the second planar support element (e.g. with a face of the first planar support element contacting a face of the second planar support element), and the first (hinge) portion may be perpendicular to the second (hinge) portion. In a second position/configuration of the structure (which might be when a corner joint of the panels are unfolded into final form as the structure/ playhouse with ultimately be used) the first planar support element may be perpendicular to the second planar support element (e.g., with an edge of the first planar support element contacting the face of the second pivotal support element), and the first (hinge) portion may be parallel to the second (hinge) portion. In some embodiments, the fastener is configured to be retained within the pivotal attachment element in the first position and/or the second position (e.g., while allowing unfolding movement from the first to the second configuration/position). In a third position/configuration of the structure, the fastener may be configured to extend through and fixedly (rigidly) attach the first planar support element to the second planar support element (when oriented as described in the second position).

In some embodiments, the first (hinge) portion may be attached to a first edge of the first planar support element, and wherein the second (hinge) portion may be attached to a first face of the second planar support element (e.g., in proximity to a first edge of the second planar support element, with the first (hinge) portion spaced from the first edge of the second planar support element an amount approximately equal to the width of the first edge of the first planar support element, so that in the second position, the first edge of the second planar support element may be flush with a second face of the first planar support element).

In some embodiments, the first planar support element comprises a mating fastener locking element/mechanism (e.g., a nut, predrilled hole, guide hole) within/adjacent to a first through-hole which corresponds to the fastener (e.g. bolt, screw) and is aligned in the second position with the fastener and through-holes, wherein as the fastener is driven to the third position, it tightens on the mating fastener locking element/mechanism to lock/secure the two planar support elements rigidly together. In the first position, the mating fastener locking element/mechanism may be retained in first planar support element, e.g., during storage and transport (e.g., the fastener and the nut are retained in place and pre-positioned before assembly).

The second planar support element may comprise a receiving hole, wherein the receiving hole may comprise a counter-drilled (or counter-bore, or counter-sink) section configured to fit the shape of the fastener and allow the fastener to be completely recessed within the thickness of the second planar support element (e.g., in the first and/or second positions).

In some embodiments, the fastener is retained within the second through-hole in the first position (e.g. the structure further comprising a retaining element or feature configured to retain the fastener in place within the second (hinge) portion and/or the second planar support element in the first position (without passing through the first through-hole and/or connection/attaching to the first planar support element) while allowing the fastener to automatically align with and pass through both the first and second through-holes in the second position and/or third position). Typically, the hinge (pivotal attachment element) is a temporary fixture, not designed with strength to serve as long-term attachment between planar support elements when structural device is in long-term use, just as a temporary positioner or "extra set of hands."

The assembly device could be used with multiple panels (e.g., planar support elements), different types of hinges, a corner structure, an accordion style structure, and/or other structure elements. The assembly device may be self-supporting (e.g. two panels joined by the assembly device may self-support and/or stand upright without external support when positioned for assembly) and self-aligning (e.g. aligning holes in the pivotal attachment element and/or planar support element), wherein attaching the planar support elements via the assembly device can be done entirely with only one person. The assembly device may retain the fastener in place (e.g. during storage and/or transport) so that a customer does not have to find the appropriate hardware, and the assembly device may (automatically) position the planar support elements (e.g., panels) and/or the fastener for final assembly (e.g. aligning for attachment when in the second position). The self-supporting system may allow a user to easily place the system into a different positions, possibly without the help of another person. In some embodiments, the corner hinges of an accordion style structure (e.g., accordion fold structure of multiple panels each joined to another by at least one hinge) might be configured in accordance with and/or incorporate such as assembly device (e.g., with retained fastener).

Referring now to the figures, FIG. 1 illustrates a front view of one embodiment of a foldable structure, which may comprise a foldable playhouse 100. The disclosed playhouse 100 comprises foldable walls 102 made up of one or more panels 104 (for example, four walls in this exemplary embodiment). As illustrated in FIG. 1, a specific embodiment of the playhouse 100 may comprise four walls 102, however other embodiments may comprise three walls 102, or five walls 102, or greater than five walls 102. At least some of the foldable walls 102 of the playhouse 100 are interconnected, which thereby provides for more efficient packaging and assembly. The walls 102 may comprise one or more panels 104 (for example connected by hinges to allow folding/unfolding of the walls 102 and the panels may comprise fixed or moveable elements which may be similar in appearance and/or function to a door 120 or window, or other moveable or fixed object. In a specific embodiment, a panel 104 comprises a door 120.

The disclosed playhouse 100 may additionally comprise a roof 108. In some embodiments, the roof 108 may comprise individual panels 109 and 110, which may be connected through a single hinge or multiple hinges 112. The number of hinges 112 may be one, or two, or three, or four, or more than four. As illustrated in FIG. 1, a specific embodiment of the playhouse 100 comprises a roof 108 that comprises two panels 109 and 110, which are connected through hinges 112. In other embodiments, the number of panels comprising the roof 108 may be one, or three, or four, or greater than four.

Further, the disclosed playhouse 100 may comprise one or more gables 116. As illustrated in FIG. 1, a specific embodiment of a playhouse 100 may comprise two gables 116, and they may be located on opposing sides of the playhouse 100 (e.g., opposite sides of the roof 108). Other embodiments are contemplated wherein the number of gables 116 may be one, or three, or four, or more than four.

Figure 2:
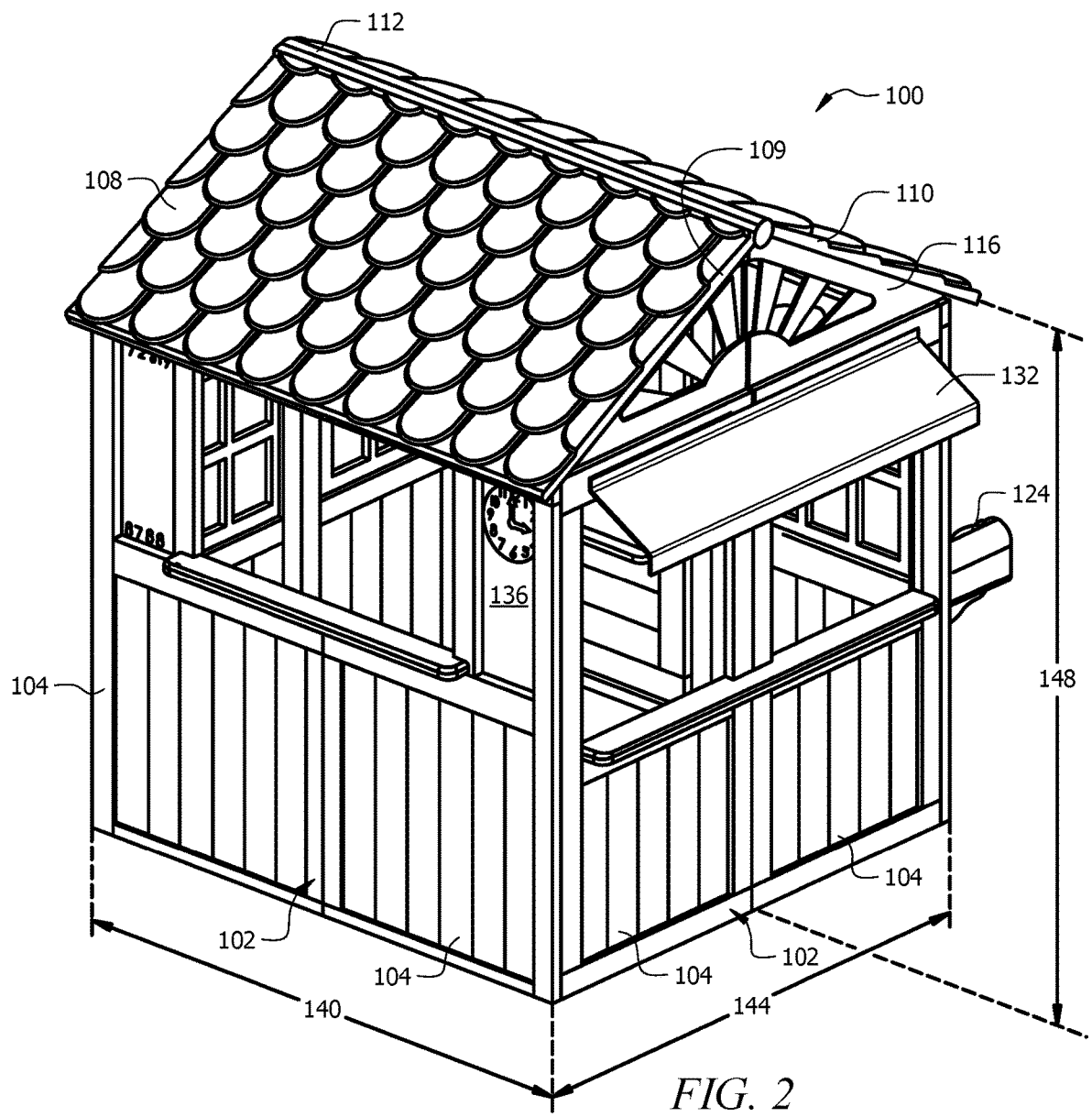
FIG. 2 illustrates from another angle a fully assembled foldable playhouse, according to an embodiment of the disclosure.

The disclosed playhouse 100 may also comprise accessories, which may be either functional or decorative, or both functional and decorative. In a specific embodiment, illustrated in FIG. 1, a playhouse 100 may comprise a mailbox 124 and/or a flower basket 128. As seen in FIGS. 1 and 2, additional accessories may include, without being limited to, alone or in any combination, a canopy 132, a wall clock 136, or other accessory. In embodiments which include a canopy 132, the canopy 132 may comprise vinyl or similar material. The canopy 132 may be mounted with a support line or similar structure, and the support line may be comprised of steel or similar material. As will be further discussed below, the canopy can further provide lateral structural support to the foldable panel 104 to keep it from folding once the playhouse 100 has been assembled and the foldable panels 104 have been unfolded so as to provide straight, opposing walls. Accessories may be fashioned from the same material as the playhouse 100 and may, in some embodiments, be an integral feature of an element (i.e., wall clock 136, roof 108, etc.), e.g., fashioned as a single unit. Alternatively and/or additionally, accessories may be either permanently affixed to the playhouse or may be detachable. The accessories described herein are meant to be exemplary; other accessories, or no accessories, may be used. In certain described embodiments, the accessories may provide additional structural support in an assembled playhouse 100.

Referring now to FIG. 2, the assembled foldable playhouse 100 may comprise specific dimensions or ratios of dimensions. In the embodiment illustrated in FIG. 2, a length 140, a width 144, and a height 148 for the overall dimensions are indicated. The values assigned to length 140, width 144, and height 148 in FIG. 2 are just one possible example of a set of measurements and should not be construed to be limiting. In some embodiments, a playhouse 100 may have a length 140 of about 1.06 meter (m), or about 1.10 m, or about 1.14 m, or about 1.18 m, or about 1.20 m, or about 1.22 m, or about 1.26 m, or about 1.30 m, where "about" represents plus or minus 0.02 m. A playhouse 100 may have a width 144 of about 1.01 m, or about 1.05 m, or about 1.09 m, or about 1.13 m, or about 1.15 m, or about 1.17 m, or about 1.21 m, or about 1.25 m, where "about" represents plus or minus 0.02 m. A playhouse 100 may have a height of about 1.33 m, or about 1.37 m, or about 1.41 m, or about 1.45 m, or about 1.49 m, or about 1.53 m, or about 1.57 m, where "about" represents plus or minus 0.02 m.

As will be further described below, because the panels 104 are foldable, the disclosed designs allow for the playhouse to be compactly packaged and easily assembled. The specific embodiment of a foldable playhouse 100 illustrated in FIG. 2 may additionally comprise panels 104, a roof 108, roof hinges 112, gable 116, mailbox 124, flower basket 128, canopy 132, and a wall clock 136.

Figure 3:
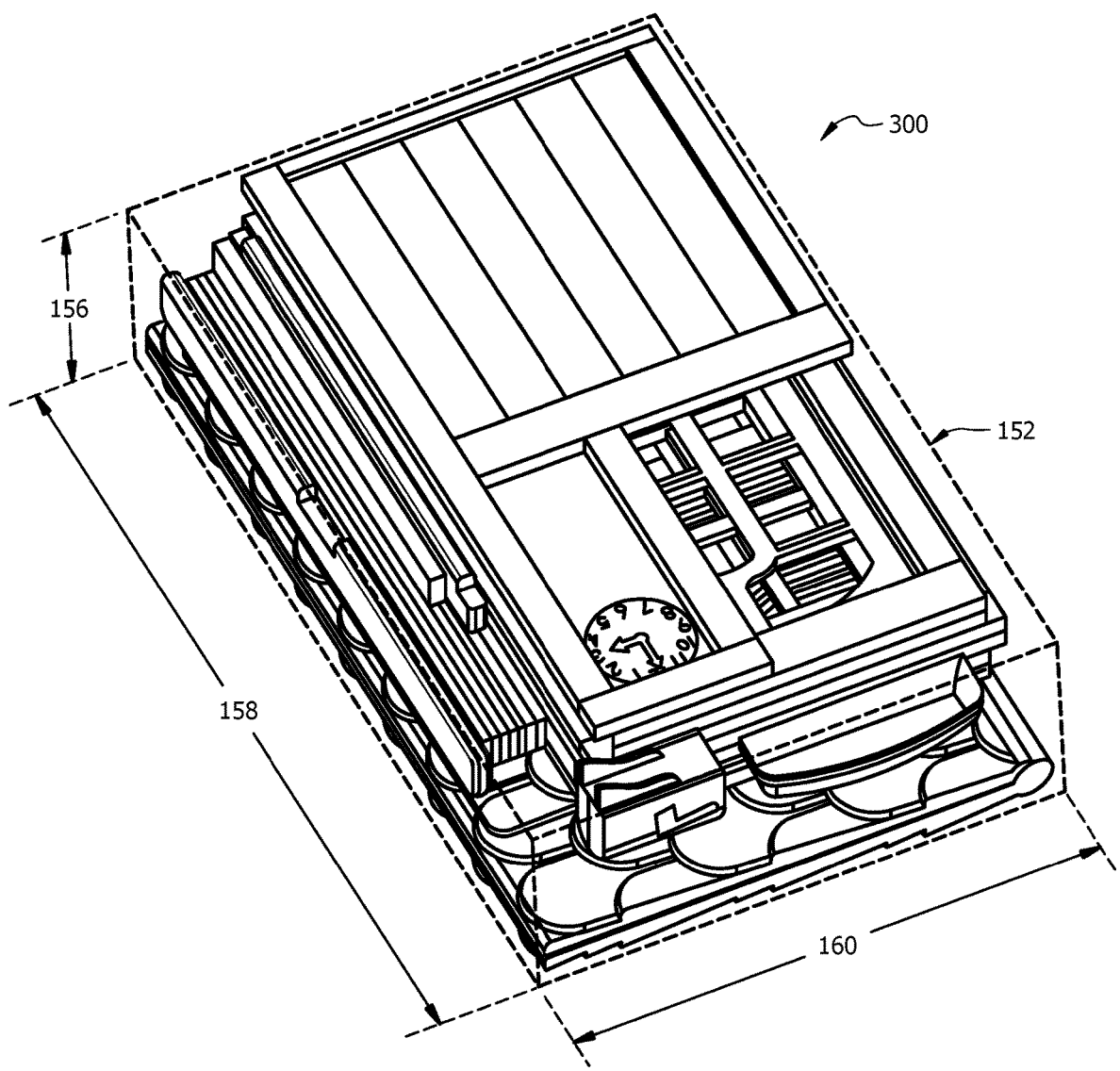
FIG. 3 illustrates a packaging scheme for a foldable playhouse in folded configuration, according to an embodiment of the disclosure.

FIG. 3 illustrates a packaged foldable playhouse 300. In some embodiments, a playhouse 300 may be packaged in any manner and/or style of packaging that is readily known to one who is skilled in the art. In a specific embodiment, illustrated in FIG. 3, a playhouse 300 may be packaged in a box 152 (shown as transparent to illustrate interaction with components of playhouse located therein). Packaging may include all or some of the elements of the playhouse 300. In a specific embodiment, the box 152 may contain every element of playhouse 300. The box 152 may have a box height 156, a box length 158, and a box width 160. The values assigned to box height 156, box length 158, and box width 160 in FIG. 3 are just one possible example of a set of measurements and should not be construed to be limiting. In some embodiments, the box 152 may have a box length 158 of between about 0.5 m and 3 m. In some embodiments, the box 152 may have a box width 160 of between about 0.5 m and 1.5 m. In some embodiments, the box 152 may have a box height 156 of between about 0.5 m and 1.5 m. In some embodiments, a box width 160 of 0.762 m (i.e., 30 inches) may be chosen to comply with global shipping dimensions. A box length 158 of 1.2246 m (i.e., 49 inches) may be chosen in order for box 152 to fit on a standard gondola of a supermarket or other retail store, e.g., Walmart and the like. The foldable playhouse 300 folds neatly into a merchandisable box 152.

FIGS. 4A-4D illustrate an accordion fold structure 400 of panels 104 according to a specific embodiment. In some embodiments, folding elements, e.g., panels, may be connected by hinges 168. The number of hinges 168 may vary between different embodiments, and may be one, or two, or three, or four, or more than four hinges 168 between two panels. Additionally, type of hinge may vary between different embodiments. A hinge 168 may be a flush hinge, a knuckle hinge, a butt hinge, a T-hinge, a strap hinge, a gate hinge, a double-acting hinge, a Soss hinge, a continuous hinge, a lift-joint butt hinge, an ornamental hinge, or any other type and/or style of hinge as would be readily known to one who is skilled in the art. In a specific embodiment, illustrated in FIGS. 4A-4D, a hinge 168 may be a living hinge. In other embodiments, a hinge 168 may be a living hinge consisting of plastic. One advantage of using multiple folding elements (e.g., panels 104) connected through hinges 168 is that the storage and/or packaging space panels 104 require is considerably reduced (e.g., since walls may be collapsed into several smaller panels). In a specific example, as illustrated in FIGS. 4A-4D, using eight folding elements instead of four may cut the storage and/or packaging space required by panels 104 in half.

Figure 4A:
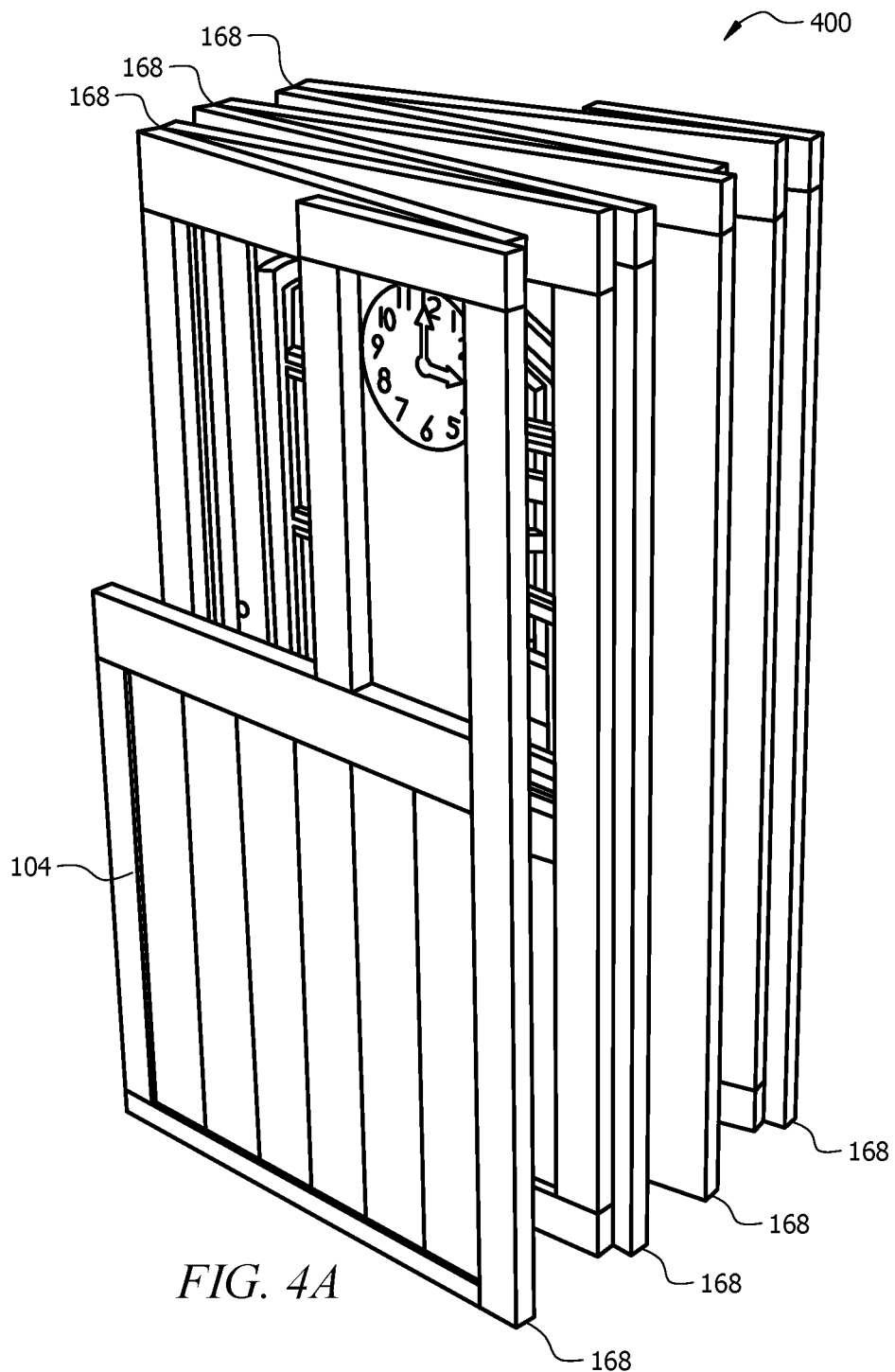
FIG. 4A illustrates a foldable playhouse about 80% folded, according to an embodiment of the disclosure.
Figure 4C:
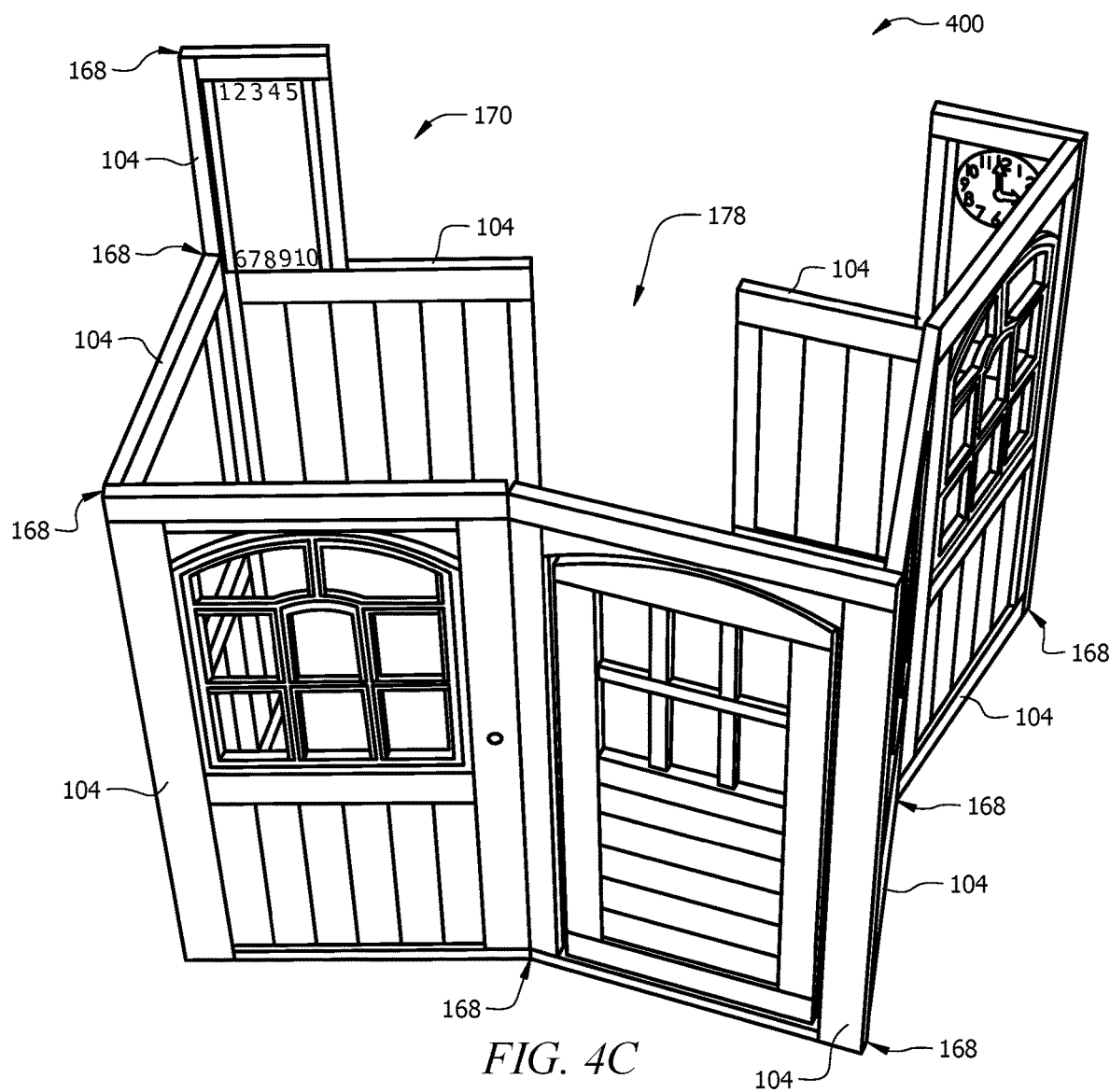
FIG. 4C illustrates a foldable playhouse with an accordion fold feature about 20% folded, according to an embodiment of the disclosure.

FIGS. 4A-4C illustrate the accordion fold structure 400 at various stages of folding of panels 104. A specific embodiment is shown at 80%, at 60%, and at 20% of a fully folded configuration in FIGS. 4A, 4B, and 4C, respectively. The specific embodiment illustrated in the above referenced figures comprises elements (e.g., panels 104) connected through hinges 168.

In some embodiments, and as illustrated in FIG. 4C, folding elements (e.g., panels 104) at either open end of an accordion fold structure 400 arrangement may connect when playhouse 100 is assembled (e.g., panels abut end-to-end or edge-to-edge to form the fourth wall). In a specific embodiment, illustrated in FIGS. 4C and 4D, the panels 104 may connect and close across the back side of the playhouse 100 at an opening gap 178 (which may be at or near a cafe opening 170 in this embodiment). In other embodiments, either open end of an accordion fold structure 400 arrangement may connect and close across the front end, and/or any of the sides of the of the assembled playhouse 100. The accordion fold structure 400 allows for ease of setup.

Figure 5:
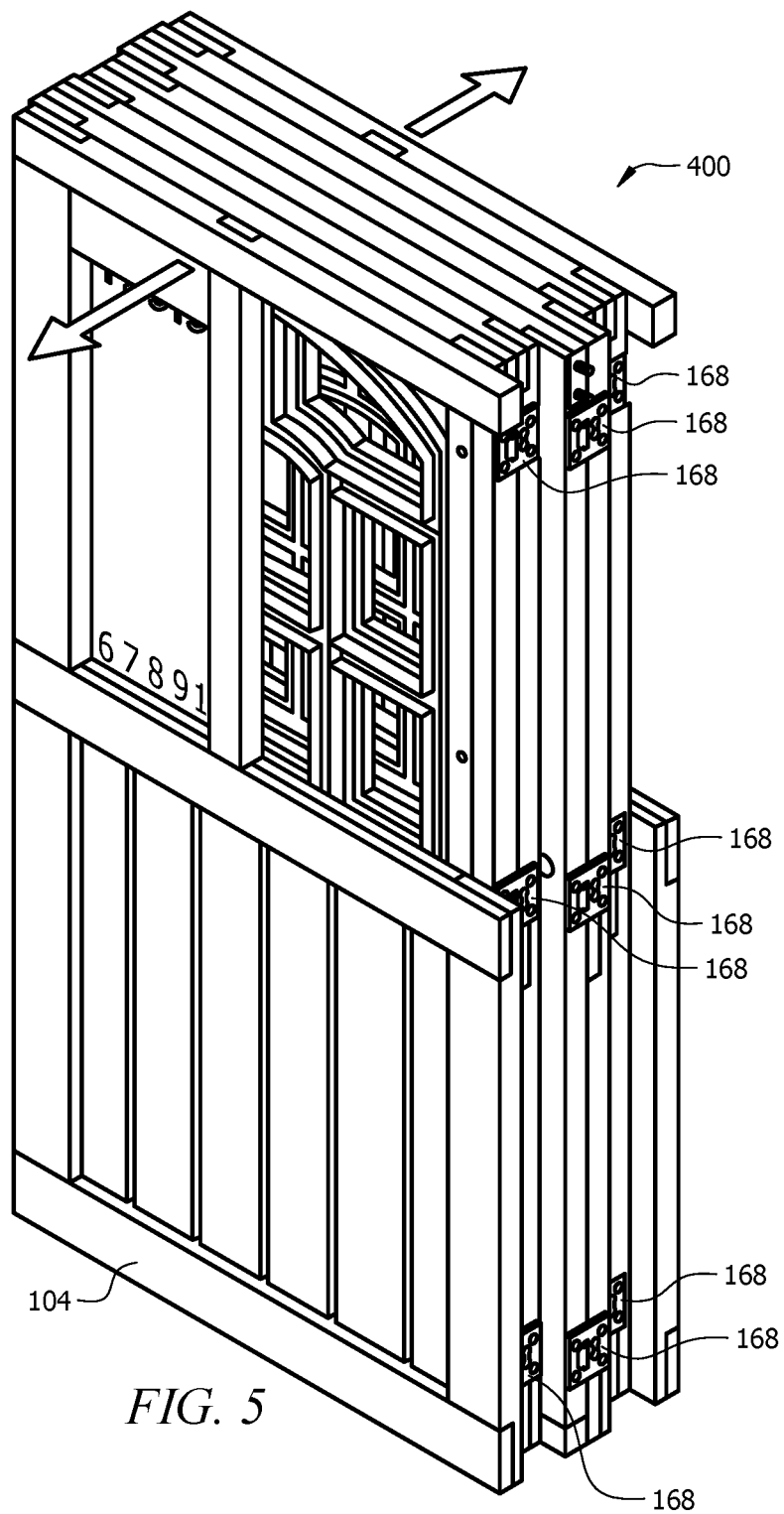
FIG. 5 illustrates a foldable playhouse in folded position, according to an embodiment of the disclosure.

FIG. 5 illustrates a folded accordion fold structure 400 (e.g., formed of a plurality of panels pivotally connected by hinges, with each panel connected to at least one other panel), where the hinges 168 comprise a plurality of living hinges attached to the panels 104. In the embodiment of FIG. 5, the hinges 168 may comprise three hinges spaced along the connection between the panels 104, optionally with one hinge located within the top half of the panel, one hinge located close to the middle of the panel, and one hinge located within a bottom half of the panel. FIG. 5 illustrates just one example of hinge placement, where any number of hinges may be used, where the hinge may cover a variety of lengths along the panels.

Figure 6:
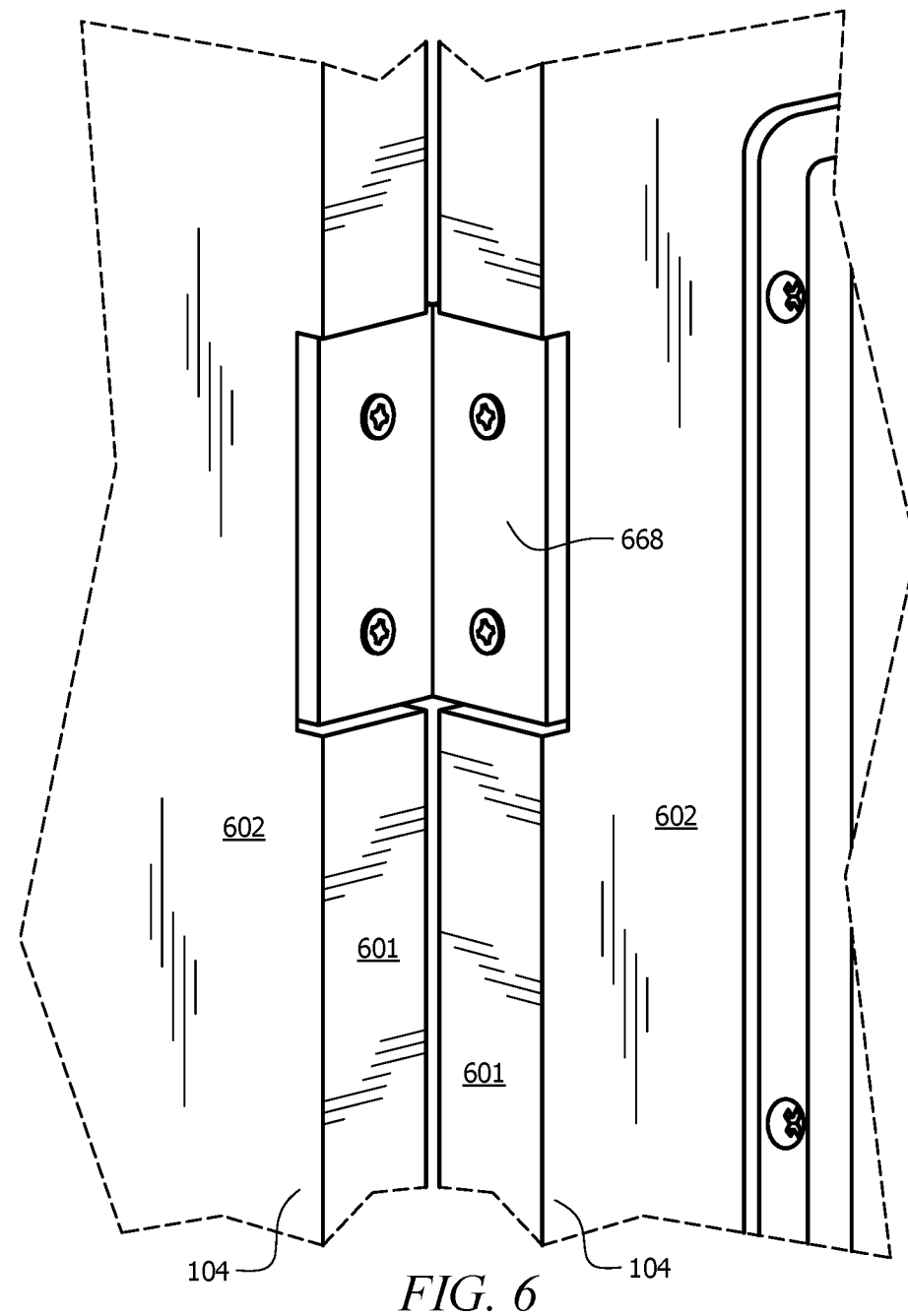
FIG. 6 illustrates a detailed view of a first hinge, according to an embodiment of the disclosure.

FIG. 6 shows a detailed view of a first hinge 668, which may comprise a mid-wall hinge, which may be positioned between two panels 104 and attached to the edges 601 of each of the panels 104. When completely unfolded, in the second configuration, the first hinge 668 may allow the edges 601 of the panels 104 to contact, and it may allow the faces 602 of the panels 104 to be flush with one another (e.g., forming a continuous wall plane), creating a larger wall or surface comprising the two panels 104 (e.g., a side surface of the final structure or playhouse). In other words, when folded, in the first configuration, the panels 104 attached to the mid-wall hinge 668 may be parallel and stacked into parallel planes with their faces contacting, and when unfolded, in the second configuration, the panels 104 attached to the mid-wall hinge 668 may be parallel in a continuous plane with their edges contacting.

Figure 7:
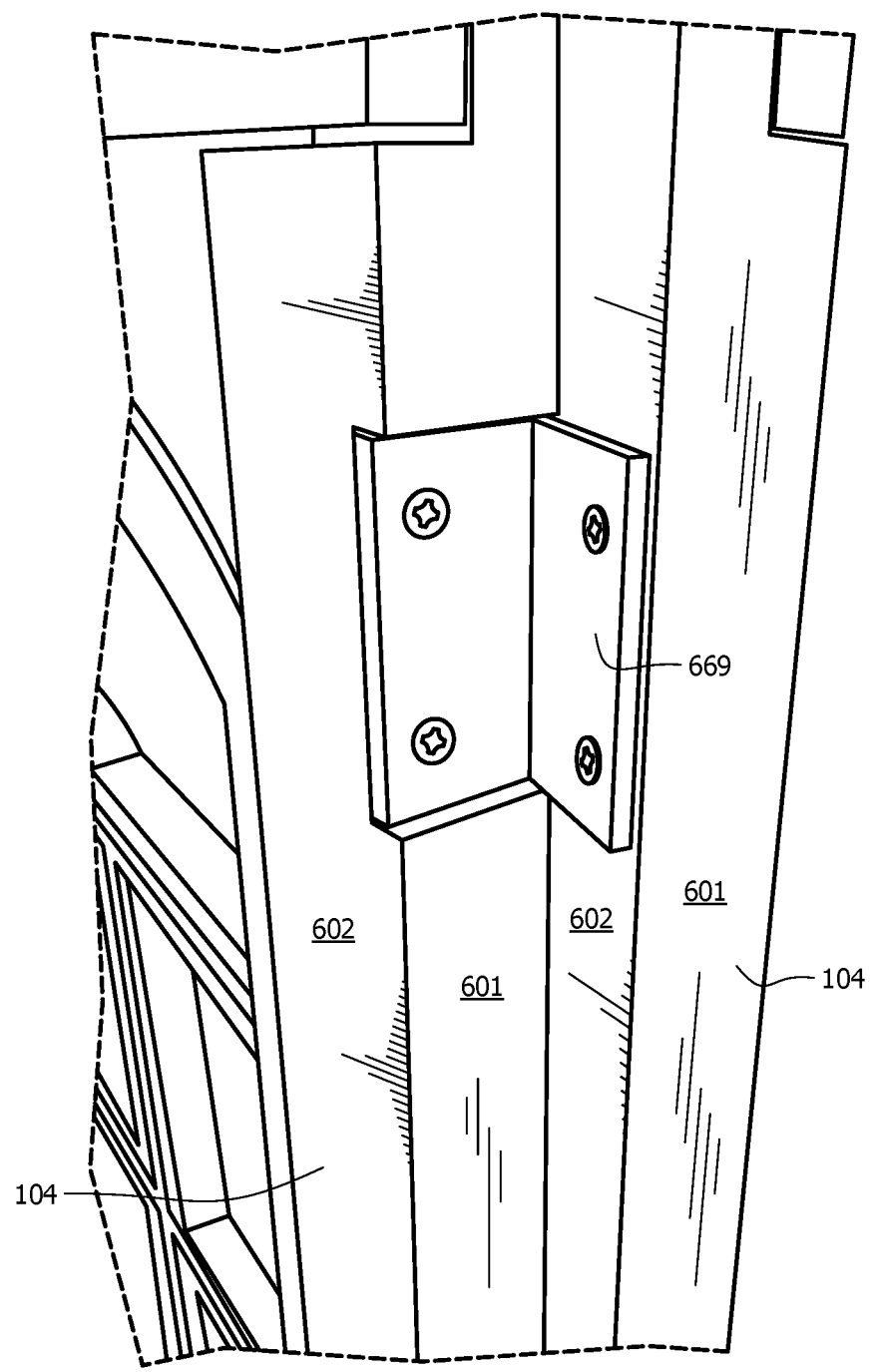
FIG. 7 illustrates a detailed view of a second hinge, according to an embodiment of the disclosure.

FIG. 7 shows a detailed view of a second hinge 669, which may comprise a corner hinge, which may be positioned between two panels 104. The second hinge 669 may be attached to the edge 601 of one panel 104 and attached to a face 602 of the other panel 104. When completely unfolded, the first hinge 668 may allow the edge 601 of one panel 104 to contact the face 602 of the other panel 104, creating a corner between the two panels 104. In other words, when folded, the panels 104 may be parallel with their faces contacting, and when unfolded, the panels 104 may be perpendicular with a face of one panel contacting the edge of the other panel.

Figure 8:
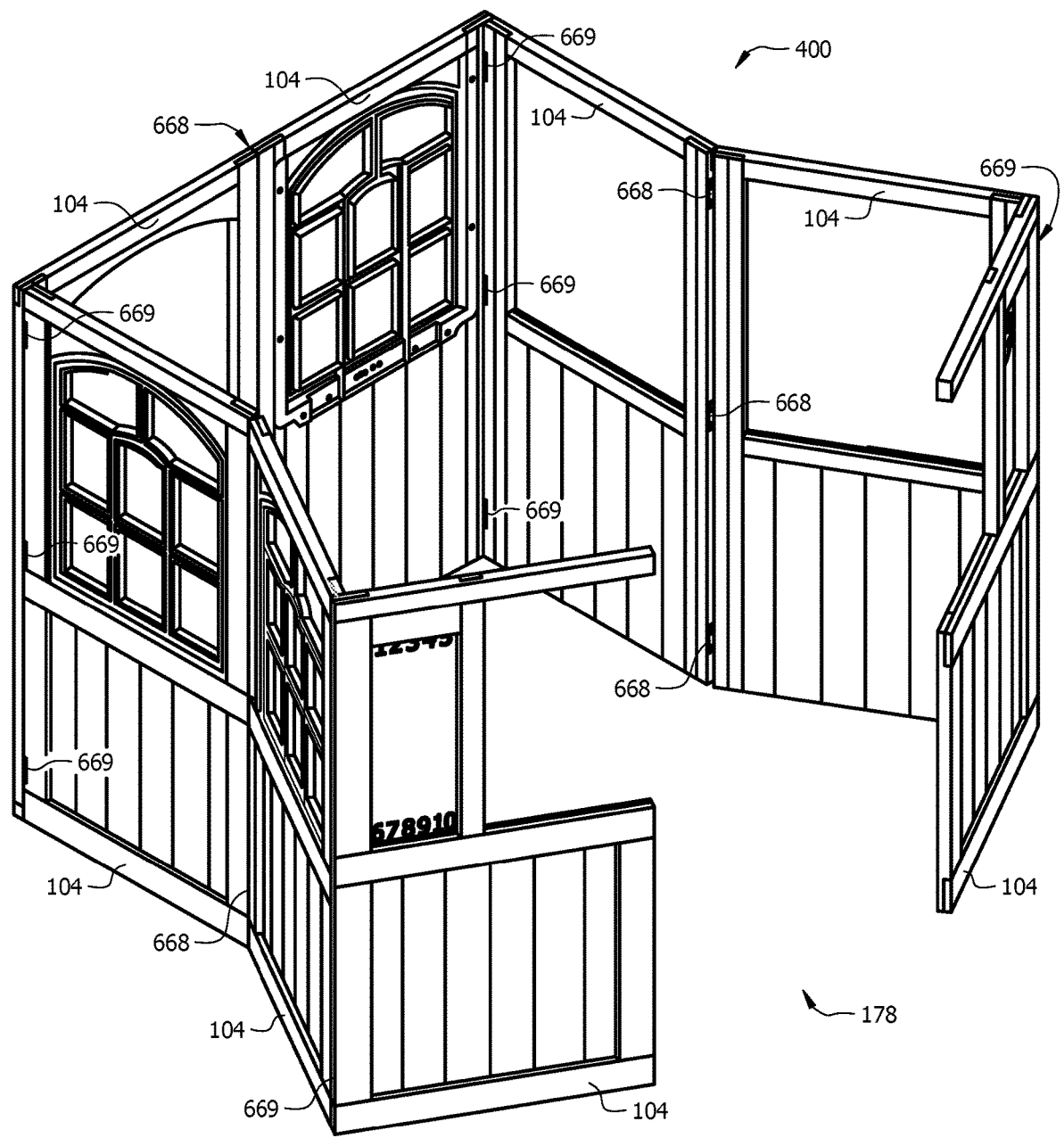
FIG. 8 illustrates a foldable playhouse with an accordion fold feature, according to an embodiment of the disclosure.

FIG. 8 illustrates another view of a partially unfolded accordion fold structure 400 (which may be similar to the partially unfolded accordion fold structure 400 shown in FIG. 4C), optionally using the mid-wall hinges 668 and the corner hinges 669 described above. In some embodiments, the accordion fold structure 400 comprises four corner hinges 669 and at least one mid-wall hinge 668 between each pair of corner hinges 669. In other words, between any two corner hinges 669 is at least one mid-wall hinge 668, and/or at least one mid-wall hinge 668 separates any two corner hinges 669.

Figure 4D:
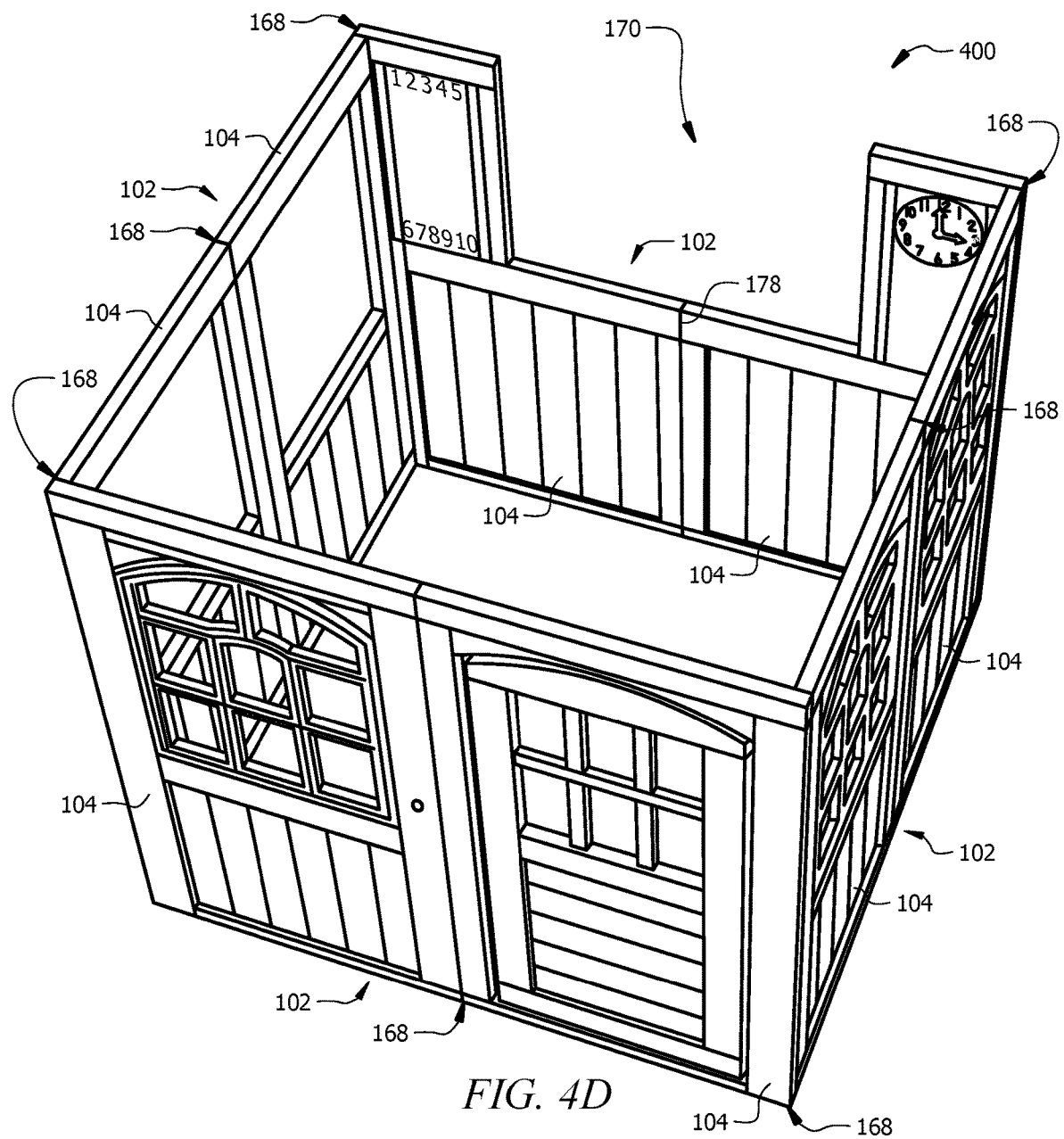
FIG. 4D illustrates a foldable playhouse with an accordion fold feature completely unfolded, according to an embodiment of the disclosure.
Figure 9:
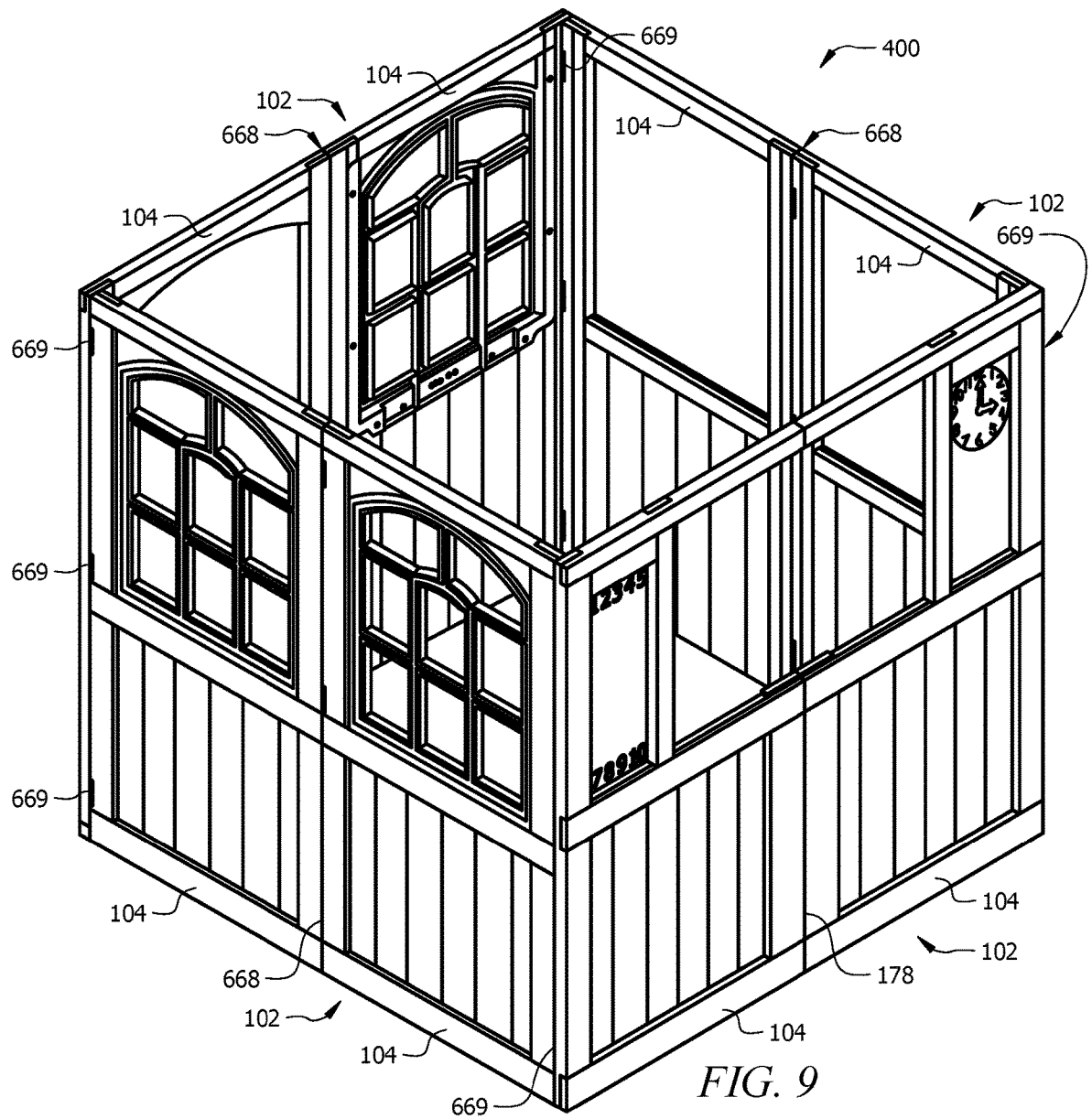
FIG. 9 illustrates a foldable playhouse with an accordion fold feature completely unfolded, according to an embodiment of the disclosure.

FIG. 9 illustrates another view of a fully unfolded accordion fold structure 400 (which may be similar to the accordion fold structure 400 shown in FIG. 4D), optionally using the mid-wall hinges 668 and the corner hinges 669 described above.

Figure 10:
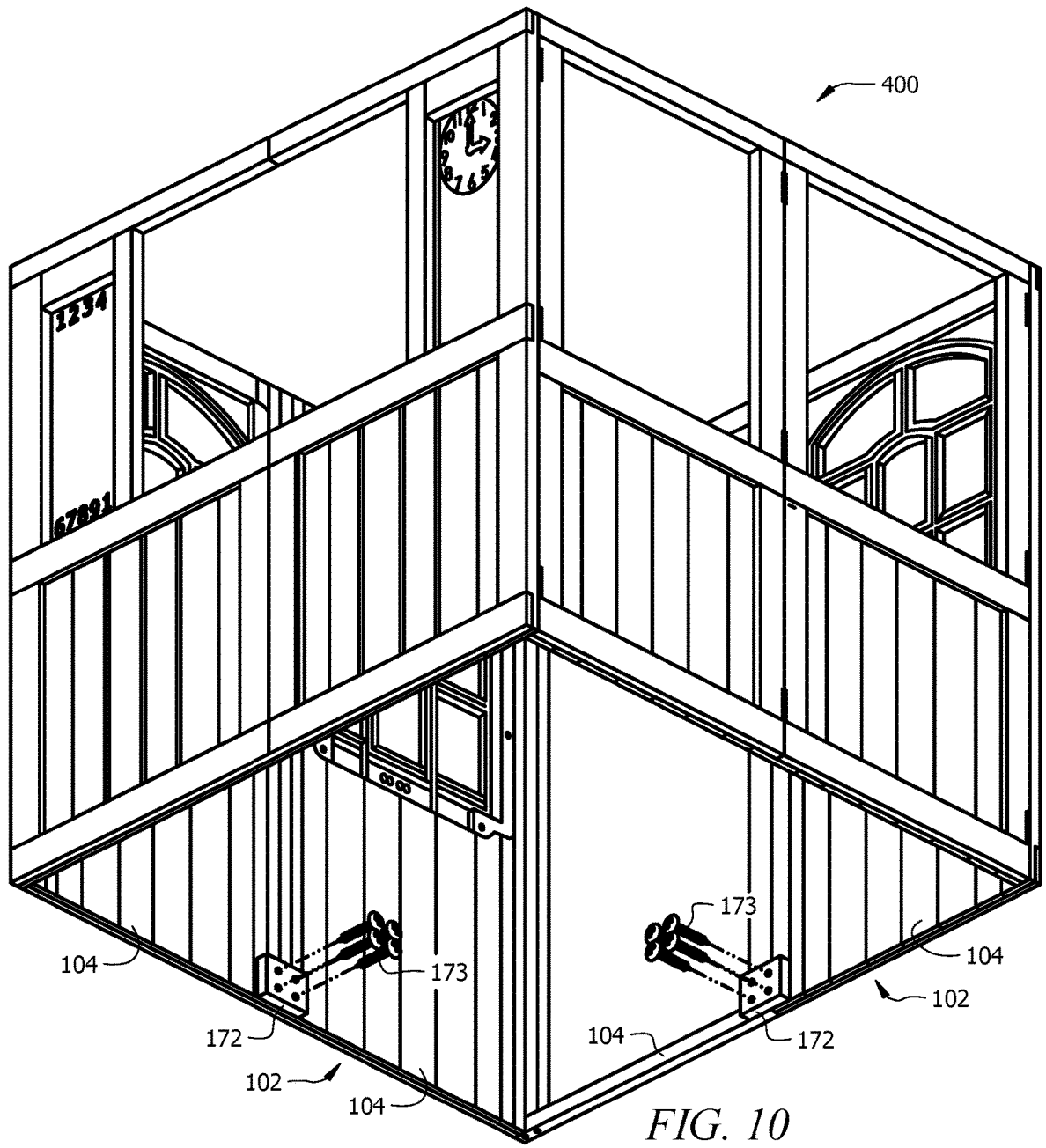
FIG. 10 illustrates an exemplary stabilizing feature of a foldable playhouse, according to an embodiment of the disclosure.

FIG. 10 illustrates an example of one or more braces 172 which may be used to support, fortify, secure, brace, and/or reinforce the junction between two panels 104 (e.g., forming a more solid wall spanning two panels) once the accordion fold structure 400 is completely unfolded. The braces 172 may comprise one or more blocks or panels, which may be attached to two panels 104 overlapping the junction or connection point of the two panels (e.g., in proximity to the mid-wall hinge joint), via one or more screws 173. In FIG. 10, the braces 172 are shown attached to a bottom edge of the panels 104, but the braces 172 may be attached at any point along the junction between the two panels 104 forming a joint wall.

Figure 11:
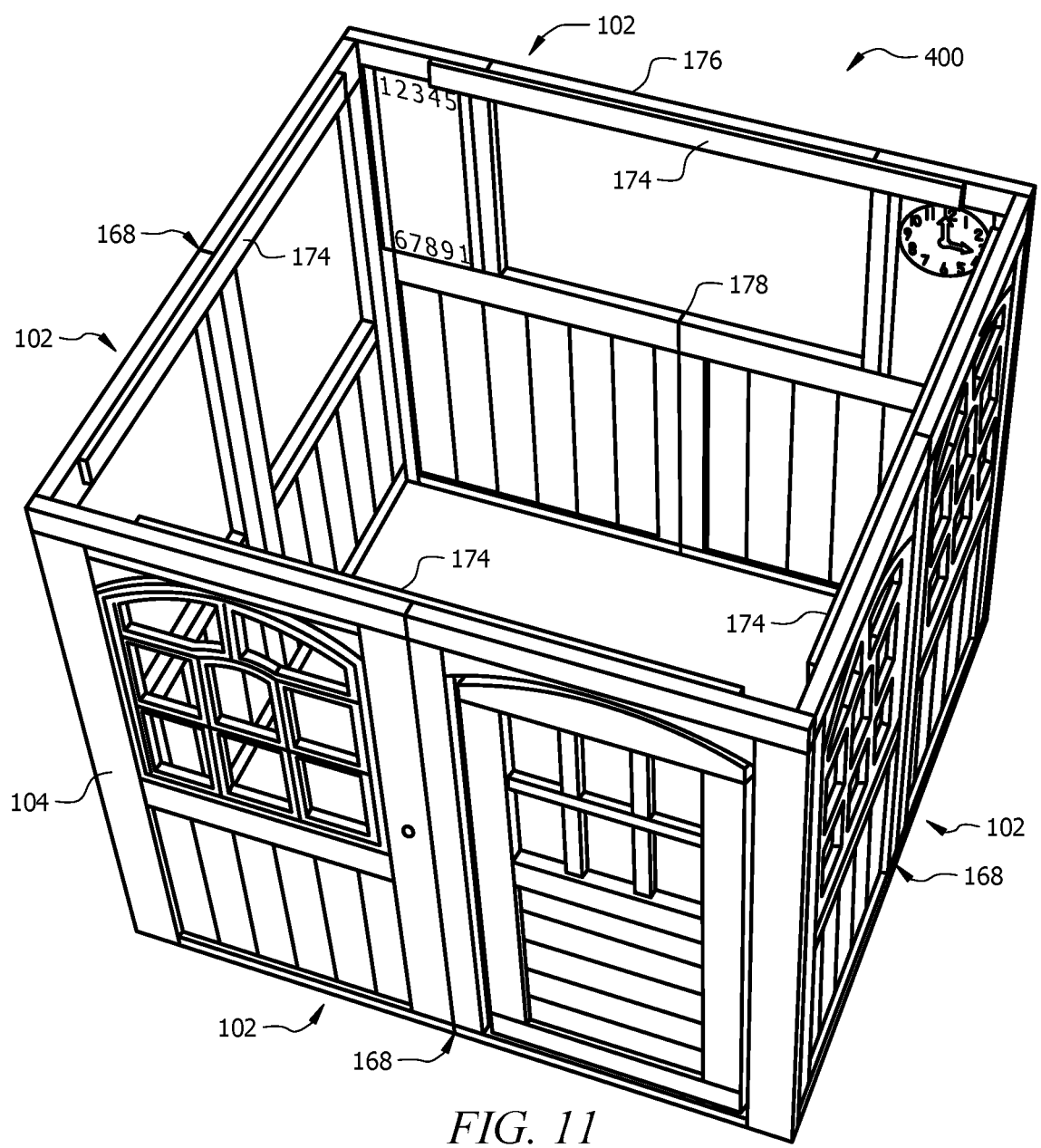
FIG. 11 illustrates exemplary locations for mounted lateral braces of a foldable playhouse, according to an embodiment of the disclosure.

Referring now to FIG. 11, some embodiments of the partially assembled accordion fold structure 400 may include lateral braces 174 in order to lock in place panels that have been "expanded" open. In a specific embodiment, these locks brace the panels from folding at the interior hinge locations, e.g., at hinge locations that do not form the corners of the partially assembled accordion fold structure 400. Lateral braces 174 may comprise one or a combination of plastic, or wood, or concrete, or the like. In some embodiments, lateral braces 174 may be mounted to the interior surface of the accordion fold structure 400 panels 104. Lateral braces 174 may be mounted to the top-most portion of the interior surface of panels 104. In other embodiments, lateral braces may be mounted to the bottom-most portion of the interior surface of panels 104. In still other embodiments, lateral braces 174 may be mounted to a portion of the interior surface of panels 104 that lies between the top-most portion and the bottom-most portion. Alternatively and/or additionally, lateral braces 174 may be mounted to the exterior surface of the accordion fold structure 400 panels 104. Lateral braces 174 may be mounted to the top-most portion of the exterior surface of panels 104. In other embodiments, lateral braces 174 may be mounted to the bottom-most portion of the exterior surface of panels 104. In still other embodiments, lateral braces 174 may be mounted to a portion of the exterior surface of panels 104 that lies between the top-most portion and the bottom-most portion.

Use of lateral braces 174 to stiffen hinges 168 may comprise the use of a single strip of lateral braces 174 or multiple strips of lateral braces 174, 176. As illustrated in FIG. 11, lateral braces may comprise the use of both interior lateral braces 174 and exterior lateral braces 176. In a specific embodiment, the use of multiple strips of lateral braces comprises a single strip of lateral braces 174 mounted to the top-most portion of each of four interior surfaces of panels 104 of a partially assembled accordion fold structure 400, and a single strip of exterior lateral braces 176 mounted to a top-most portion of an exterior surface of a panel 104 located at the rear of a accordion fold structure 400, e.g., at an opening gap 178, although more or fewer lateral braces 174 could be used. Although lateral braces are described above as reinforcing the non-corner hinge panel connections, corner braces could also be used in a similar manner, such as a right-angle corner brace that would help secure the corners of an assembled accordion fold structure 400.

Figure 12:
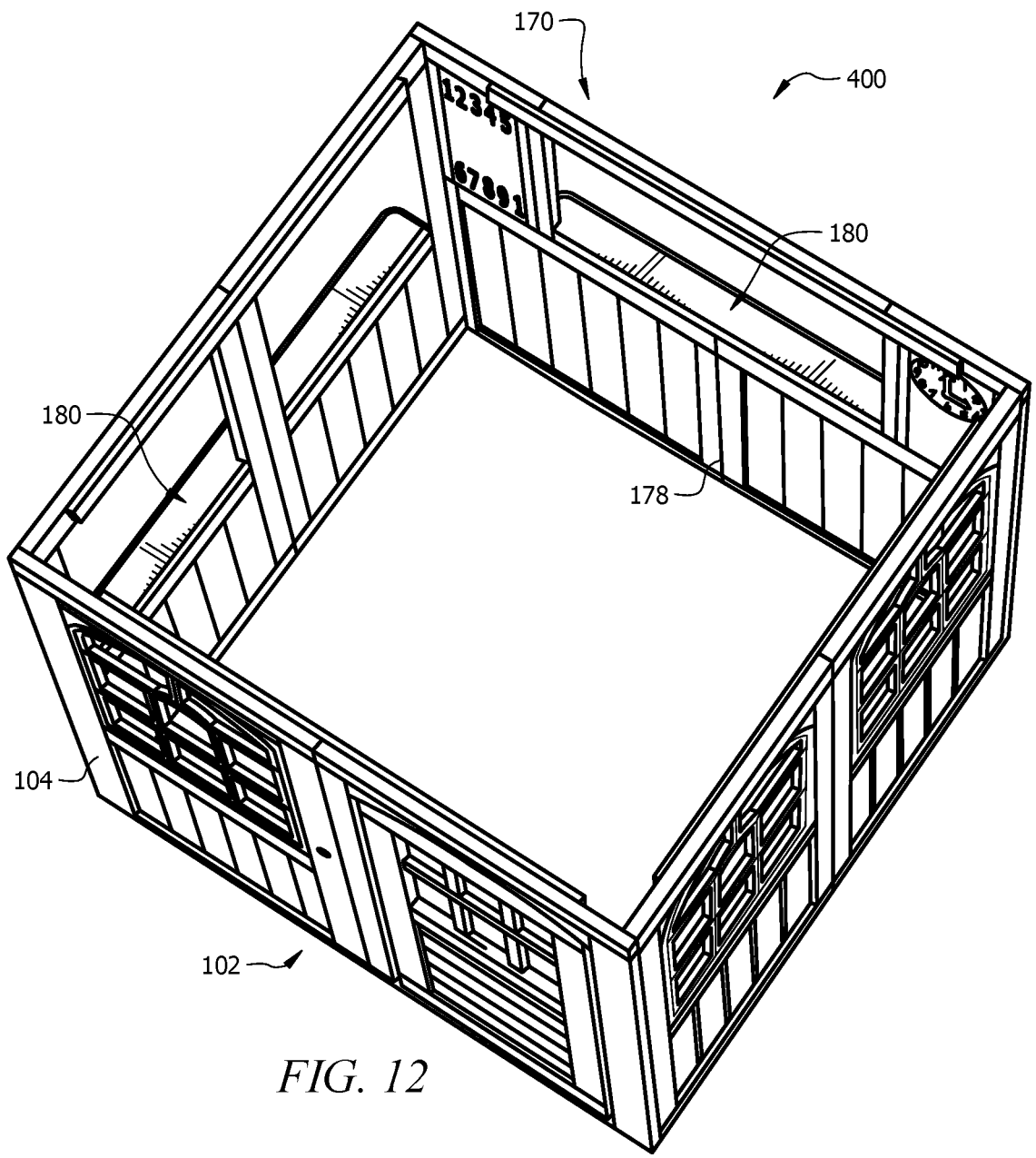
FIG. 12 illustrates exemplary locations for mounted shelves of a foldable playhouse, according to an embodiment of the disclosure.

FIG. 12 illustrates a specific embodiment of a partially assembled accordion fold structure 400 comprising panels 104 with a shelf 180 feature. A shelf 180 may be functional, or decorative, or both functional and decorative. A shelf 180 may comprise plastic, or wood, or concrete, or the like. The shelf 180 or another ornamental feature can be designed to further act as a lateral brace to be used as described with the lateral braces 176 (e.g., an opposite side of other brace for that wall or as the sole brace for a wall. Thus, a shelf 180 may be mounted on the exterior surface of a panel 104. Alternatively and/or additionally, a shelf 180 may be mounted on an interior surface of a panel 104. In a specific embodiment, a shelf 180 may be mounted to an exterior surface of a panel 104 located at the rear of a playhouse, e.g., at an opening 170 and/or used as a stiffening element for an opening gap 178.

An accordion fold structure 400 may alternatively and/or additionally comprise one or more shelves 180. In an embodiment, illustrated in FIG. 12, the accordion fold structure 400 may comprise two shelves 180 wherein a first shelf 180 may be mounted to an exterior surface of a panel 104 not located at the rear of a accordion fold structure 400, and a second shelf 180 may be mounted to an exterior surface of a panel 104 located at the accordion fold structure 400. While a specific embodiment of the accordion fold structure 400 comprises two shelves 180, it is contemplated that any number of shelves 180 may be mounted on the accordion fold structure 400, and that any number of them might be usable to brace the various walls and/or corners across the hinged wall or hinged corner connections. For example, a corner shelf 180 might be used to brace a corner hinged connection and a wall shelf 180 might be used to brace a wall hinged connection.

Figure 13A:
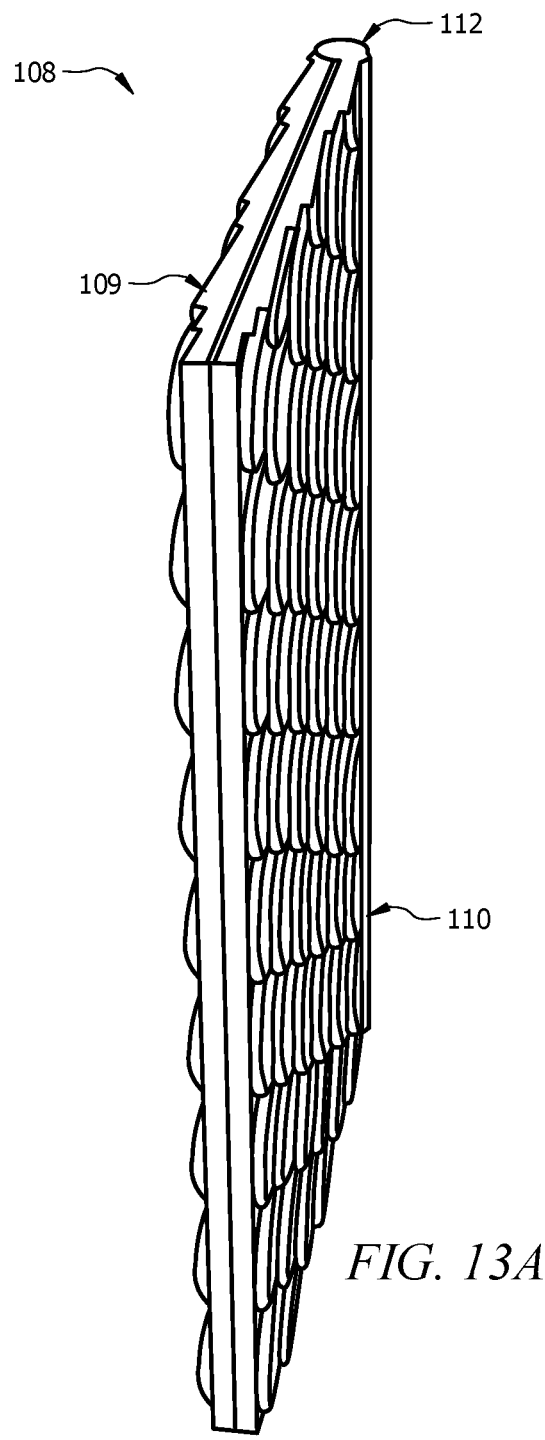
FIGS. 13A-13B illustrate a roof in a fully folded configuration, according to an embodiment of the disclosure.
Figure 13B:
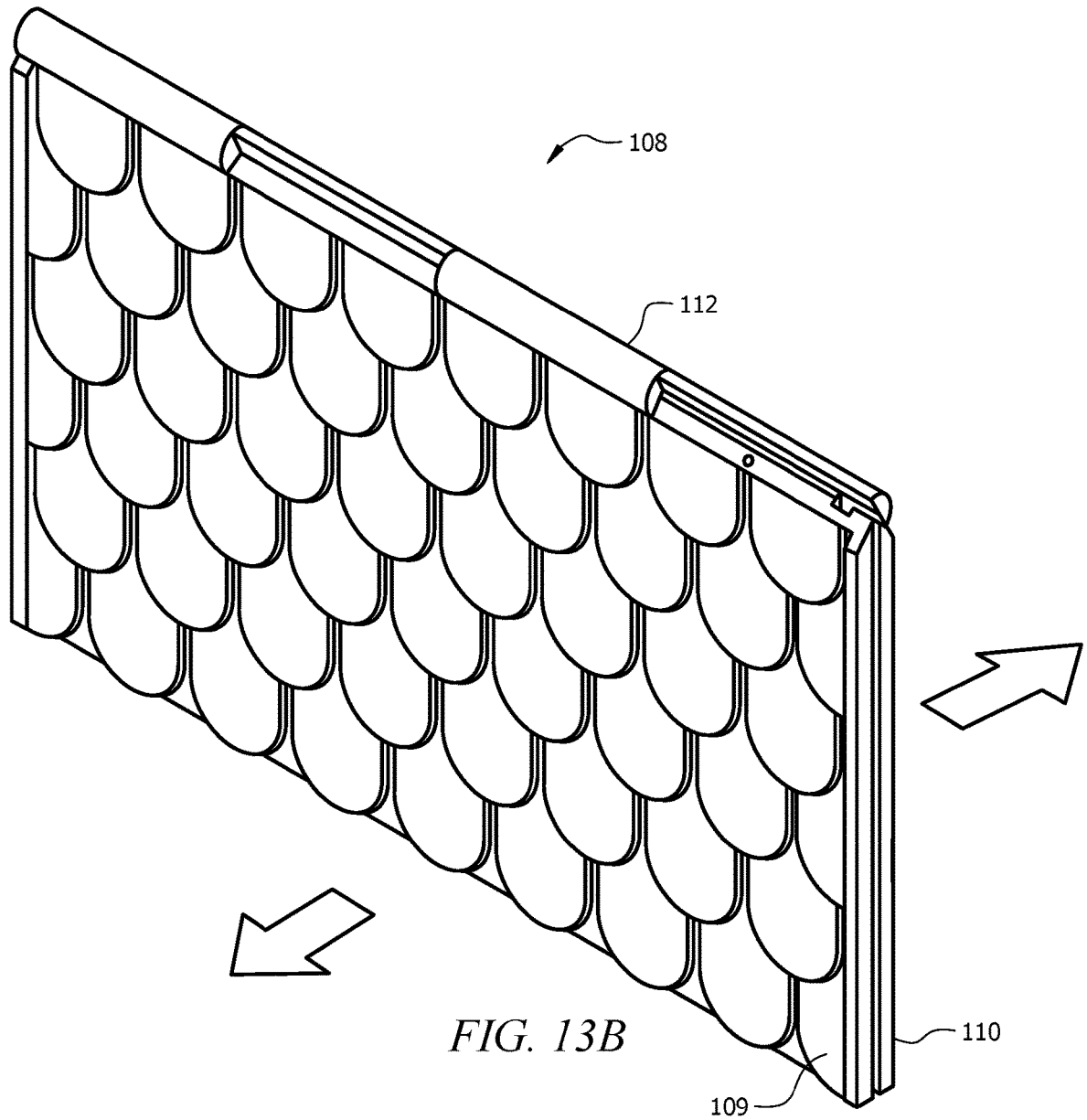

Referring now to FIGS. 13A-13B, a folded roof 108 may comprise a one or more roof panels 109 and 110 and roof hinges 112 (which join/connect the roof panels to allow for pivoting). Roof panels 109 and 110 may comprise a material such as plastic, or wood, or the like. In some embodiments, roof panels 109 and 110 may be injection-molded, blow-molded, or made by another like method that is readily known to one who is skilled in the art. As illustrated in FIGS. 13A-13B, a folded roof 108 may be flat, a feature that may minimize space needed for storage and/or shipping.

In some embodiments, roof panels 109 and 110 may be connected by one or more roof hinges 112. The number of hinges 112 may vary between different embodiments, and may be one, or two, or three, or four, or more than four hinges 168. Additionally, type of hinge may vary between different embodiments. A hinge 112 may be a flush hinge, a knuckle hinge, a butt hinge, a T-hinge, a strap hinge, a gate hinge, a double-acting hinge, a Soss hinge, a continuous hinge, a lift-joint butt hinge, an ornamental hinge, or any other type and/or style of hinge as would be readily known to one who is skilled in the art. In a specific embodiment, a roof 108 may comprise two roof panels 109 and 110 and roof hinges 112 which may be natural hinges comprising the same material as roof panels 109 and 110. In another embodiment, a roof 108 may comprise two roof panels 109 and 110 and roof hinges 112 which may be barrel and pin hinges.

Figure 14:
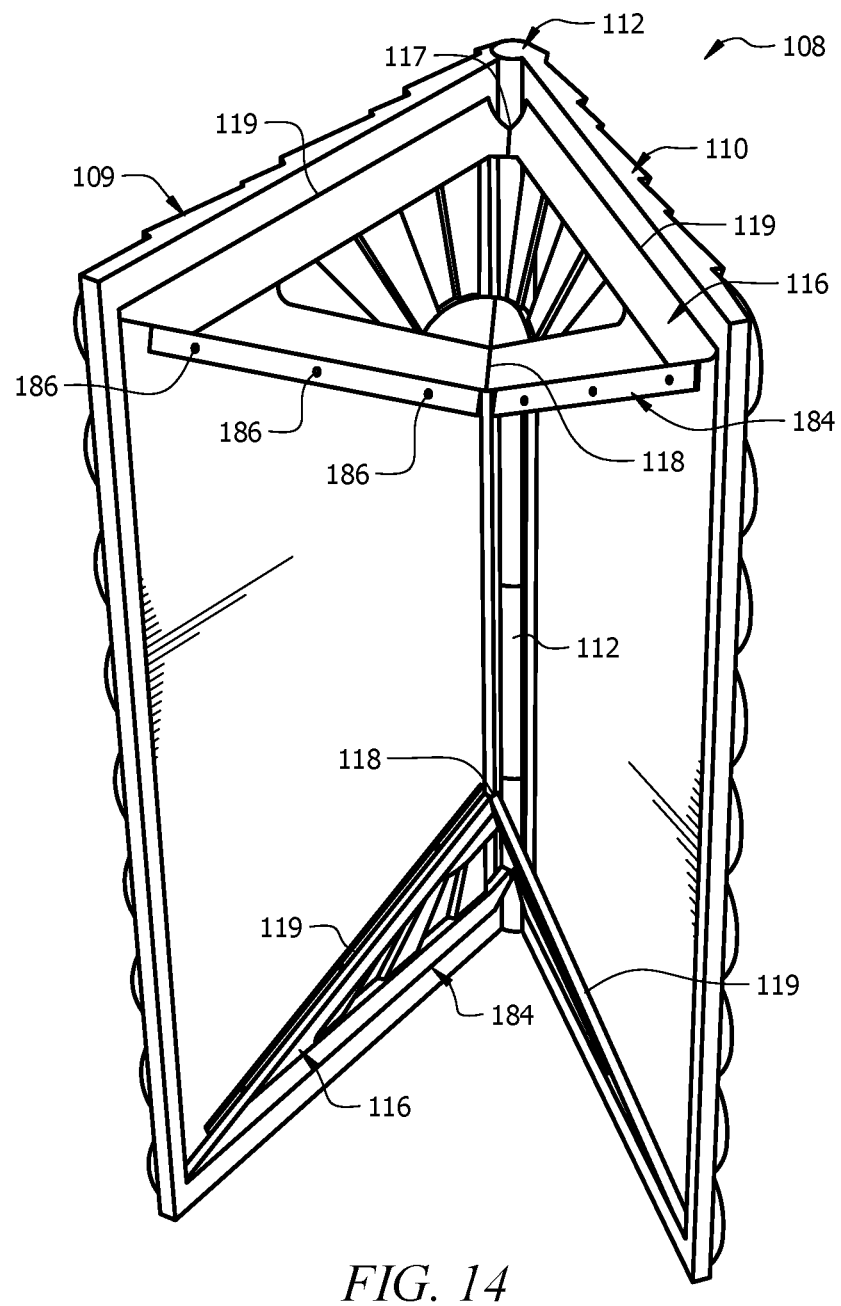
FIG. 14 illustrates a partially unfolded roof, according to an embodiment of the disclosure.
Figure 15A:
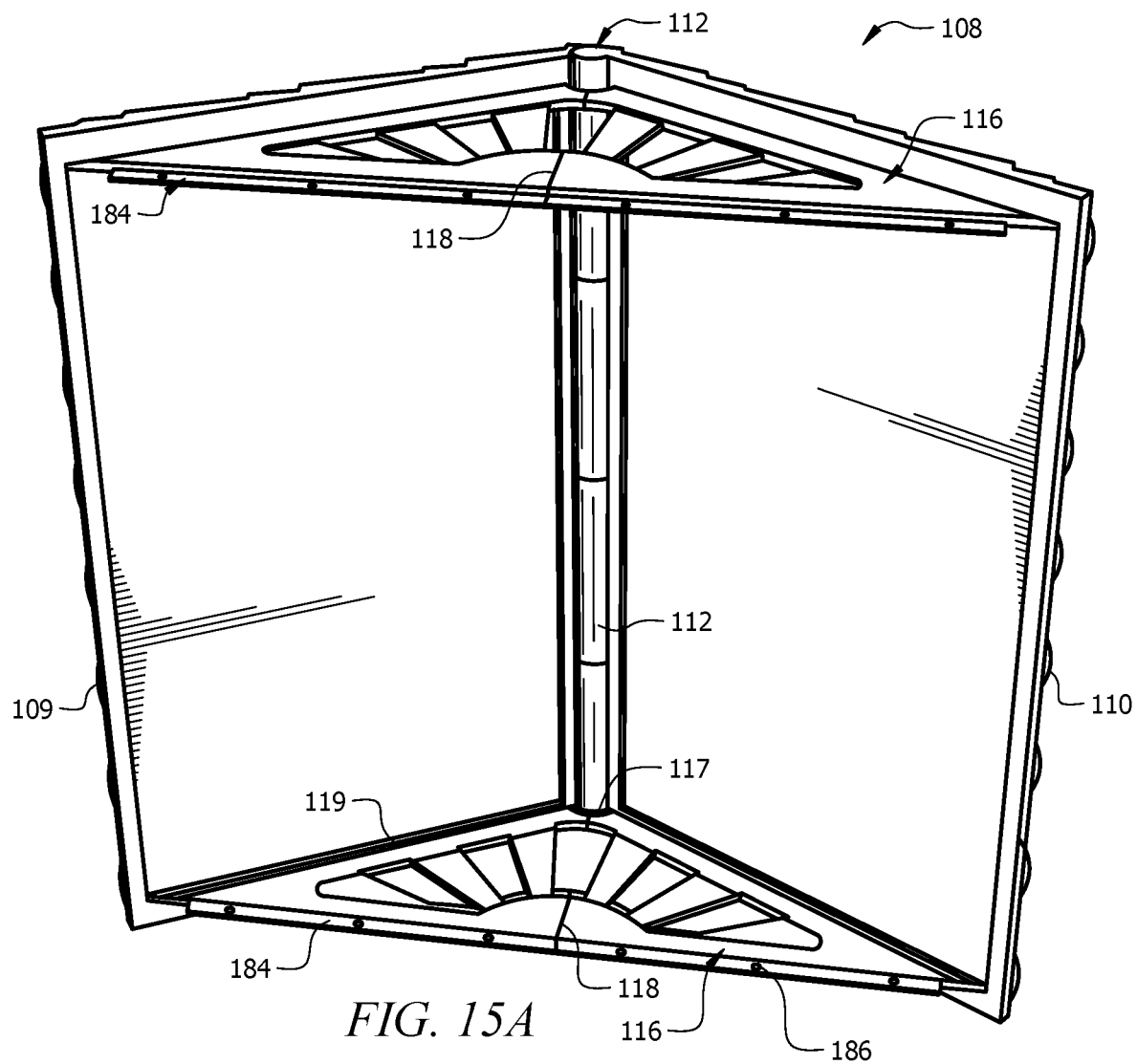
FIGS. 15A-B illustrate a roof in a fully unfolded configuration, with gables also fully unfolded, according to an embodiment of the disclosure.
Figure 15B:
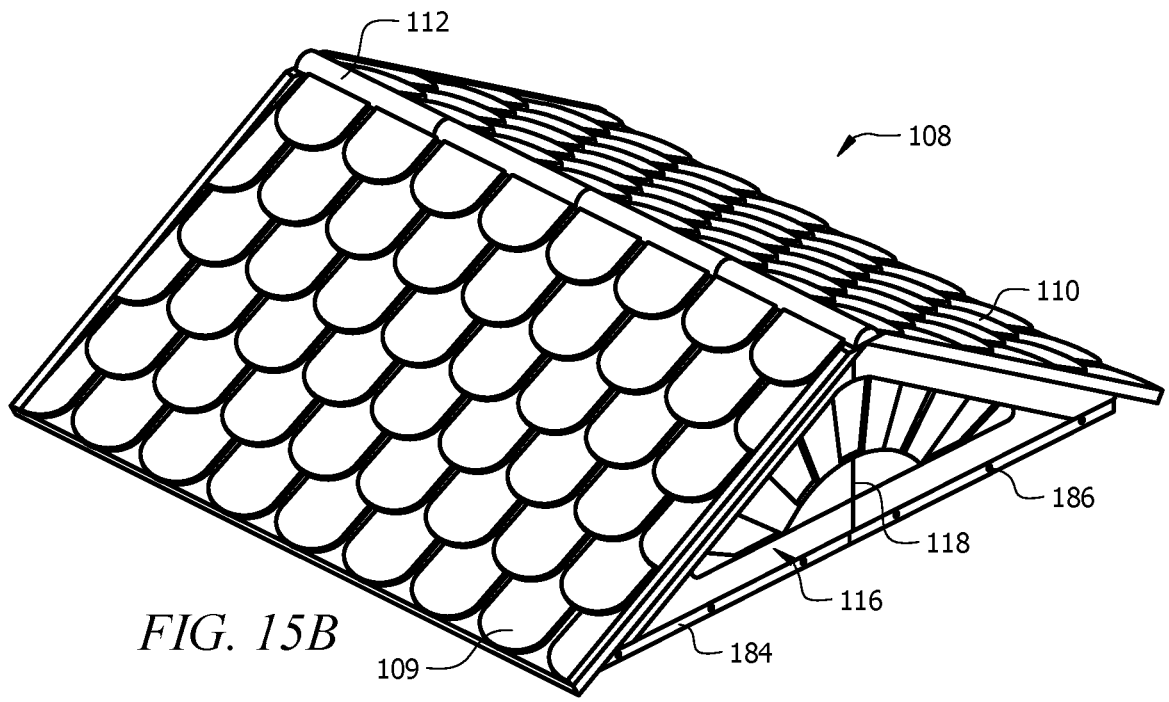

An unfolded roof 108 is illustrated in FIGS. 14 and 15A-15B at an about 33% unfolded configuration and a fully unfolded configuration, respectively. The roof 108 may comprise roof panels 109 and 110, roof hinge 112, gable 116, and/or flange 184.

The roof 108 may comprise one or more gables 116, which may comprise injection-molded plastic, or blow-molded plastic, or a wood frame, or the like. Additionally, gables 116 may comprise hinges 118 and 119 which may be attached to the roof 108. In a specific embodiment, illustrated in FIG. 14, 15A-15B, a gable 116 may comprise living hinges 119 which may be attached to roof panels 109 and 110 which may comprise roof hinges 112 across the top of the roof 108, i.e., at a surface where roof panels 109 and 110 meet. Additionally, the gable 116 may comprise living hinges 118 along an approximately center line of the gable 116, allowing the gable 116 to fold in half when the roof panels 109 and 110 are folded toward one another. The hinges 118 and 119 together allow the gable 116 to collapse inward as the roof is folded, so that in this embodiment, the gables are stored within the roof panels (e.g., sandwiched) when the roof is folded.

As illustrated in FIG. 14, gables 116 may be connected to roof panels 109 and 110 and may therefore be operable to expand as roof panels 109 and 110 are unfolded, altogether simplifying the assembly process. As shown in FIG. 14, the roof panels 109 and 110 expand from a position where the gables 116 are folded inwardly (via hinges 118) under the panels such that the entire roof assembly is a flat assembly of about half the surface area of the expanded roof (the flat assembly shown in FIGS. 13A-13B), whereby the assembly can be shipped very easily. As the two roof panels 109 and 110 are pulled apart, the inwardly folded gables 116 expand and unfold outwardly, such, that as illustrated in FIGS. 15A-15B, when a roof 108 is fully expanded, gables 116 may be fully expanded as well. A roof 108 may additionally comprise one or more flanges 184, which may comprise injection molded plastic, or wood, or the like. The flanges 184 may serve to secure the roof 108 to the top edges of the panels 104 (optionally via one or more screw holes 186), and thus in the mounting of the roof 108 as a part of an assembled playhouse, the roof 108 also may serve as a lateral brace across the walls and corners strengthening the hinged connections of the playhouse in some embodiments (so other braces may not be needed).

Figure 16:
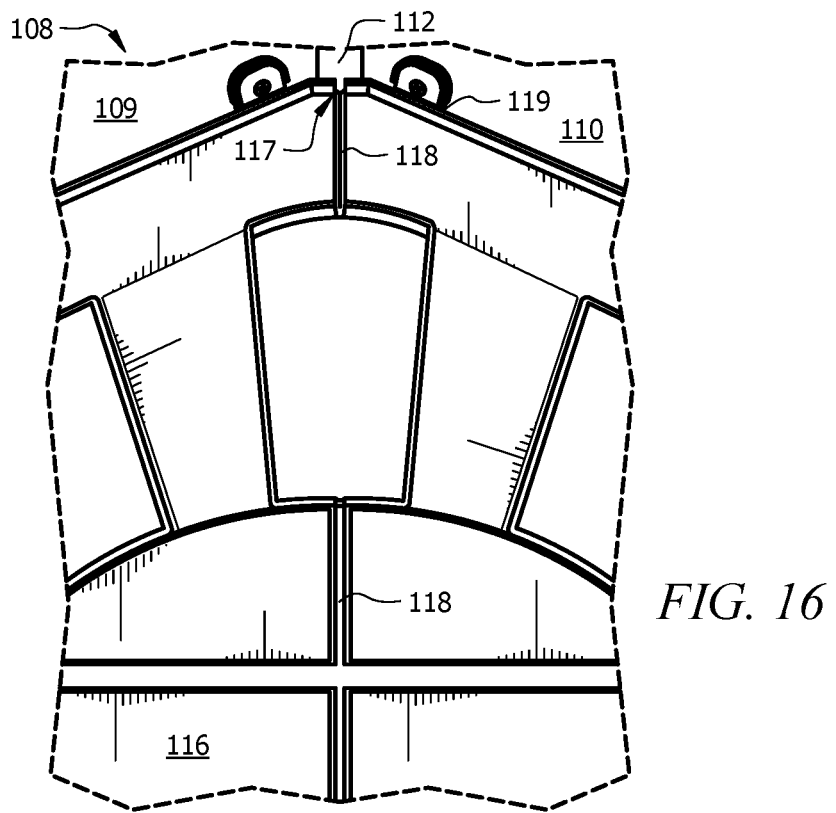
FIG. 16 illustrates a detailed view of a gable of a foldable roof, according to an embodiment of the disclosure.

FIG. 16 illustrates a detailed view of the gable 116 of the roof 108. The gable 116 may attach to the roof panels 109 and 110 via one or more hinges 119. The gable 116 may be configured to fold approximately in half via a hinge 118 positioned approximately along the center line of the gable 116. In some embodiments, the gable 116 may comprise one or more cut-outs 117 configured to allow the gable 116 to fold and fit around the one or more roof hinge 112.

Figure 17:
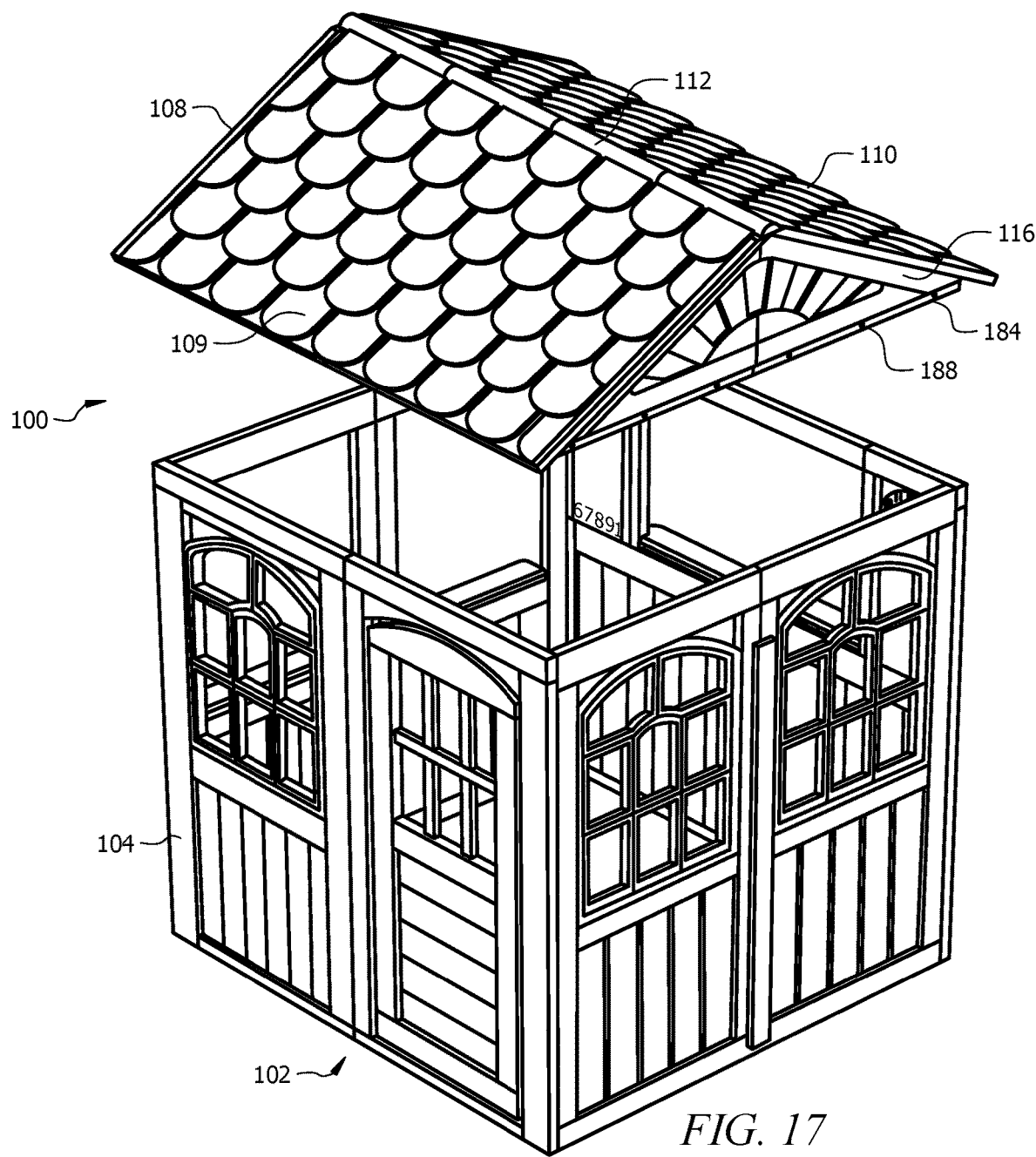
FIG. 17 illustrates assembling a foldable playhouse, according to an embodiment of the disclosure.

According to a specific embodiment, a foldable playhouse 100 may be assembled as illustrated in FIG. 17. In the described embodiment, a foldable playhouse 100 may comprise a roof 108, fully unfolded at roof hinge 112, fully expanded gables 116, and flanges 184 which may be operable to fit on the inside of panels 104. According to this embodiment, a roof 108 may be mounted onto panels 104 using screws 188, which may be placed such that they go through flanges 184 and pockets of panels 104. Additionally, screws 188 may be operable to tap into a thick substrate and may be self-tapping. In a specific embodiment, screws 188 may be self-tapping, comprised of plastic, and may be operable to tap into a substrate comprising wood.

In some embodiments, screws 188 may comprise plastic, steel, aluminum, copper, beryllium, titanium, or any combination of these materials. Alternatively and/or additionally, screws 188 may comprise any material that is readily known by one who is skilled in the art.

Embodiments of the disclosure may comprise a method of assembling a playhouse. The method may comprise providing a playhouse with an accordion fold structure comprising a plurality of panels each connected to another by at least one hinge (for example, in accordance with any of the embodiments described above), wherein in a first configuration of the accordion fold structure, the plurality of panels are folded to be stacked in substantially parallel planes, and in a second configuration of the accordion fold structure, the plurality of panels are unfolded forming a play structure. The method may comprise orienting the playhouse so that a bottom edge of each panel is located on the ground, and unfolding the playhouse from the first configuration to the second configuration.

In some embodiments, unfolding the playhouse may comprise rotating a first panel about a corner hinge relative to a second panel, forming a corner of the accordion fold structure comprising the first panel and the second panel, rotating a third panel about a mid-wall hinge relative to the second panel, and forming a continuous wall (e.g. plane) of the accordion fold structure comprising the second panel and the third panel. In some embodiments, the method may further comprise providing a gabled roof comprising at least two roof panels connected along a roof hinge, and at least one gable located between the two roof panels and connected to both of the two roof panels, wherein in the first configuration the roof panels and gable(s) are folded toward one another, unfolding the gable roof into the second configuration, and attaching the gabled roof to the top of the plurality of panels of the accordion fold structure. In some embodiments, the method may further comprise removing the accordion fold structure from a box while the accordion fold structure is in the first configuration, wherein the box is sized for shipping and transport (e.g., as described above).

Embodiments of the disclosure may also comprise a method of manufacturing a playhouse. A method may comprise providing a plurality of panels, wherein two panels are end panels and wherein the remainder of the panels are interior (or not-end) panels. The method may comprise attaching the panels to form an accordion fold structure comprising hinges (as described above). In some embodiments, the method may comprise folding the plurality of panels and hinges into a first configuration. In some embodiments, the method may comprise packaging the accordion fold structure within a box (e.g., as described above).

In some embodiments, the method may comprise providing at least two roof panels and at least one folding gable (e.g., as described above), attaching the roof panels to each other with a hinge, and attaching the folding gable to the two roof panels via hinges to form a gabled roof. In some embodiments, the method may comprise folding the gabled roof into a first, folded configuration. In some embodiments, the method may comprise packaging the gabled roof with the accordion fold structure within a box (e.g., as described above).

Figure 18:
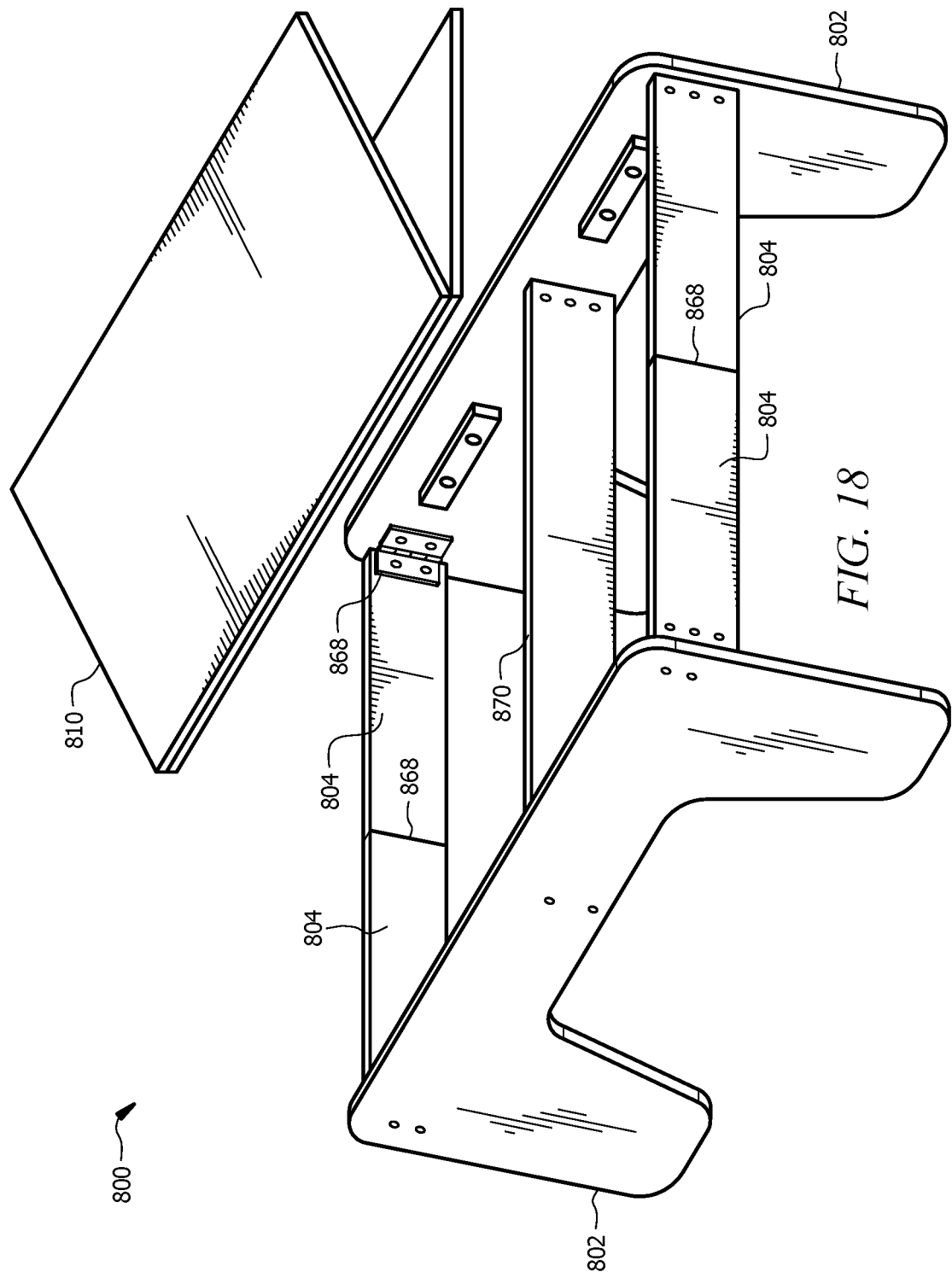
FIG. 18 illustrates a perspective, partially disassembled view of a foldable play table, according to an embodiment of the disclosure.

These sorts of foldable play structure are not limited to playhouses. For example, FIG. 18 illustrates another embodiment of an accordion fold structure that may form a play table 800. The play table 800 may comprise a plurality of panels 802 and 804 (which may comprise face panels 802 and side panels 804) forming a base, where in some embodiments, one or more of the panels 804 may comprise hinges 868 connecting the panels 804 to each other and to the panels 802, forming an accordion fold structure. In this embodiment, face walls 802 are each formed of a single panel, while side walls between the two face walls are formed of a plurality (typically tow) side panels 804. Then hinges 868 may function similarly to the hinges 168 described above. The panels 802 and 804 may function similarly to the panels 104 described above. For example, the accordion fold structure of the play table 800 may have a folded configuration (in which the side walls collapse inward and are confined (e.g., sandwiched) within the face walls and the face walls are parallel and located in proximity to one another) and an unfolded configuration (e.g., forming a table base with extended side walls between the face walls). In some embodiments, the play table 800 may comprise additional braces 870 and a top surface 810, where the top surface 810 may be configured to fold (or may be two separate portions). The braces 870 may be used to support, fortify, secure, brace, and/or reinforce the position of the panels 802 and 804 once the accordion fold structure 800 is completely unfolded.

In the embodiment shown in FIG. 18, the hinges 868 may allow the panels 804 to fold toward one another (e.g., collapsing inwardly by pivoting panels, similar to the gable described above), allowing one face panel 802 to move toward the other face panel 802. In some embodiments, a brace 870 may be removed (or may not be present) when the play table 800 is folded, and then when the play table is unfolded, the brace 870 may be inserted to prevent the play table 800 from folding while in use. In some embodiments the hinges 868 may comprise mid-wall hinges and corner hinges (e.g., such as those described in FIGS. 6 and 7).

Figure 19:
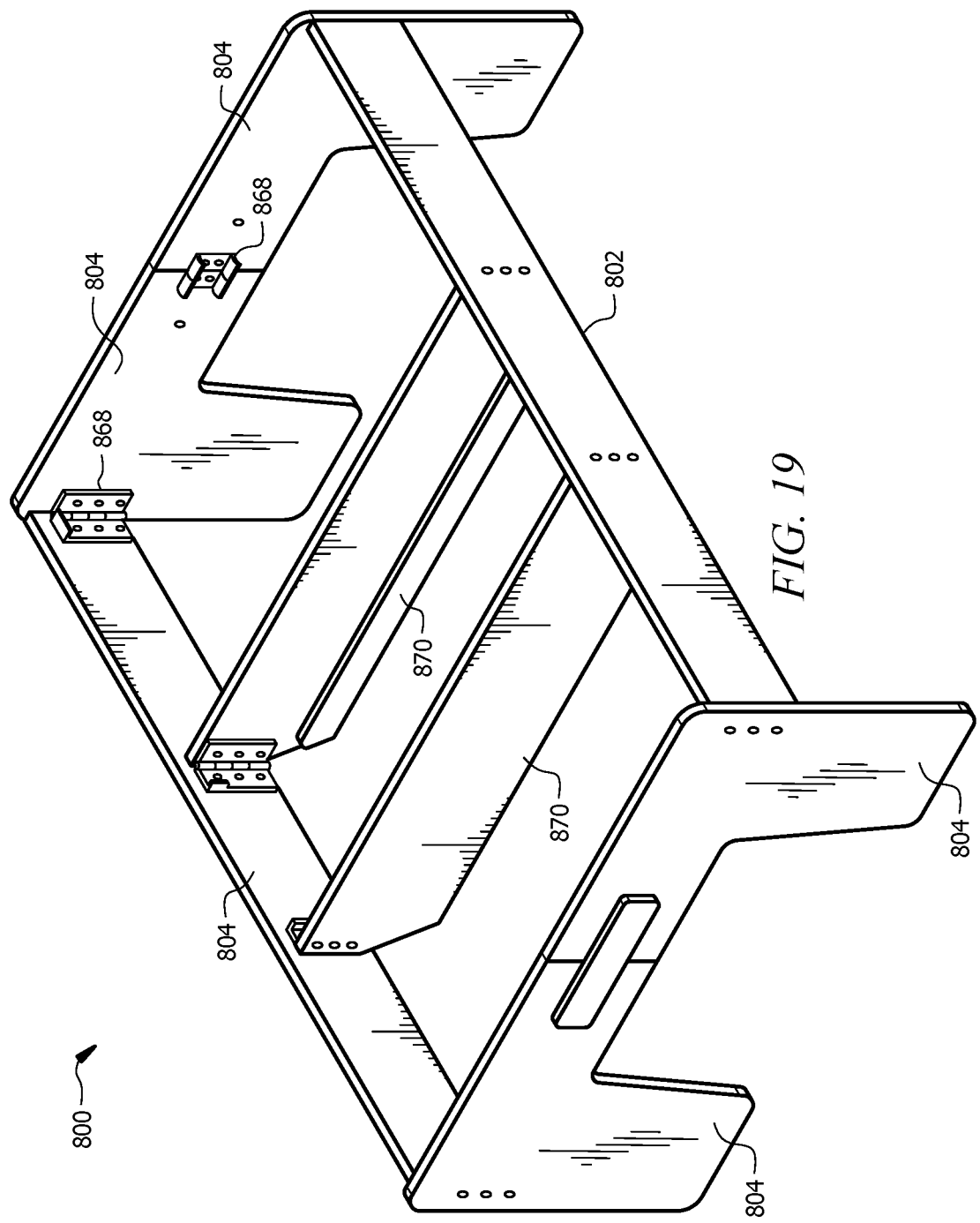
FIG. 19 illustrates a perspective, partially disassembled view of another foldable play table, according to an embodiment of the disclosure.

FIG. 19 illustrates another view of a play table 800 as described above, with the top surface 810 removed.

Figure 20:
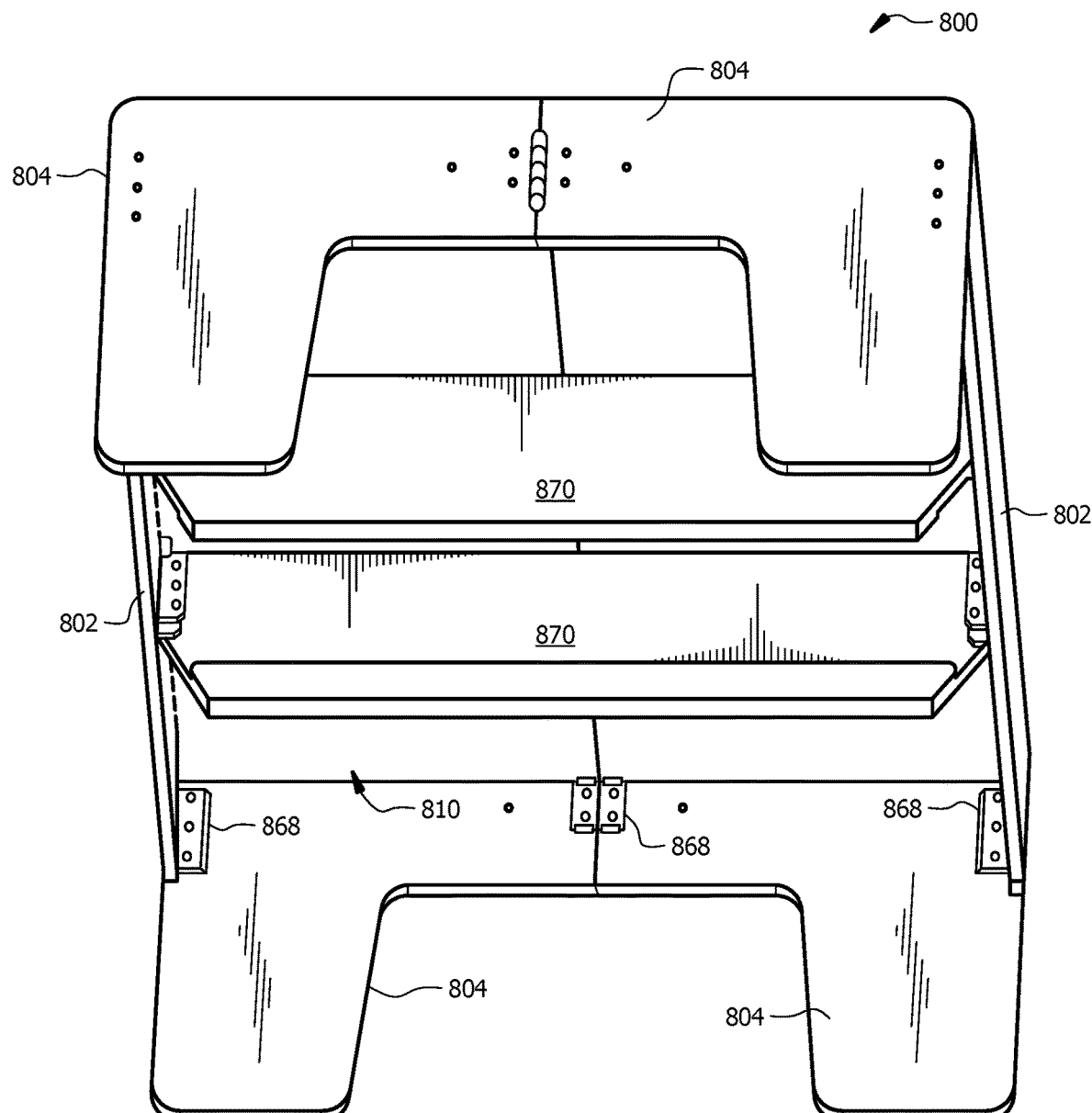
FIG. 20 illustrates a bottom view of a foldable play table, according to an embodiment of the disclosure.

FIG. 20 illustrates a bottom view of a play table 800 as described above, with the top surface 810 installed onto the panels 802 and 804.

While this invention has been described with reference to illustrative embodiments, this description is not intended to be construed in a limiting sense. A few preferred embodiments have been described in detail herein. It is to be understood that the scope of the invention also comprehends embodiments different from those described, yet within the scope of the claims. For example, as discussed above, the principles described herein could be used in structures or buildings having larger or smaller dimensions. Accessories may vary in type and material.

The material used for the elements could be plastic, or concrete, or wood, or the like. The plastic elements could be injection molded or blow molded. The plastic used in any of the elements could be one of various types of blow-molded thermoplastic materials such as Low Density Polyethylene (LDPE), Medium Density Polyethylene (MDPE), High Density Polyethylene (HDPE), Polyethylene Terephthalate (PET), Polypropylene (PP), or Polyvinyl Chloride (PVC). Additionally and/or alternatively, the elements could be formed using other types of plastics molding such as injection molding of Acrylonitrile Butadiene Styrene (ABS), Acrylonitrile Butadiene Styrene Polycarbonate (ABS/PC), High Density Polyethylene (HDPE), or other injection-molding-suitable plastics.

Further, other, non-thermoplastic materials such as wood or paper materials or concrete could be used for portions of the structure. Various other modifications and combinations of the illustrative embodiments, as well as other embodiments of the invention, will be apparent to persons skilled in the art upon reference to the description. It is therefore intended that subsequent claims encompass such modifications or embodiments.

As discussed above, in some embodiments, the corner joints/hinges (for example of a play structure with an accordion fold structure) could employ/comprise a pivotal attachment element/hinge configured to retain a fastener and self-align the fastener for lock of the related corner panels when the play structure is unfolded. Details of such an exemplary assembly device and/or pivotal attachment element are set forth below, and may relate to the exemplary play structures shown in FIGS. 1-20 for example.

Figure 21:
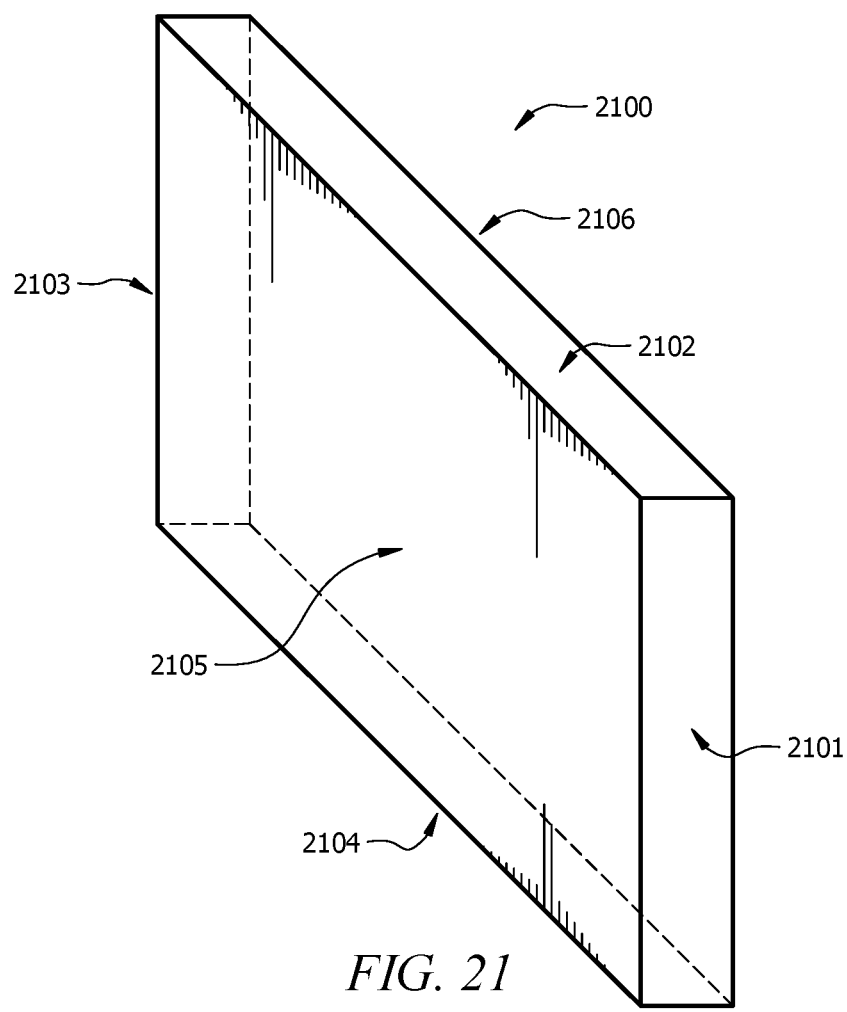
FIG. 21 illustrates a planar support element according to an embodiment of the disclosure.

Referring to FIG. 21, a typical planar support element 2100 is shown, wherein the planar support element 2100 may be a panel, a wall panel, a board, flat sheet, rod, substrate with leading edge or surface (or thickness), wood panel, glass panel, plastic panel, metal panel, sheet metal, etc. As used herein, panel and planar support elements may be used interchangeably and are intended to broadly cover these and similar elements. In some embodiments, the planar support element 2100 may be similar to one or more of the panels 104 and/or walls 102 described above. In other words, the planar support element 2100 may also be called a panel or a wall.

The planar support element 2100 may comprise a plurality of edges, ends, surfaces, or faces, which may be designated for identification purposes as a first edge 2101, a second edge 2102, a third edge 2103, a fourth edge 2104, a first face 2105, and a second face 2106. In the embodiment shown in FIG. 21, the edges 2101, 2102, 2103, and 2104 may comprise a narrower width than the faces 2105 and 2106. In other words, the edges 2101, 2102, 2103, and 2104 may form a narrow border surrounding the two faces 2105 and 2106, wherein the faces 2105 and 2106 may be parallel to one another. As shown in FIG. 21, the edges and faces may be rectangular in shape, but in other embodiments, the edges and/or faces may comprise other shapes depending on the purpose and function of the planar support element 2100.

In some embodiments, one or more planar support element 2100 may be substantially planar (e.g. not entirely planar), wherein the two faces 2105 and 2106 may be substantially planar in shape, with the edges 2101, 2102, 2103, 2104 surround the two planes. In some embodiments, the planar support element 2100 may comprise other features or elements incorporated and/or built onto the planar shape, which may protrude from the substantially planar shape (but regardless, these substantially planar support elements are intended to be included within the term "planar support element" as used herein).

Figure 22:
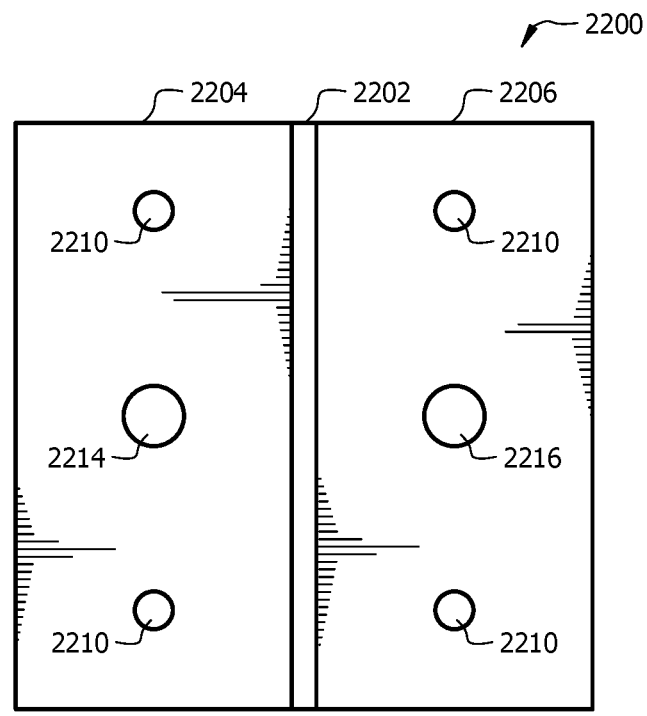
FIG. 22 illustrates a pivotal attachment element according to an embodiment of the disclosure.

FIG. 22 illustrates an exemplary pivotal attachment element 2200 according to an embodiment of the disclosure. The pivotal attachment element 2200 may comprise a hinge, a joint, a pivot, or another similar pivotal attachment element. In some embodiments, the pivotal attachment element 2020 may be similar to the corner hinge 669 and/or mid-wall hinge 668 described above. In another embodiment, the corner hinge 669 described above may comprise a pivotal attachment element 2200 as described herein.

In some embodiments, the pivotal attachment element 2200 may comprise a first hinge portion 2204 and a second hinge portion 2206 which may be connected via a pivot portion 2202, wherein the pivot portion 2202 may allow the first hinge portion 2204 and the second hinge portion 2206 to pivot with respect to one another about the pivot portion 2202.

In some embodiments, the pivot portion 2202 may comprise a thinned section between the first hinge portion 2204 and the second hinge portion 2206, wherein the thinned material allows for the material to bend when the first hinge portion 2204 and the second hinge portion 2206 are moved relative to one another. In some embodiments, the pivotal attachment element 2200 may comprise a living hinge, for example comprising thin, flexible webs (within the pivot portion 2202) that connect two relatively rigid adjacent wall sections (i.e., the first hinge portion 2204 and second hinge portion 2206). In some embodiments, the pivot portion 2202 may comprise a material with increased flexibility with respect to the rest of the pivotal attachment element 2200. In some embodiments, the pivot portion 2202 may comprise a material with decreased tensile strength with respect to the rest of the pivotal attachment element 2200. Typically, the pivot portion may provide a range of motion of approximately 0-90° and/or 0-180°, for example.

In some embodiments, the pivotal attachment element 2200 may be injection molded, extruded, and/or produced via machining or stamping. In some embodiments, the pivotal attachment element 2200 may comprise a plastic material, such as polypropylene. In some embodiments, the pivotal attachment element 2200 may comprise any flexible material including olefins, vinyl, and other plastics. In some embodiments, the pivotal attachment element 2200 may comprise metal, wood, and/or plastic. In some embodiments, the pivotal attachment element 2200 may comprise a single continuous element (e.g., with hinge portions and a pivot portion), while in other embodiments, the pivotal attachment element 2200 may comprise two separate hinge portions connected by a pivot portions, wherein the portions are separate elements attached to one another, such as by a pin.

In some embodiments, the pivotal attachment element 2200 may function as a temporary alignment feature, and therefore the material of the pivotal attachment element 2200 may comprise an overall tensile strength less than a typical hinge (e.g. permanent), as the pivotal attachment element 2200 will not be used repeatedly throughout the life of the final structure that is formed by the pivotal attachment element 2200 and the planar support elements. For example, the pivotal attachment element is not intended to serve as the primary structure attachment between the two planar support elements after assembly, since the fastener is intended to serve that role, so the pivotal attachment element can be a less durable, temporary support (e.g., merely for use during assembly and/or for use after assembly only in conjunction with primary interlocking support of the fastener). In some embodiments, the pivotal attachment element 2200 may comprise a temporary and/or degradable material, such as cardboard.

The pivotal attachment element 2200 may comprise one or more through-holes 2214, 2216 configured to allow a fastener to pass through the through-holes 2214, 2216. In some embodiments, the first hinge portion 2204 may comprise a first through-hole 2214 and the second hinge portion 2206 may comprise a second through-hole 2216. When the pivotal attachment element 2200 is folded (e.g., when the first hinge portion 2204 is rotated about the pivot portion 2202 toward the second hinge portion 2206) such that the first hinge portion 2204 contacts the second hinge portion 2206 (e.g. the second position), the through-holes 2214 and 2216 may be aligned such that a fastener may pass through both through-holes 2214 and 2216. In some embodiments, the first hinge portion 2204 and/or the second hinge portion 2206 may comprise attachment holes 2210 configured to allow for one or more fasteners to attach the pivotal attachment element 2200 to one or more planar support elements. In another embodiment, the pivotal attachment element 2200 may be attached to one or more planar support elements without the use of screws or the attachment holes 2210.

Figure 23A:
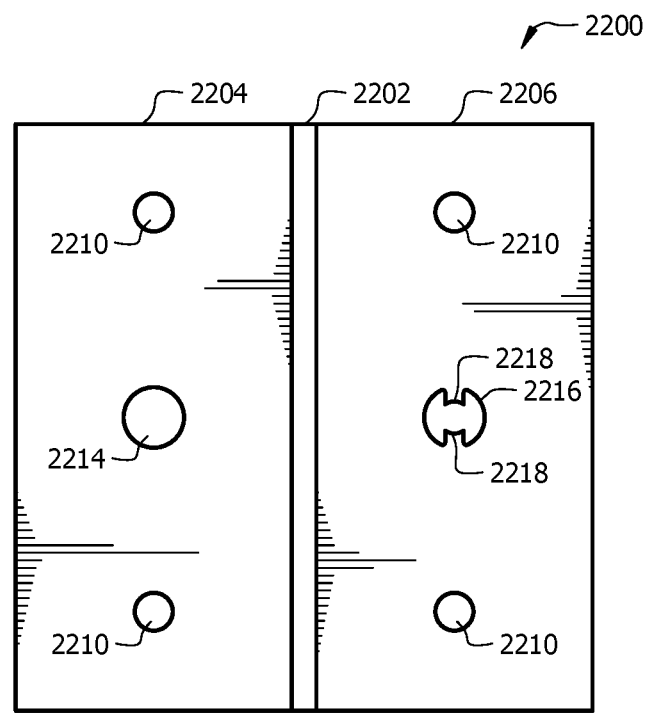
FIGS. 23A-23C illustrate another pivotal attachment element according to an embodiment of the disclosure.
Figure 23B:
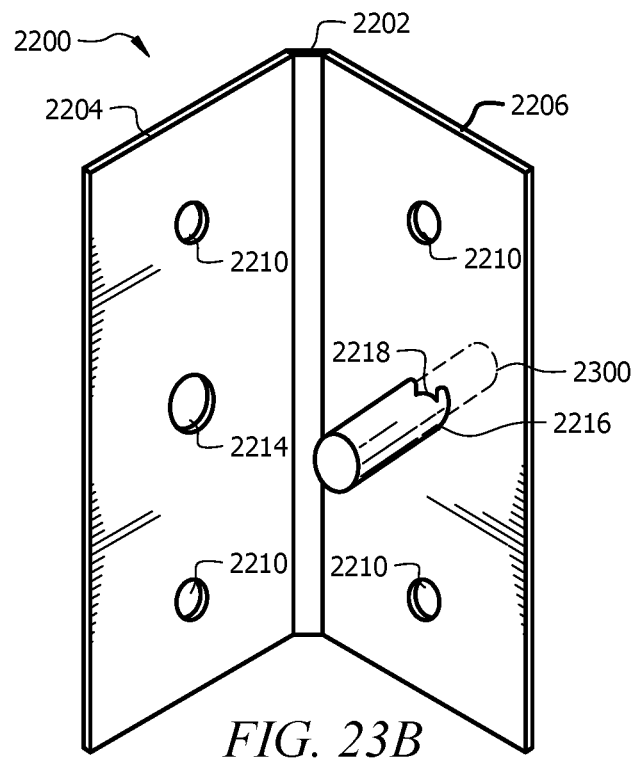
Figure 23C:
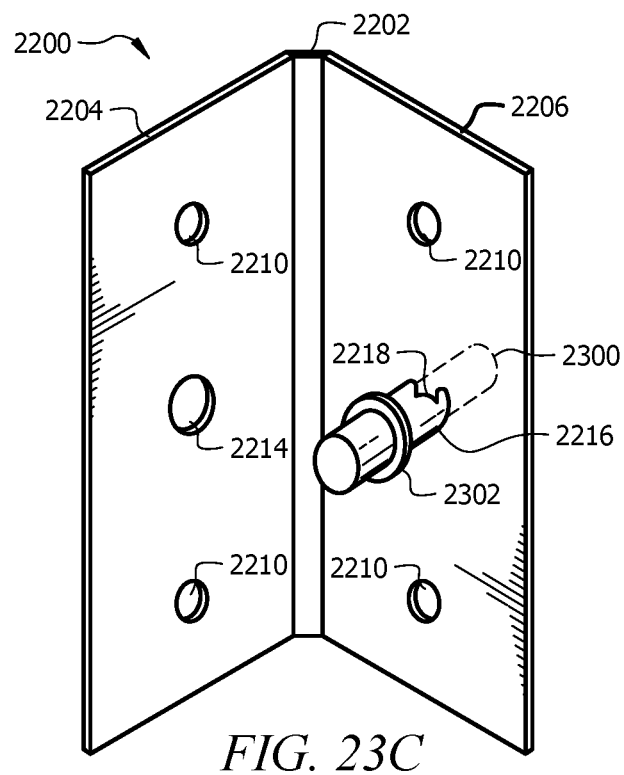

FIGS. 23A-23C illustrate another embodiment of a pivotal attachment element 2200, wherein the second through-hole 2216 may comprise a retaining feature 2218 configured to retain a fastener 2300 (e.g., during transport of the structure comprising the pivotal attachment element and/or planar support elements, for example before fixed assembly of the structure and/or permanent attachment of the planar support elements by the fastener), and configured to align the fastener 2300 during assembly of the structure. In some embodiments, the retaining feature 2218 may comprise a specific shape configured to hold a fastener 2300 in place within the through-hole 2216. In some embodiments, the second through-hole 2216 may be configured and/or shaped to at least temporarily retain the corresponding fastener 2300, which may include one or more of the following: a securing element, a screw, a bolt, a bar, a rod, a pin, or another similar fastening element. In some embodiments, the fastener 2300 may comprise a lag screw, a wood screw, or a machine bolt. FIG. 23A shows the pivotal attachment element 2200 configured with an integral retaining feature (e.g. in the second through-hole 2216), while FIGS. 23B-23C show a fastener included therein. In FIG. 23C, the retaining feature may comprise a separate disc 2302 or other retaining element attached to the fastener 2300 once it passes through the second through-hole 2216 configured to prevent the fastener 2300 from exiting the second through-hole 2216. Such a separate retaining element could be used alone or in conjunction with an integrated retaining feature (such as the tabs, etc.).

In the embodiment of FIGS. 23A-23C, the retaining feature 2218 of the second through-hole 2216 (e.g. of the second hinge portion 2206) may comprise one or more tabs configured to extend into the opening of the through-hole 2216 to contact and therefore retain a fastener 2300. In some embodiments, the second through-hole 2216 may comprise one or more of the following: tabs, teeth, zig-zag teeth, cross-slits, and/or another similar retaining shape. In some embodiments, the retaining feature 2218 may comprise a material with flexibility to allow the retaining feature 2218 to retain a fastener 2300 while still allowing the fastener 2300 to be moved into/out of the through-hole 2216 (e.g., during assembly, as moving from the second to the third position).

Figure 24:
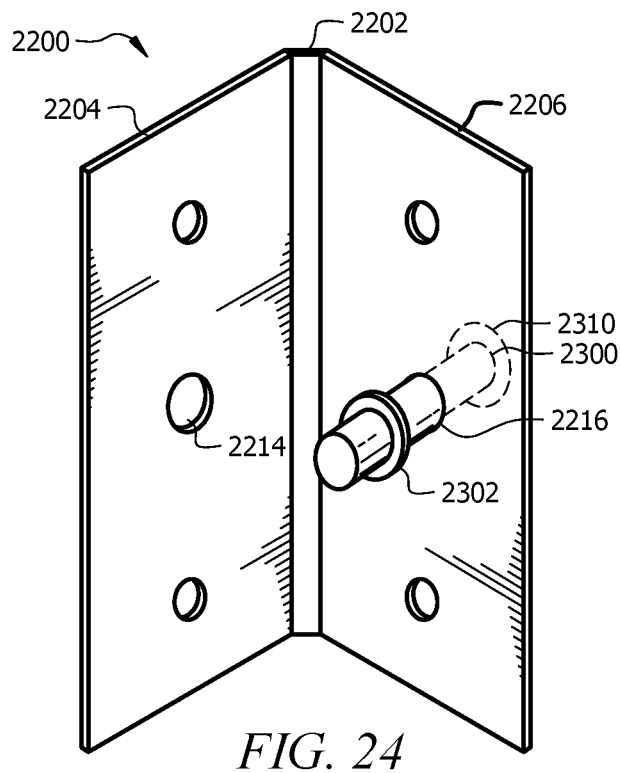
FIG. 24 illustrates another pivotal attachment element according to an embodiment of the disclosure.

Referring to FIG. 24, the retaining feature may comprise a separate disc 2302 or other retaining element attached to the fastener 2300 once it passes through the second through-hole 2216 configured to prevent the fastener 2300 from exiting the second through-hole 2216. Such a separate retaining element could be used alone or in conjunction with an integrated retaining feature (such as the tabs, etc.). In the embodiment shown in FIG. 24, the fastener 2300 may comprise a head 2310, wherein the head 2310 and the disc 2302 may prevent the fastener 2300 from exiting the second through-hole 2216.

Figure 25:
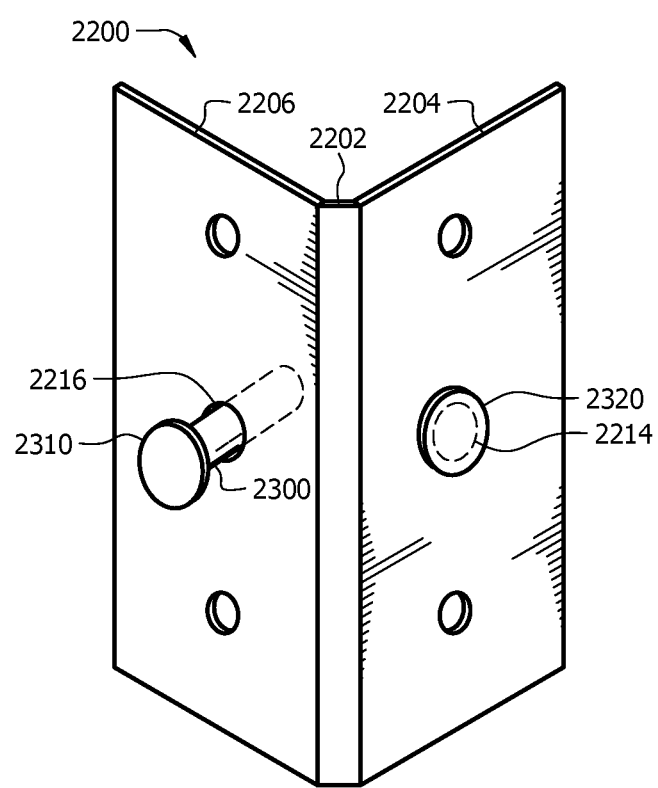
FIG. 25 illustrates another pivotal attachment element according to an embodiment of the disclosure.

Referring to FIG. 25, in some embodiments, the pivotal attachment element 2200 may also comprise a mating fastener locking element 2320 (such as a nut), corresponding to the fastener 2300. This mating fastener locking element 2320 may be integrated to the first hinge portion 2204, for example with a centerline matching that of the first through-hole 2214.

Figure 26A:
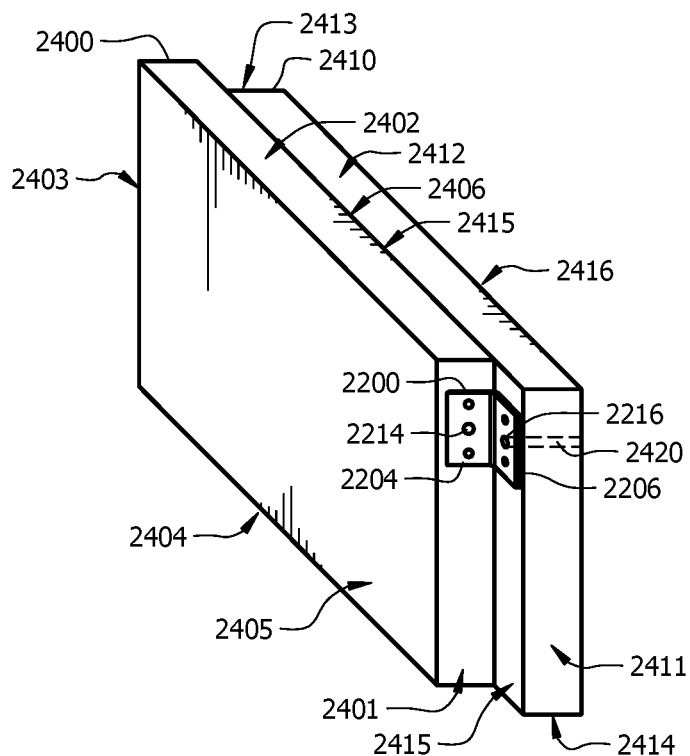
FIG. 26A illustrates an assembly device (or pivotal attachment element) in a first position (e.g., transit orientation), according to an embodiment of the disclosure.
Figure 26B:
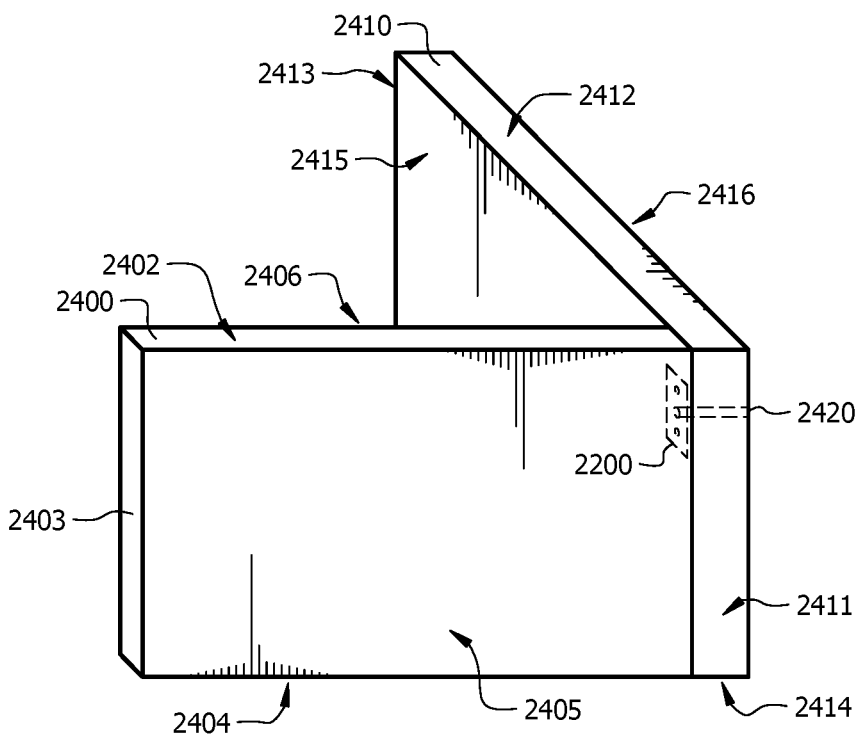
FIG. 26B illustrates the assembly device (or pivotal attachment element) in a second position (e.g., assembly start orientation), according to an embodiment of the disclosure.

FIGS. 26A-26B show an exemplary structure (e.g. formed of two planar support elements joined by a pivotal attachment element, for example as described above), and its first and second positions or configurations. FIG. 26A illustrates a first position or configuration (e.g., for storage and/or transport, for example within a box) of a first planar support element 2400 and a second planar support element 2410. The first planar support element 2400 and the second planar support element 2310 may be used to build a structure, and may be shipped to a final customer and/or stored in this first position (e.g., within a box) before being assembled into the structure. The first planar support element 2400 may comprise a first edge 2401, a second edge 2402, a third edge 2403, a fourth edge 2404, a first face 2405, and a second face 22406. The second planar support element 2410 may comprise a first edge 2411, a second edge 2412, a third edge 2413, a fourth edge 2414, a first face 2415, and a second face 2416. While FIG. 26A illustrates only two panels, it should be understood that in some embodiments, the two panels would be attached with hinges to one or more additional panels (e.g., part of an accordion fold structure).

The first position shown in FIG. 26A may be a compact position for transport of the planar support elements 2400 and 2410 (e.g., within a box, with planar support elements folded up for compact storage to reduce box size). In the embodiment shown in FIG. 26A, the planar support elements 2400 and 2410 may be parallel and contacting one another in the first position. For example, a second face 2406 of the first planar support element 2400 may be parallel to and contacting a first face 2415 of the second planar support element 2400. In some embodiments, the second face 2406 may be an inner face, and the first face 2415 may also be an inner face, wherein the inner face of each of the planar support elements may be in contact in the first position. In some embodiments, a portion of the second planar support element 2410 may extend past the first edge 2401 of the first planar support element 2400. For example, in FIG. 26A, the extending portion of the second planar support element might correspond with and/or approximate the second hinge portion dimension (e.g. width).

FIG. 26A illustrates the pivotal attachment element 2200 as attached to a first planar support element 2400 and a second planar support element 2410 in the first position. In the embodiment shown in FIG. 26A, the first hinge portion 2204 may be attached to a first edge 2401 of the first planar support element 2400, and the second hinge portion 2206 may be attached to a first face 2415 of the second planar support element 2410 (in proximity to edge 2411 of the second planar support element 2410). In some embodiments the first hinge portion 2204 and the second hinge portion 2206 may be attached to the first planar support element 2400 and the second planar support element 2410 via screws, snaps, adhesive, tapes, grooves, ridges, slots (e.g., to slide the hinge portions into), and/or a gib and slide assembly. In some embodiments, the first hinge portion 2204 and/or the second hinge portion 2206 may be recessed into the material of the first planar support element 2400 and/or the second planar support element 2410 (e.g., so that their outer surface is approximately flush with the surface into which they are each recessed). In some embodiments, the first hinge portion 2204 and the second hinge portion 2206 may be directly incorporated into the material of the first planar support element 2400 and the second planar support element 2410, for example, if the first planar support element 2400 and the second planar support element 2410 comprise a molded plastic material, and the first hinge portion 2204 and the second hinge portion 2206 are molded into the first planar support element 2400 and the second planar support element 2410.

Also, in the embodiment shown in FIG. 26A, the first hinge portion 2204 and the second hinge portion 2206 may be perpendicular to one another, about the central pivot portion 2202 (shown in FIG. 22) in the first position. The first position (shown in FIG. 26A) may allow the two planar support elements 2400 and 2410 to lay flat against one another for transport purposes, where the pivotal attachment element 2200 may attach the two planar elements 2400 and 2410 while allowing them to lay flat. Once a customer wishes to assemble a structure that includes the two planar support elements 2400 and 2410, they may be move from the first position to a second position or configuration (e.g., for assembly of a corner of a structure).

In the embodiment shown in FIG. 26A, the second planar support element 2410 may comprise a receiving hole 2420 that extends through the thickness of the second planar support element 2410, wherein the receiving hole 2420 is configured to allow a fastener to fit through the receiving hole 2420 and into the pivotal attachment element 2200. Typically, the fastener (sized to fit through the receiving hole 2420, the holes in the hinge and the hole in the first planar support element) would be located and retained within the second planar support element in the first position (e.g. before assembly).

The second planar support element may comprise a receiving hole, wherein the receiving hole may comprise a counter-drilled (or counter-bore, or counter-sink) section configured to fit the shape of the fastener and allow the fastener to be completely recessed within the thickness of the second planar support element (e.g., in the first and/or second positions).

FIG. 26B illustrates a second position of the two planar support elements 2400 and 2410. In the embodiment shown in FIG. 26B, the first planar support element 2400 and the second planar support element 2410 may be rotated with respect to one another about the pivotal attachment element 2200, from the first position to the second position. In some embodiments, the two planar support elements 2400 and 2410 may create a corner element or section of a structure. In the embodiment shown in FIG. 26B, the two planar support elements are now perpendicular to one another, with the first edge 2401 of the first planar support element 2400 contacting the inner surface 2415 of the second support element 2410. Typically, the outer face 2405 of the first planar support element would be flush with the outer edge 2411 of the second planar support element in the second position. As with FIG. 26A, FIG. 26D could be a portion of an accordion fold structure.

When moving from the first position (FIG. 26A) to the second position (FIG. 26B), the first hinge portion 2204 and second hinge portion 2206 may rotate toward one another, and in the second position may be contacting and parallel. The pivotal attachment element 2200 (shown in dashes in FIG. 26B) may be positioned between the first edge 2401 of the first planar support element 2400 and the first surface 2415 of the second planar support element 2410. The first through-hole 2214 may (auto) align with the second through-hole 2216 as well as the receiving hole 2420 and/or a nut and/or a guide hole in the first planar support element (e.g., aligned with the first through-hole 2214). Then, a fastener may be attached from the receiving hole 2420 into a portion of the first edge 2401 of the first planar support element 2400. For example, a retained fastener may be used to attach and secure the first and second planar support elements, locking them into the second position (and such a locked/fixed position with the fastener extending into both planar support elements) might be termed a third position, as discussed below.

Figure 27A:
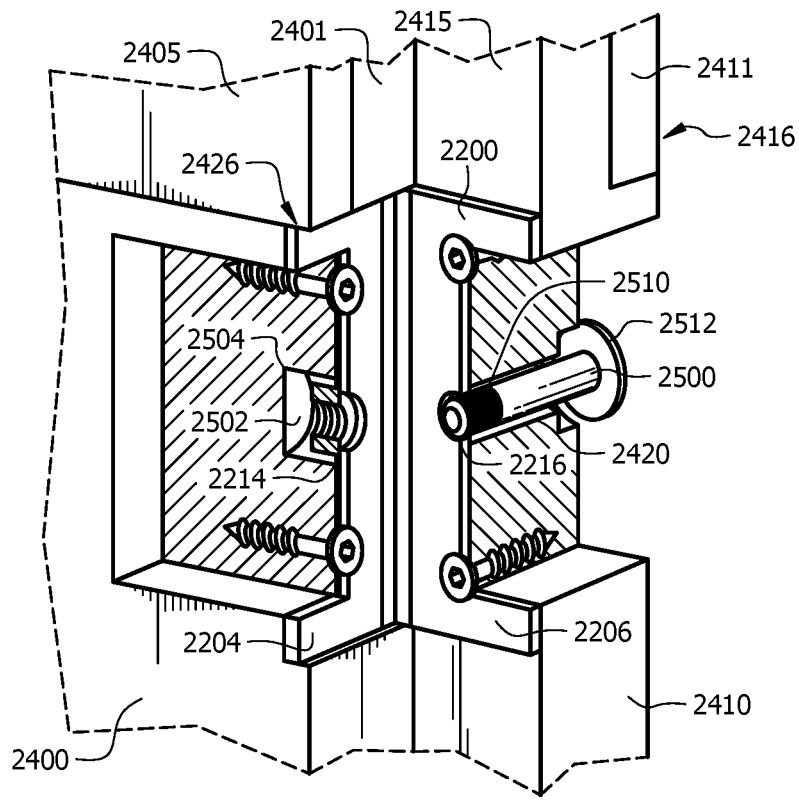
FIG. 27A illustrates an assembly device (or pivotal attachment element) in a first position (e.g., transit orientation), according to an embodiment of the disclosure.
Figure 27B:
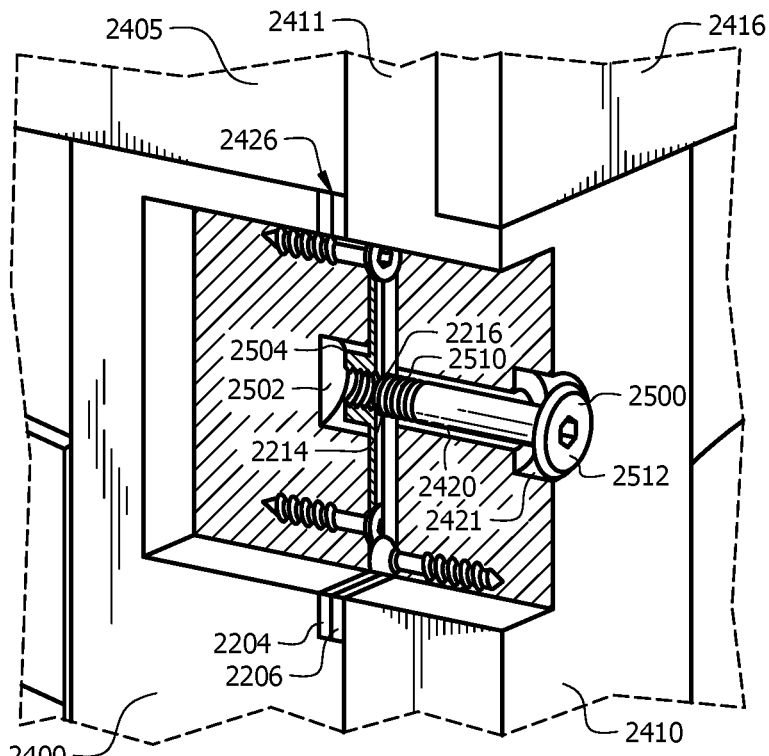
FIG. 27B illustrates the assembly device (or pivotal attachment element) in a second position (e.g., assembly start orientation), according to an embodiment of the disclosure.
Figure 27C:
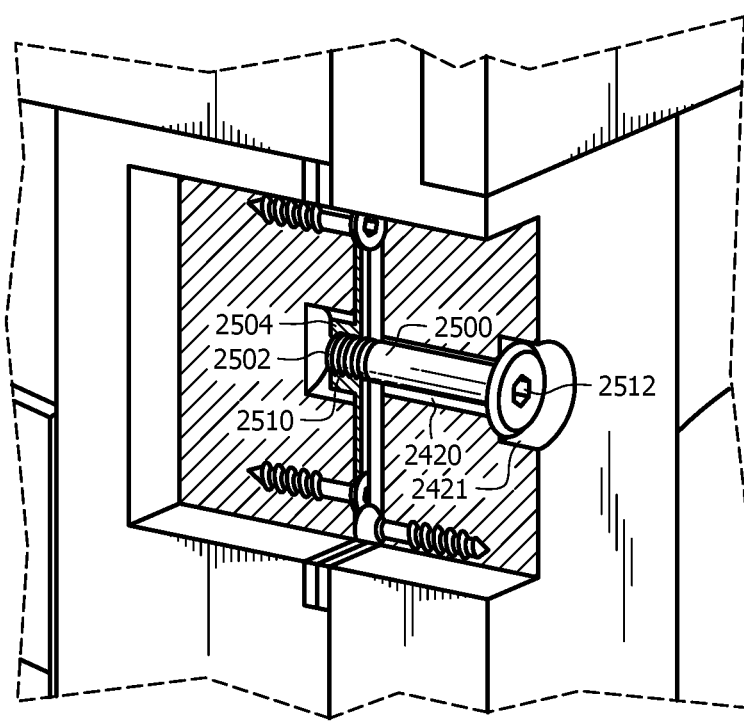
FIG. 27C illustrates the assembly device (or pivotal attachment element) in a third position (e.g., assembly complete orientation), according to an embodiment of the disclosure.

Referring now to FIGS. 27A-27C, a detailed view of the first planar support element 2400, the second planar support element 2410, and an assembly device comprising the pivotal attachment element 2200 and the fastener 2500 is shown. In the embodiment shown in FIGS. 27A-27C, the fastener may comprise a bolt 2500 (comprising a head 2512 and a threaded portion 2510) and a corresponding mating fastener locking element (e.g. a nut) 2502 may be used to attach the first planar support element 2400 to the second planar support element 2410, but in other embodiments, a different fastener and/or corresponding mating fastener locking element may be used. In FIGS. 27A-27C, a partial cut-away in shown (e.g., with outer surfaces removed to more clearly illustrate internal elements and how they interact in different positions).

FIG. 27A illustrates a first position, similar to the first position shown in FIG. 26A, where the planar support elements 2400 and 2410 may be parallel and the hinge portions 2204 and 2206 may be perpendicular. The fastener 2500 (e.g., a bolt) may be inserted into the receiving hole 2420, and may be held in position within the second planar support element (e.g., in the first position, pre-assembly, for example during shipment/storage) by the second through-hole 2216 (as described above) and/or a separate retaining element. In some embodiments, the first planar support element 2400 may comprise a pre-drilled hole 2502 configured to receive the fastener 2500. In some embodiments, the pre-drilled hole 2502 may also or instead comprise a nut 504 (or other similar attachment element, for example a mating fastener locking element) configured to interface with the fastener 2500. In some embodiments, the mating fastener locking element may be integrated within the pivotal attachment element 2200. In an alternative embodiment, the fastener 2500 may thread directly into the material of the first planar support element via the pre-drilled (e.g., pilot/guide) hole. In some embodiments, the pre-drilled hole 2502 and/or mating fastener locking element may align with the first through-hole 2214 of the pivotal attachment element 2200 (e.g., with corresponding centerlines and/or sized to correspond with and/or mate with the fastener 2500).

The receiving hole 2420 may comprise a counter-drilled (or counter-bore, or counter-sink) section 2421 configured to fit the shape of the fastener 2500 and allow the fastener 2500 (e.g., the head 2512 of the fastener 2500) to be completely recessed within the thickness of the second planar support element 2410 (e.g., in the first and/or second positions). The countersink hole 2420, 2421 may pass through the second planar support element 2410 and/or retaining feature/element, so that the fastener 2500 is retained in the second planar support element 2410 pre-assembly. In some embodiments, the counter-drilled section 2421 may be at least as deep as the length of the threaded portion 2510 of the fastener 2500.

In some embodiments, the first edge 2401 of the first planar support element 2400 may comprise a recessed portion 2426 configured to fit the pivotal attachment element 2200, allowing the pivotal attachment element 2200 to be inset into the material of the first edge 2401. In some embodiments, the first face 2415 of the second planar support element 2410 may also comprise a recess portion, while in other embodiments, the recessed portion 2426 may be sized to fit the entire pivotal support element 2200 in the second position (shown in FIG. 27B).

FIG. 27B illustrates a second position, similar to the second position shown in FIG. 26B, where the planar support elements 2400 and 2410 may be perpendicular and the hinge portions 2204 and 2206 may be parallel. As shown in FIG. 27B, in some embodiments, the receiving hole 2420 may comprise a counter-drilled (or counter-bore, or counter-sink) section 2421 configured to fit the shape of the fastener 2500 and allow the fastener 2500 to be completely recessed within the thickness of the second planar support element 2410 (e.g., in the first and/or second positions).

FIG. 27C illustrates a third (e.g., secured) position (e.g., when the second position of the planar support elements has been locked/secured/fixed via the fastener extending through the second planar support element into the first planar support element, for example to provide rigid fixing attachment, for example by interaction with the mating fastener locking element), after the second position of FIG. 27B, where the fastener 2500 has been threaded into the pre-drilled hole 2502 (and/or the nut 2504 or other mating fastener locking element). In some embodiments, once the fastener 2500 has been threaded into the pre-drilled hole 2502, and the first planar support element 2400 is attached to the second planar support element 2410, a cap may be inserted into the receiving hole 2420 over the fastener 2500 covering the fastener (to provide a flush surface).

Embodiments of the disclosure may also comprise a method for manufacture and/or assembly of a structure comprising at least a first planar support element and a second planar support element. The method may comprise attaching the first planar support element to the second planar support element via a pivotal attachment element. Attaching may comprise attaching a first hinge portion of the pivotal attachment element to a first edge of the first planar support element, and attaching a second hinge portion of the pivotal attachment element to a first face of the second planar support element. Attaching may comprise attaching with screws, snaps, adhesive, and/or another attachment mechanism.

In some embodiments, before attaching, the method may comprise arranging the first planar support element and the second planar support element into a first position, wherein the planar support elements are parallel, and wherein a second face of the first planar support element is contacting a first face of the second planar support element. In some embodiments, the first position may comprise extending the second planar support element past a first edge of the first planar support element. In some embodiments, before attaching the first planar support element to the second planar support element via the pivotal attachment element, the method may comprise positioning the pivotal attachment element in the first position, wherein the first hinge portion may be perpendicular to the second hinge portion.

The method may comprise moving the first planar support element and the second planar support element from the first position to a second position. Moving may comprise rotating the first planar support element about the pivotal attachment element, with respect to the second planar support element, to the second position. Moving may comprise rotating the first hinge portion toward the second hinge portion about a pivot portion of the pivotal attachment element. In the second position, the planar support elements may be perpendicular, and the hinge portions of the pivotal attachment element may be parallel and contacting.

The method may comprise aligning a first through-hole of the pivotal attachment element with a second through-hole of the pivotal attachment element. The method may comprise retaining a fastener within the pivotal attachment element while in the first position. The fastener may be retained within the second-through hole of the pivotal attachment element. The method may comprise aligning the fastener with the first through-hole of the pivotal attachment element.

Some embodiments of the disclosure may comprise a method, the method comprising attaching a first planar support element to a second planar support element of a structure using a pivotal attachment element (e.g., a hinge), wherein the pivotal attachment element is attached to a first edge of the first planar support element and a first face of the second planar support element, such that the structure has a first position (wherein a second face of the first planar support element is contacting the first face of the second planar support element) and a second position (wherein the first edge of the first planar support element is contacting the first face of the second pivotal support element); placing/arranging/positioning the structure into the first position; providing a box sized for transport of the structure; placing structure within the box (e.g. wherein the box is sized for the planar support elements in the first position); transporting the structure with the box (to a customer/user); removing the structure from box with the structure in the first position (wherein a fastener is retained within the pivotal attachment element); (repositioning, e.g., by pivoting) moving structure to the second position (e.g. pivoting planar support element about the pivotal attachment element) (e.g. auto aligns one or more holes in the pivotal attachment element and/or planar support elements, and the fastener for attachment of the first and second planar support element); and/or attaching the two planar support elements while in the second position via fastener (e.g., forming rigid attachment to form corner) (e.g., moving the structure to a third position wherein the fastener is secured to both the first planar support element and the second planar support element).

In some embodiments, moving and attaching is performed using only one person (with no extra set of hands) (wherein the structure is self-supporting, self-aligning, and/or self-retaining). In some embodiments, wherein a hinge portion of the pivotal attachment element is perpendicular to floor as the structure is moved from the first position to the second position. In some embodiments, further comprising attaching via the fastener without the need to remove a retaining element (e.g. a retaining element within the pivotal support element (hinge) configured to retain the fastener while the structure is in the first position). In some embodiments, wherein one or both of the planar support elements comprise a pilot hole aligned with the fastener. In some embodiments, wherein one or both of the planar support elements comprise a pilot hole and a nut aligned with the fastener. In some embodiments, wherein a hole in the second planar support element is a countersink hole, such that in the second and third positions, the fastener head does not extend out from the side/face of the second planar support element (e.g., is substantially contained within the second planar support element). In some embodiments, wherein the fastener comprises a securing element, a screw, a bolt, a bar, a rod, a pin, or another similar fastening element. In some embodiments, wherein repositioning the structure from the first to second positions (auto) aligns the retained fastener in the second planar support element, through-holes in the pivotal attachment element, and mating fastener locking element in the first planar support element.

In an exemplary method of the disclosure, a consumer may receive a product to be assembled with mating components and/or panels pre-attached ready to assemble. The consumer may remove the pre-attached panels (planar support elements) from a box and orient the panels for final assembly position. All hardware and mechanisms may be pre-attached (as the assembly device described above) and ready "Out of the Box". The consumer may drive the fastener (e.g., a machine bolt or lag screw) into place for final set up.

Having described various devices and methods herein, exemplary embodiments or aspects can include, but are not limited to:

In a first embodiment, a foldable play structure may comprise at least four panels each connected to another to provide an accordion fold structure; at least two corner hinges comprising a first hinge portion attached to one panel of the at least four panels, wherein the first hinge portion comprises a first through-hole; a second hinge portion attached to another panel of the at least four panels, wherein the second hinge portion comprises a second through-hole; and a fastener configured to be retained within either the first portion or the second portion, wherein the first and second through-holes are sized for interaction with the fastener; and at least one mid-wall hinge attached to two of the at least four panels and located between the at least two corner hinges; wherein the accordion fold play structure comprises two configurations, wherein in a first configuration, the at least four panels of the accordion fold structure are folded to be stacked in substantially parallel planes, and for each corner hinge the first hinge portion is perpendicular to the second hinge portion, and wherein in a second configuration, the at least four panels are unfolded forming a play structure, the panels attached to each corner hinge are perpendicular to each other, for each corner hinge the first hinge portion is parallel to the second hinge portion, and the first through-hole aligns with the second through-hole.

A second embodiment can include the foldable play structure of the first embodiment, wherein the accordion fold play structure further comprises a third configuration similar in orientation of the panels and corner hinges in the second configuration, wherein in the first and second configuration, the fastener does not extend across both the first hinge portion and the second hinge portion of the corresponding corner hinge and does not attach the panels joined by the corresponding corner hinge, and wherein in a third configuration, the fastener extends through and fixedly attaches the panels joined by the corresponded corner hinge.

A third embodiment can include the foldable play structure of the second embodiment, wherein the panel opposite the hinge portion retaining the fastener comprises a mating fastener locking element which corresponds to the fastener and is aligned in the second configuration with the fastener and through-holes, and wherein as the fastener is driven to the third configuration, it tightens on the mating fastener locking element to lock the two panels rigidly together.

A fourth embodiment can include the foldable play structure of any of the first through third embodiments, wherein the first hinge portion is attached to a first edge of a first panel of the at least four panels, and wherein the second hinge portion is attached to a first face of a second panel of the at least four panels.

A fifth embodiment can include the foldable play structure of the fourth embodiment, wherein the second through-hole aligns with a receiving hole through the second panel, and wherein the receiving hole is a countersink hole.

A sixth embodiment can include the foldable play structure of the fifth embodiment, wherein the countersink hole depth is approximately equal to the threaded engagement of the fastener with the first panel.

A seventh embodiment can include the foldable play structure of any of the fourth through sixth embodiments, wherein the second panel comprises a receiving hole through the thickness of the second panel configured to hold the fastener and configured to align with the second through-hole.

An eighth embodiment can include the foldable play structure of any of the first through seventh embodiments, wherein the corner hinge comprises a living hinge.

An ninth embodiment can include the foldable play structure of any of the first through eighth embodiments, wherein the corner hinge further comprises a pivot portion attaching the first hinge portion to the second hinge portion, wherein the first hinge portion and the second hinge portion are configured to rotate with respect to each other about the pivot portion.

A tenth embodiment can include the foldable play structure of any of the first through ninth embodiments, wherein the corner hinge further comprises a retaining feature configured to retain the fastener within the corner hinge.

An eleventh embodiment can include the foldable play structure of the tenth embodiment, wherein the retaining feature comprises one or more tabs (or other extrusions) extending into the opening of a through-hole of the hinge.

A twelfth embodiment can include the foldable play structure of any of the first through eleventh embodiments, wherein the play structure comprises a play house.

A thirteenth embodiment can include the foldable play structure of the twelfth embodiment, wherein the plurality of panels comprises at least two end panels and at least one interior panel between the two end panels, and wherein each end panel is connected to only one of the plurality of panels and each interior panel is attached to two of the plurality of panels.

A fourteenth embodiment can include the foldable play structure of any of the first through thirteenth embodiments, further comprising a gable roof comprising at least two roof panels connected along a roof hinge, and at least one gable located between the two roof panels and connected to both of the two roof panels, wherein the gabled roof is configured to attach to the plurality of panels at the top of the panels.

A fifteenth embodiment can include the foldable play structure of the fourteenth embodiments, wherein the at least one gable comprises a hinge along a center line of the gable, wherein in the first configuration the gable is configured to fold along the hinge when the two roof panels are folded toward one another, and in the second configuration the gable is configured to unfold.

A sixteenth embodiment can include the foldable play structure of any of the first through fifteenth embodiments, wherein the play structure comprises a play table.

A seventeenth embodiment can include the foldable play structure of the sixteenth embodiment, wherein the accordion fold structure comprises two face panels, four side panels, four corner hinges, and at least two mid-wall hinges, wherein one mid-wall hinge connects a first side panel and a second side panel, and wherein one corner hinge connects each side panel to a face panel.

In an eighteenth embodiment, a corner hinge for use in an accordion fold structure may comprise a first hinge portion configured to attach to a first panel of the accordion fold structure; a second hinge portion configured to attach to a second panel of the accordion fold structure; a pivot portion attaching the first hinge portion to the second hinge portion, wherein the first hinge portion and the second hinge portion are configured to rotate with respect to each other about the pivot portion; a fastener configured to be retained within the corner hinge, in a first configuration, and configured to attach the first panel to the second panel, in a second configuration; and a retaining feature configured to retain the fastener within the corner hinge while in the first configuration, without interfering with the ability of the fastener to pass through both hinge portions in the second configuration, wherein in the first configuration of the hinge, the first panel is parallel to the second panel, and the first hinge portion is perpendicular to the second hinge portion, wherein in the second configuration of the corner hinge, the first panel is perpendicular to the second panel, and the first hinge portion is parallel to the second hinge portion, and wherein in a third configuration, the fastener attaches the first and second panels by passing through a receiving hole in the second panel, two through-holes in the first and second hinge portions and into the first and second panels, rigidly locking the panels into the second configuration.

In a nineteenth embodiment, a method of assembling a play structure may comprise providing a play structure with an accordion fold structure comprising a plurality of panels each connected to another, and at least two corner hinges each attached to two panels of the accordion fold structure, and a fastener configured to be retained within the corner hinge; orienting the playhouse so that a bottom edge of each panel is located on the ground in a first configuration of the accordion fold structure, wherein in the first configuration, the plurality of panels are folded to be stacked in substantially parallel planes; unfolding the playhouse from the first configuration to a second configuration of the accordion fold structure, wherein in the second configuration, the plurality of panels are unfolded forming a playhouse; and attaching the two panels joined by each corner hinge to each other with the fastener.

A twentieth embodiment can include the method of the nineteenth embodiment, wherein providing the play structure further comprises arranging a first panel and a second panel into a first position, wherein the panels are parallel, and wherein a second face of the first panel is contacting a first face of the second panel; positioning a hinge in the first position, wherein a first hinge portion of the hinge may be perpendicular to a second hinge portion of the hinge; attaching the hinge to the first panel and to the second panel; and retaining a fastener within the hinge, wherein the fastener is configured to attach the first panel to the second panel.

In a twenty-first embodiment, a structure may comprise a first planar support element; a second planar support element; at least one pivotal attachment element (e.g. hinge) comprising a first (hinge) portion attached to the first planar support element; and a second (hinge) portion attached to the second planar support element; and a fastener corresponding to the pivotal attachment element, wherein in a first position of the structure, the first planar support element is parallel to the second planar support element (e.g. with a face of the first planar support element contacting a face of the second planar support element), and the first (hinge) portion is perpendicular to the second (hinge) portion, wherein in a second position of the structure, the first planar support element is perpendicular to the second planar support element (e.g., with an edge of the first planar support element contacting the face of the second pivotal support element), and the first (hinge) portion is parallel to the second (hinge) portion, and wherein the fastener is configured to be retained within the pivotal attachment element in the first position and/or the second position.

A twenty-second embodiment can include the structure of the twenty-first embodiment, wherein in a third position of the structure, the fastener is configured to extend through and fixedly (rigidly) attach the first planar support element to the second planar support element (when oriented as described in the second position).

A twenty-third embodiment can include the structure of the twenty-second embodiment, wherein the first planar support element comprises a mating fastener locking element/mechanism (e.g., a nut, predrilled hole, guide hole) within/adjacent to the first through-hole which corresponds to the fastener (e.g. bolt, screw) and is aligned in the second position with the fastener and through-holes, wherein as the fastener is driven to the third position, it tightens on the mating fastener locking element/mechanism to lock/secure the two planar support elements rigidly together.

A twenty-fourth embodiment can include the structure of the twenty-second or twenty-third embodiment, wherein the pivotal attachment element is not sufficiently durable for repeated use, but is merely a temporary positioner (which is not needed once the fastener is attached in the third position).

A twenty-fifth embodiment can include the structure of the twenty-fourth embodiment, wherein the pivotal attachment element provides less than approximately 5, 10, 20, and/or 50 uses (moving between positions) before failure.

A twenty-sixth embodiment can include the structure of any of the twenty-first through twenty-fifth embodiments, comprising two pivotal attachment elements and two fasteners, each joining the first planar support element to the second planar support element.

A twenty-seventh embodiment can include structure of any of the twenty-first through twenty-sixth embodiments, wherein the first (hinge) portion is attached to a first edge of the first planar support element, and wherein the second (hinge) portion is attached to a first face of the second planar support element (e.g., in proximity to a first edge of the second planar support element, with the first (hinge) portion spaced from the first edge of the second planar support element an amount approximately equal to the width of the first edge of the first planar support element, so that in the second position, the first edge of the second planar support element is flush with a second face of the first planar support element).

A twenty-eighth embodiment can include the structure of any of the twenty-first to twenty-seventh embodiments, wherein the first (hinge) portion comprises a first through-hole, wherein the second (hinge) portion comprises a second through-hole, wherein the first and second through-holes are sized for interaction with the fastener, and wherein in the second position the first through-hole aligns with the second through-hole.

A twenty-ninth embodiment can include the structure of the twenty-eighth embodiment, wherein the second through-hole aligns with a receiving hole through the second planar support element, and wherein the receiving hole is a countersink hole.

A thirtieth embodiment can include the structure of the twenty-ninth embodiment, wherein the countersink hole depth is approximately equal to the threaded engagement of the fastener with the first planar support element.

A thirty-first embodiment can include the structure of the twenty-eighth through thirtieth embodiments, wherein the fastener is retained within the second through-hole in the first position (e.g. the structure further comprising a retaining element or feature configured to retain the fastener in place within the second (hinge) portion and/or the second planar support element in the first position (without passing through the first through-hole and/or connection/attaching to the first planar support element) while allowing the fastener to automatically align with and pass through both the first and second through-holes in the second position and/or third position).

A thirty-second embodiment can include the structure of any of the twenty-eighth through thirty-first embodiments, wherein the second planar support element comprises a receiving hole through the thickness of the second planar support element configured to hold the fastener and configured to align with the second through-hole.

A thirty-third embodiment can include the structure of any of the twenty-first through thirty-second embodiments, wherein the pivotal attachment element comprises a living hinge.

A thirty-fourth embodiment can include the structure of any of the twenty-first through thirty-third embodiments, wherein the planar support elements comprise one or more walls of the structure.

A thirty-fifth embodiment can include the structure of any of the twenty-first through thirty-fourth embodiments, wherein the pivotal attachment element further comprises a pivot portion attaching the first (hinge) portion to the second (hinge) portion, wherein the first (hinge) portion and the second (hinge) portion are configured to rotate with respect to each other about the pivot portion.

A thirty-sixth embodiment can include the structure of any of the twenty-first through thirty-fifth embodiments, wherein the pivotal attachment element further comprises a retaining feature configured to retain the fastener within the pivotal attachment element.

A thirty-seventh embodiment can include the structure of the thirty-sixth embodiment, wherein the retaining feature comprises one or more tabs (or other extrusions) extending into the opening of a through-hole of the pivotal attachment element.

A thirty-eighth embodiment can include the oxygen sensor of any of the twenty-first through thirty-seventh embodiments, further comprising a box (e.g., for shipping the structure) wherein in the first position, the structure fits and is located (relatively snuggly) within the box.

In a thirty-ninth embodiment, a pivotal attachment element may comprise a first (hinge) portion configured to attach to (an edge of) a first planar support element; a second (hinge) portion configured to attach to (a face of) a second planar support element; a pivot portion attaching the first (hinge) portion to the second (hinge) portion, wherein the first (hinge) portion and the second (hinge) portion are configured to rotate with respect to each other about the pivot portion; a fastener configured to be retained within the pivotal attachment element (in a first position, e.g., within one hinge portion but no passing through the other hinge portion), and configured to attach the first planar support element to the second planar support element (e.g. in a second position); and a retaining feature configured to retain the fastener within the pivotal attachment element (e.g. during the first position, without interfering with the ability of the fastener to pass through both portions in the second position), wherein in the first position of the pivotal attachment element, the first planar support element is parallel to the second planar support element, and the first (hinge) portion is perpendicular to the second (hinge) portion, wherein in the second position of the pivotal attachment element, the first planar support element is perpendicular to the second planar support element, and the first (hinge) portion is parallel to the second (hinge) portion, and wherein in a third position, the fastener attaches the first and second planar support elements by passing through a receiving hole in the second planar support element, two through-holes in the first and second hinge portions and into the first and second planar support elements, rigidly locking the planar support elements into the second position (perpendicular and attached).

A fortieth embodiment can include the pivotal attachment element of the thirty-ninth embodiment, wherein the first (hinge) portion comprises a first through-hole, wherein the second (hinge) portion comprises a second through-hole, and wherein in the second position the first through-hole aligns with the second through-hole.

A forty-first embodiment can include the pivotal attachment element of the thirty-ninth or fortieth embodiments, wherein the pivotal attachment element comprises a living hinge.

A forty-second embodiment can include the pivotal attachment element of any of the thirty-ninth to forty-first embodiments, wherein the retaining feature comprises one or more tabs extending into the opening of a through-hole of the pivotal attachment element.

In a forty-third embodiment, a method of assembling a structure may comprise arranging a first planar support element and a second planar support element into a first position, wherein the planar support elements are parallel, and wherein a second face of the first planar support element is contacting a first face of the second planar support element; positioning a pivotal attachment element in the first position, wherein a first (hinge) portion of the pivotal attachment element may be perpendicular to a second (hinge) portion of the pivotal attachment element; attaching the pivotal attachment element to the first planar support element and to the second planar support element; retaining a fastener within the pivotal attachment element, wherein the fastener is configured to attach the first planar support element to the second planar support element; moving the first planar support element and the second planar support element from the first position to a second position by rotating about the pivotal attachment element, wherein the planar support elements are perpendicular; and attaching the first planar support element to the second planar support element while in the second position via the fastener.

A forty-fourth embodiment can include the method of the forty-third embodiment, further comprising transporting the structure (e.g., in a box) while in the first position.

A forty-fifth embodiment can include the method of the forty-third or forty-fourth embodiments, wherein retaining a fastener comprises retaining the fastener within a through-hole of the pivotal attachment element.

A forty-sixth embodiment can include the method of any of the forty-third to forty-fifth embodiments, wherein moving the first planar support element and the second planar support element from the first position to the second position comprises aligning a first through-hole of the pivotal attachment element with a second through-hole of the pivotal attachment element.

A forty-seventh embodiment can include the method of any of the twenty-third to forty-sixth embodiments, wherein moving the first planar support element and the second planar support element from the first position to the second position comprises rotating the first (hinge) portion with respect to the second (hinge) portion (or vice versa).

In a forty-eighth embodiment, a foldable playhouse may comprise a plurality of panels each connected to another by at least one hinge to provide an accordion fold structure, wherein the accordion fold play structure comprises two configurations, in a first configuration, the plurality of panels are folded to be stacked in substantially parallel planes, and in a second configuration, the plurality of panels are unfolded forming a playhouse.

A forty-ninth embodiment can include the foldable playhouse of the forty-eighth embodiment, wherein in the first configuration the hinges are exposed, and in the second configuration the hinges are positioned between the panels.

A fiftieth embodiment can include the foldable playhouse of the forty-eighth or forty-ninth embodiments, wherein the accordion fold structure comprises at least two corner hinges and at least one mid-wall hinge located between the at least two corner hinges.

A fifty-first embodiment can include the foldable playhouse of the fiftieth embodiment, wherein the accordion fold structure comprises four corner hinges, and wherein at least one mid-wall hinge separates any two corner hinges.

A fifty-second embodiment can include the foldable playhouse of the fiftieth or fifty-first embodiment, wherein the accordion fold structure comprises eight panels, wherein a first panel is connected to a second panel via a corner hinge, wherein the second panel is connected to a third panel via a mid-wall hinge, wherein the third panel is connected to a fourth panel via a corner hinge, wherein the fourth panel is connected to a fifth panel via a mid-wall hinge, wherein the fifth panel is connected to a sixth panel via a corner hinge, wherein the sixth panel is connected to a seventh panel via a mid-wall hinge, wherein the seventh panel is connected to an eighth panel via a corner hinge, and wherein the eighth panel is configured to contact the first panel when the playhouse is in the second configuration.

A fifty-third embodiment can include the foldable playhouse of any of the forty-eighth through fifty-second embodiments, further comprising at least one mid-wall hinge attached to an edge of a first panel and an edge of a second panel, wherein in the first configuration the mid-wall hinge allows the panels to be stacked and contacting at the faces of the panels, and in the second configuration the mid-wall hinge allows the panels to be parallel and contacting at the edges of the panels, forming a continuous plane.

A fifty-fourth embodiment can include the foldable playhouse of the fifty-third embodiment, further comprising at least one corner hinge attached to an edge of a third panel and a face of a fourth panel, wherein in the first configuration the corner hinge allows the panels to be stacked and contacted at the faces of the panels, and in the second configuration the corner hinge allows the panels to be orthogonal forming a corner of the foldable playhouse.

An fifty-fifth embodiment can include the foldable playhouse of any of the forty-eighth through fifty-fourth embodiments, wherein the plurality of panels comprises at least two end panels and at least one interior panel between the two end panels, and wherein each end panel is connected to only one of the plurality of panels and each interior panel is attached to two of the plurality of panels.

A fifty-sixth embodiment can include the foldable playhouse of any of the forty-eighth through fifty-fifth embodiments, further comprising a gable roof comprising at least two roof panels connected along a roof hinge, and at least one gable located between the two roof panels and connected to both of the two roof panels, wherein the gabled roof is configured to attach to the plurality of panels at the top of the panels.

A fifty-seventh embodiment can include the foldable playhouse of the fifty-sixth embodiment, wherein the at least one gable comprises a hinge along a center line of the gable, wherein in the first configuration the gable is configured to fold along the hinge when the two roof panels are folded toward one another, and in the second configuration the gable is configured to unfold.

In an fifty-eighth embodiment, a foldable play structure may comprise a plurality of panels each connected to another by at least one hinge to provide an accordion fold structure, wherein the accordion fold play structure comprises two configurations, in a first configuration, the plurality of panels are folded to be stacked in substantially parallel planes, and in a second configuration, the plurality of panels are unfolded forming a play structure.

A fifty-ninth embodiment can include the foldable play structure of the fifty-eighth embodiment, wherein the play structure comprises a play table.

A sixtieth embodiment can include the foldable play structure of the fifty-ninth embodiment, wherein the accordion fold structure comprises two face panels, four side panels, four corner hinges, and at least two mid-wall hinges.

A sixty-first embodiment can include the foldable play structure of any of the fifty-ninth through sixtieth embodiments, wherein one mid-wall hinge connects a first side panel and a second side panel.

A sixty-second embodiment can include the foldable play structure of any of the fifty-ninth through sixty-first embodiments, wherein one corner hinge connect each side panel to a face panel.

A sixty-third embodiment can include the foldable play structure of any of the fifty-ninth through sixty-second embodiments, wherein the plurality of panels comprises six panels, wherein the six panels are connected using the mid-wall hinges and the corner hinges.

A sixty-fourth embodiment can include the foldable play structure of any of the fifty-eighth through sixty-third embodiments, wherein the play structure comprises a play house.

A sixty-fifth embodiment can include the foldable play structure of the sixty-fourth embodiment, wherein the plurality of panels comprises eight panels, wherein the eight panels are connected by alternating the mid-wall hinges and the corner hinges.

In a sixty-sixth embodiment, a method for assembling a foldable playhouse may comprise providing a playhouse with an accordion fold structure comprising a plurality of panels each connected to another by at least one hinge, wherein in a first configuration of the accordion fold structure, the plurality of panels are folded to be stacked in substantially parallel planes, and in a second configuration of the accordion fold structure, the plurality of panels are unfolded forming a playhouse, wherein the provided playhouse is in the first configuration; orienting the playhouse so that a bottom edge of each panel is located on the ground; and unfolding the playhouse from the first configuration to the second configuration.

A sixty-seventh embodiment can include the method of the sixty-sixth embodiment, wherein unfolding the playhouse comprises rotating a first panel about a corner hinge relative to a second panel; forming a corner of the accordion fold structure comprising the first panel and the second panel; rotating a third panel about a mid-wall hinge relative to the second panel; and forming a continuous side plane of the accordion fold structure comprising the second panel and the third panel.

A sixty-eighth embodiment can include the method of the sixty-sixth or sixty-seventh embodiment, further comprising providing a gabled roof comprising at least two roof panels connected along a roof hinge, and at least one gable located between the two roof panels and connected to both of the two roof panels, wherein in the first configuration the roof panels and gable(s) are folded toward one another; unfolding the gable roof into the second configuration; and attaching the gabled roof to the top of the plurality of panels of the accordion fold structure.

A sixty-ninth embodiment can include the method of any of the sixty-sixth through sixty-eighth embodiments, further comprising removing the accordion fold structure from a box while the accordion fold structure is in the first configuration, wherein the box is sized for shipping and transport.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A foldable play structure comprising:
    at least four panels each connected to another to provide an accordion fold structure;
    at least two corner hinges comprising:
        a first hinge portion attached to one panel of the at least four panels, wherein the first hinge portion comprises a first through-hole;
        a second hinge portion attached to another panel of the at least four panels, wherein the second hinge portion comprises a second through-hole; and
        a fastener configured to be retained within either the first portion or the second portion, wherein the first and second through-holes are sized for interaction with the fastener; and
    at least one mid-wall hinge attached to two of the at least four panels and located between the at least two corner hinges;
    wherein:
        the foldable play structure comprises three configurations,
        in a first configuration, the at least four panels of the foldable play structure are folded to be stacked in parallel planes, and for each corner hinge the first hinge portion is perpendicular to the second hinge portion, and the fastener does not extend across both the first hinge portion and the second hinge portion of the corresponding corner hinge and does not attach the panels joined by the corresponding corner hinge,
        in a second configuration, the at least four panels are unfolded forming a play structure, the panels attached to each corner hinge are perpendicular to each other, for each corner hinge the first hinge portion is parallel to the second hinge portion, and the first through-hole aligns with the second through-hole, and the fastener does not extend across both the first hinge portion and the second hinge portion of the corresponding corner hinge and does not attach the panels joined by the corresponding corner hinge, and
        in a third configuration similar in orientation of the panels and corner hinges in the second configuration, the fastener extends through and fixedly attaches the panels joined by the corresponding corner hinge.

2. The foldable play structure of claim 1, wherein the panel opposite the hinge portion retaining the fastener comprises a mating fastener locking element which corresponds to the fastener and is aligned in the second configuration with the fastener and through-holes, and wherein as the fastener is driven to the third configuration, it tightens on the mating fastener locking element to lock the two panels rigidly together.

3. The foldable play structure of claim 1, wherein the first hinge portion is attached to a first edge of a first panel of the at least four panels, and wherein the second hinge portion is attached to a first face of a second panel of the at least four panels.

4. The foldable play structure of claim 3, wherein the second through-hole aligns with a receiving hole through the second panel, and wherein the receiving hole is a countersink hole.

5. The foldable play structure of claim 4, wherein the countersink hole depth is approximately equal to the threaded engagement of the fastener with the first panel.

6. The foldable play structure of claim 3, wherein the second panel comprises a receiving hole through the thickness of the second panel configured to hold the fastener and configured to align with the second through-hole.

7. The foldable play structure of claim 1, wherein the corner hinge comprises a living hinge.

8. The foldable play structure of claim 1, wherein the corner hinge further comprises a pivot portion attaching the first hinge portion to the second hinge portion, wherein the first hinge portion and the second hinge portion are configured to rotate with respect to each other about the pivot portion.

9. The foldable play structure of claim 1, wherein the corner hinge further comprises a retaining feature configured to retain the fastener within the corner hinge.

10. The foldable play structure of claim 9, wherein the retaining feature comprises one or more tabs (or other extrusions) extending into the opening of a through-hole of the hinge.

11. The foldable play structure of claim 1, wherein the foldable play structure comprises a play house.

12. The foldable play structure of claim 11, wherein in the first configuration the plurality of panels comprises at least two end panels and at least one interior panel between the two end panels, and wherein each end panel is connected to only one of the plurality of panels and each interior panel is attached to two of the plurality of panels.

13. The foldable play structure of claim 1, further comprising a gable roof comprising at least two roof panels connected along a roof hinge, and at least one gable located between the two roof panels and connected to both of the two roof panels, wherein the gabled roof is configured to attach to the plurality of panels at the top of the panels.

14. The foldable play structure of claim 13, wherein the at least one gable comprises a hinge along a center line of the gable, wherein in the first configuration the gable is configured to fold along the hinge when the two roof panels are folded toward one another, and in the second configuration the gable is configured to unfold.

15. The foldable play structure of claim 1, wherein the foldable play structure comprises a play table.

16. The foldable play structure of claim 15, wherein the foldable play structure comprises two face panels, four side panels, four corner hinges, and at least two mid-wall hinges, wherein one mid-wall hinge connects a first side panel and a second side panel, and wherein one corner hinge connects each side panel to a face panel.

17. A method of assembling a play structure comprising:
    providing a play structure with an accordion fold structure comprising at least four panels each connected to another, at least two corner hinges comprising a first hinge portion attached to one panel of the at least four panels, wherein the first hinge portion comprises a first through-hole, and a second hinge portion attached to another panel of the at least four panels, wherein the second hinge portion comprises a second through-hole, and a fastener configured to be retained within either the first portion or the second portion, wherein the first and second through-holes are sized for interaction with the fastener, and at least one mid-wall hinge attached to two of the at least four panels and located between the at least two corner hinges;

orienting the play structure so that a bottom edge of each panel is located on the ground in a first configuration of the accordion fold structure, wherein in the first configuration, the plurality of panels are folded to be stacked in parallel planes, and for each corner hinge the first hinge portion is perpendicular to the second hinge portion, and the fastener does not extend across both the first hinge portion and the second hinge portion of the corresponding corner hinge and does not attach the panels joined by the corresponding corner hinge;

unfolding the play structure from the first configuration to a second configuration of the accordion fold structure, wherein in the second configuration, the plurality of panels are unfolded forming a play structure, the panels attached to each corner hinge are perpendicular to each other, for each corner hinge the first hinge portion is parallel to the second hinge portion, and the first through-hole aligns with the second through-hole, and the fastener does not extend across both the first hinge portion and the second hinge portion of the corresponding corner hinge and does not attach the panels joined by the corresponding corner hinge; and attaching the panels joined by the corresponding corner hinge to each other by extending the fastener through and fixedly attaching the panels in a third configuration similar in orientation of the panels and corner hinges in the second configuration.

18. A foldable play structure comprising:
at least four panels each connected to another to provide an accordion fold structure;
at least two corner hinges, each corner hinge comprising:
   a first hinge portion configured to attach to a first panel of the accordion fold structure,
   a second hinge portion configured to attach to a second panel of the accordion fold structure,
   a pivot portion attaching the first hinge portion to the second hinge portion, wherein the first hinge portion and the second hinge portion are configured to rotate with respect to each other about the pivot portion,
   a fastener configured to be retained within the corner hinge, in a first configuration, and configured to attach the first panel to the second panel, in a second configuration, and
   a retaining feature configured to retain the fastener within the corner hinge while in the first configuration, without interfering with the ability of the fastener to pass through both hinge portions in the second configuration; and
at least one mid-wall hinge attached to two of the at least four panels and located between the at least two corner hinges;

wherein:
   the foldable play structure comprises three configurations,
   in a first configuration, the at least four panels of the foldable play structure are folded to be stacked in parallel planes, and for each corner hinge the first hinge portion is perpendicular to the second hinge portion, and the fastener does not extend across both the first hinge portion and the second hinge portion of the corresponding corner hinge and does not attach the panels joined by the corresponding corner hinge,
   in a second configuration, the at least four panels are unfolded forming a play structure, the panels attached to each corner hinge are perpendicular to each other, for each corner hinge the first hinge portion is parallel to the second hinge portion, and the first through-hole aligns with the second through-hole, and the fastener does not extend across both the first hinge portion and the second hinge portion of the corresponding corner hinge and does not attach the panels joined by the corresponding corner hinge, and
   in a third configuration similar in orientation of the panels and corner hinges in the second configuration, the fastener extends through and fixedly attaches the first and second panels joined by the corresponding corner hinge by passing through a receiving hole in the second panel, two through-holes in the first and second hinge portions and into the first and second panels, rigidly locking the panels into the second configuration.

* * * * *

UNITED STATES PATENT AND TRADEMARK OFFICE
CERTIFICATE OF CORRECTION

PATENT NO. : 11,135,525 B2
APPLICATION NO. : 16/631368
DATED : October 5, 2021
INVENTOR(S) : Frederick Rieber et al.

It is certified that error appears in the above-identified patent and that said Letters Patent is hereby corrected as shown below:

In the Claims

1. In Column 33, Lines 33-34, in Claim 1, delete "the first portion or the second portion," and insert -- the first hinge portion or the second hinge portion, --, therefor.

2. In Column 35, Line 7, in Claim 17, delete "the first portion or the second portion," and insert -- the first hinge portion or the second hinge portion, --, therefor.

Signed and Sealed this
Twenty-sixth Day of April, 2022

Katherine Kelly Vidal
*Director of the United States Patent and Trademark Office*